(12) United States Patent
Mishima et al.

(10) Patent No.: US 6,191,405 B1
(45) Date of Patent: Feb. 20, 2001

(54) IMAGE PROCESSING APPARATUS INCLUDING IMAGE ROTATOR FOR CORRECTING TILT OF THE IMAGE DATA

(75) Inventors: Nobuhiro Mishima, Okazaki; Kazuhiro Ueda; Daisetsu Tohyama, both of Toyokawa, all of (JP)

(73) Assignee: Minolta Co., Ltd., Osaka (JP)

( * ) Notice: Under 35 U.S.C. 154(b), the term of this patent shall be extended for 0 days.

(21) Appl. No.: 09/092,234

(22) Filed: Jun. 5, 1998

(30) Foreign Application Priority Data

Jun. 6, 1997 (JP) .................................................. 9-149449
Jun. 6, 1997 (JP) .................................................. 9-149462
Jun. 6, 1997 (JP) .................................................. 9-149468

(51) Int. Cl.$^7$ .................................................. H01L 27/00
(52) U.S. Cl. .................................. 250/208.1; 250/559.3
(58) Field of Search ............................... 250/208.1, 234, 250/235, 236, 559.29, 559.3, 559.4; 358/486, 488; 382/296–299, 293, 295, 289; 359/554

(56) References Cited

U.S. PATENT DOCUMENTS

| | | | |
|---|---|---|---|
| 5,050,225 | * 9/1991 | Itoh | 382/46 |
| 5,546,479 | 8/1996 | Kawanaka et al. | |
| 5,649,033 | * 7/1997 | Morikawa et al. | 382/44 |
| 5,896,202 | * 4/1999 | Ozaki | 358/296 |

FOREIGN PATENT DOCUMENTS

| | | |
|---|---|---|
| 56-105579 | 8/1981 | (JP) . |
| 07092961 | 7/1995 | (JP) . |

* cited by examiner

*Primary Examiner*—Que T. Le
(74) *Attorney, Agent, or Firm*—McDermott, Will & Emery

(57) ABSTRACT

In an image processing apparatus, an image reading unit reads a document put on a platen glass to generate image data, and a detector in the image reading unit detects a tilt angle of the document put on the platen glass. A rotation angle is set based on the image data of a document and the image data is modified according to the rotation angle. The modification is controlled so as not to deteriorate the image quality. For example, the image data is rotated by an angle at which the document is tilted when the document is read, if the detected tilt angle of a document is larger than a predetermined value. The modification of the image data may be controlled according to a characteristic of the image data. For example, the image data is not rotated when the document is decided to include a half-tone image by detecting the attribute of the image data. Preferably, a magnifying power for reading the document is calculated according to the detected tilt angle, and the image data are read again at the magnifying power. Then, the optically magnified image data of the document is rotated by the tilt angle.

28 Claims, 63 Drawing Sheets

Fig. 14
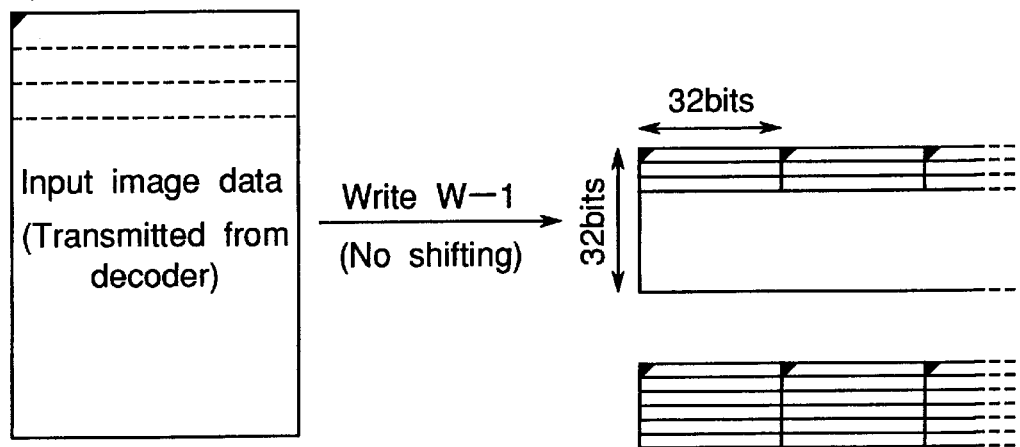
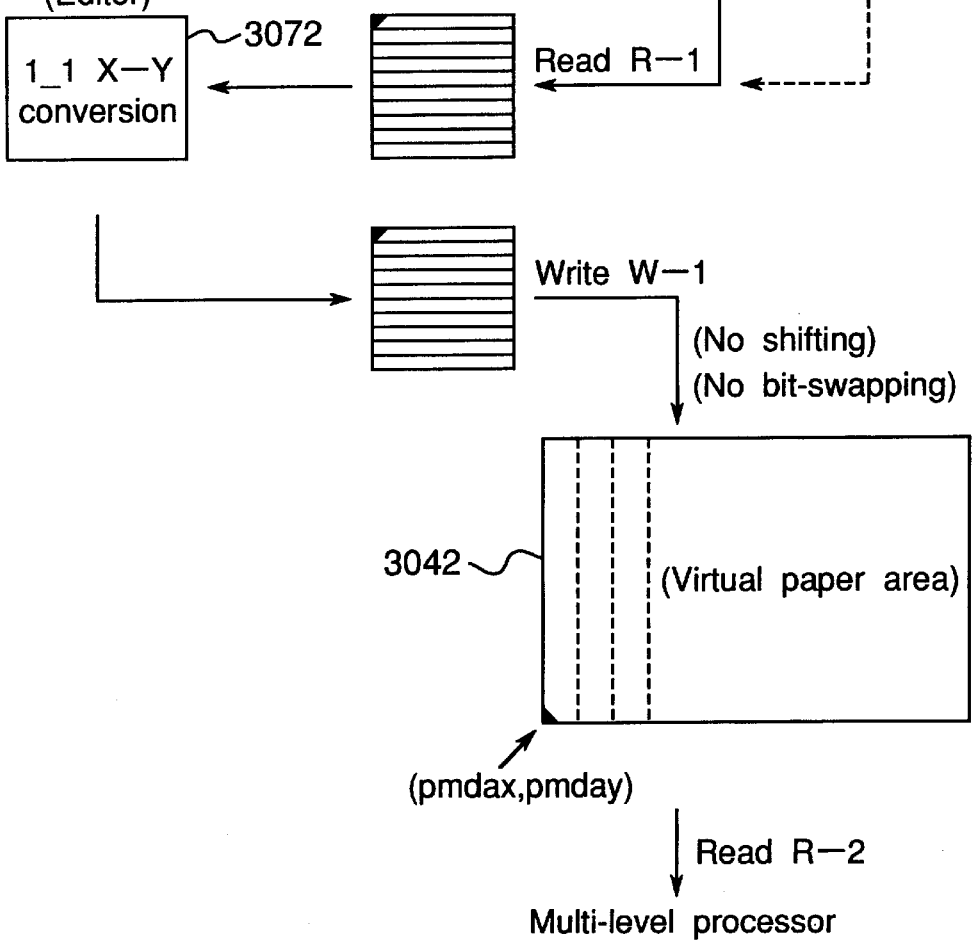

Fig.15A
32-bit input data
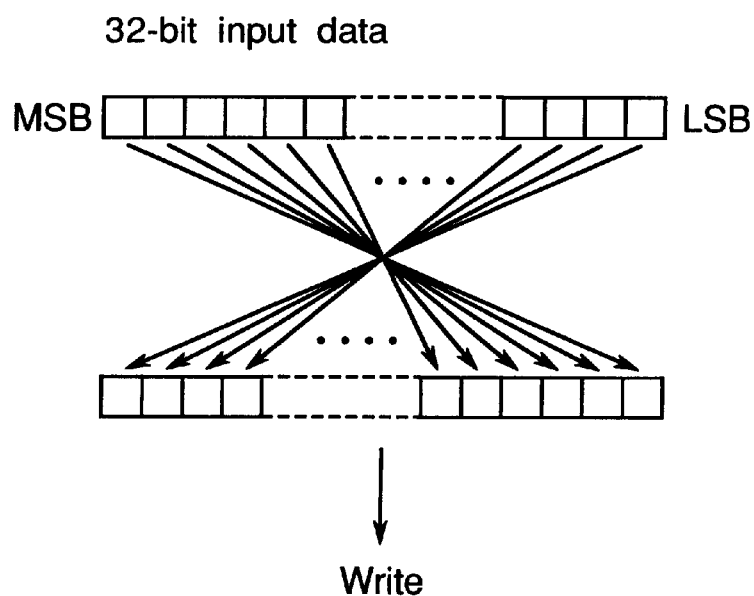
Write
Fig.15B (Virtual paper area)
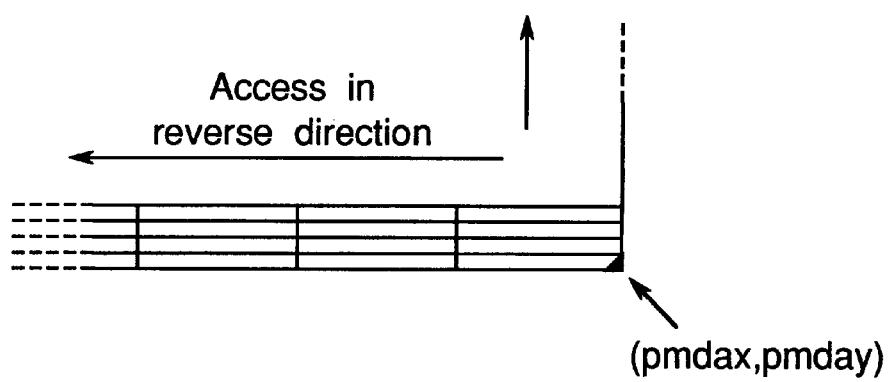
Access in reverse direction
(pmdax,pmday)

Read area y
y/cosθ

Read area

IMAGE PROCESSING APPARATUS INCLUDING IMAGE ROTATOR FOR CORRECTING TILT OF THE IMAGE DATA

This application is based on application Nos. 9-149449, 9-149462 and 9-149468 filed in Japan, the contents of which are hereby incorporated by reference.

BACKGROUND OF THE INVENTION

1. Field of the Invention

The present invention relates to an apparatus for processing image data and more particularly to an apparatus which processes image data read by an image reader.

2. Description of Prior Art

A document is put on a platen glass when it is read by an image reader. When the document is put on the platen glass at an erroneous position, it is desirable to correct the tilt of the document. Then, a function is proposed to rotate 2-dimensional image data obtained by a document reader by the tilt angle of the document (for example, Japanese Patent Publication 63-9266/1988). In the tilt angle rotation, inclination of a document put on a platen glass is detected, and the image data are rotated to the normal position. Then, an image is formed on a paper based on the corrected image data. Thus, when a user put a document at a tilt unintentionally, its image can be output by automatically correcting the tilt of the image.

However, in the prior art tilt correction by rotating the image data by the tilt angle, the image is processed automatically in the same process regardless of a simple bi-level image such as a character image or a half-tone image such as a photograph. Further, the processing is similar irrespective of the magnitude of the rotation angle. For a character image, the image after the tilt angle rotation keeps about the same image quality (for a resolution of about 400 dots per inch). On the other hand, for a half-tone image, the image quality is deteriorated disadvantageously after the rotation. For example, the image becomes rough at half-tone image areas. Especially, the deterioration becomes worse if the rotation angle becomes larger, for example more than about 10°. It is to be noted that it is difficult to use a single criterion for the tilt angle rotation, because half-tone images include various kinds and user's purposes for image forming are also different.

If multi-level image data (data having gradation) are subjected to the tilt angle rotation, image deterioration on the tilt angle rotation is suppressed to some degree. However, this needs a complicated structure, and the processing speed becomes slow. Further, the cost increases to a large extent.

For a half-tone image, high image quality is required, and smoothing or the like is needed in the data modification.

However, for a document including half-tone and character images mixed with each other, smoothing for a character image (simple bi-level image) may worsen image quality reversely. When an image is formed, it is convenient for a user to automatically correct the tilt of a document, but deterioration of image quality is a problem.

Further, for a document including half-tone and character images mixed with each other, deterioration of image quality is less for a character image (simple bi-level image) than for a half-tone image. Thus, the image quality subjected to the rotation becomes different between the character image areas and the half-tone image areas. When such an image formed on a sheet of paper is viewed, the entire image seems not well.

In a prior art tilt correction technique, it is known to combine image data shift in two scan directions with 90° rotation. In order to prevent size change of the image, electric magnification is performed after the shifting in each scan direction. However, when electric magnification is performed for each shifting, line insertion or the like happens by the electric magnification, and this deteriorates the image. Further, processing time for the rotation becomes longer.

SUMMARY OF THE INVENTION

The present invention intends to solve the above problems, and its object is to provide an improved image processing apparatus.

Another object of the invention is to provide an image processing apparatus which performs rotation according to characteristics of an input image data.

A further object of the invention is to provide an image processing apparatus which performs rotation with less image deterioration.

In order to attain at least one of the objects, in one aspect of the invention, an image processing apparatus of the invention has a setter which sets a rotation angle based on image data of a document and a modifying section which modifies the image data. The image data is obtained by reading the document. The image data is modified according to a relationship between the rotation angle and a predetermined value, for example, by rotating the image data by an angle at which the document is tilted when the document is read. The modification of the image data may be controlled according to a characteristic of the image data such as half-tone image or simple bi-level image.

In a second aspect of the invention, the image reading unit reads a document put on a set position to generate image data. A detector in the image reading unit detects a tilt angle of the document put on the set position. A magnifying power for reading the document is calculated according to the detected tilt angle. Then, and the image data are read at the magnifying power, and the optically magnified image data of the document is rotated by the tilt angle.

An advantage of the present invention is that deterioration of image quality can be decreased when a document is put on the platen glass at a tilt.

Another advantage of the invention is that deterioration of image quality of an image subjected to tilt angle correction is decreased by reading an optically magnified image.

BRIEF DESCRIPTION OF THE DRAWINGS

These and other objects and features of the present invention will become clear from the following description taken in conjunction with the preferred embodiments thereof with reference to the accompanying drawings, and in which:

FIG. 14 is a diagram for explaining 90° rotation of image data;

FIGS. 15A and 15B are diagrams for explaining bit swap processing of image data;

DETAILED DESCRIPTION OF THE PREFERRED EMBODIMENTS

Figure 1:
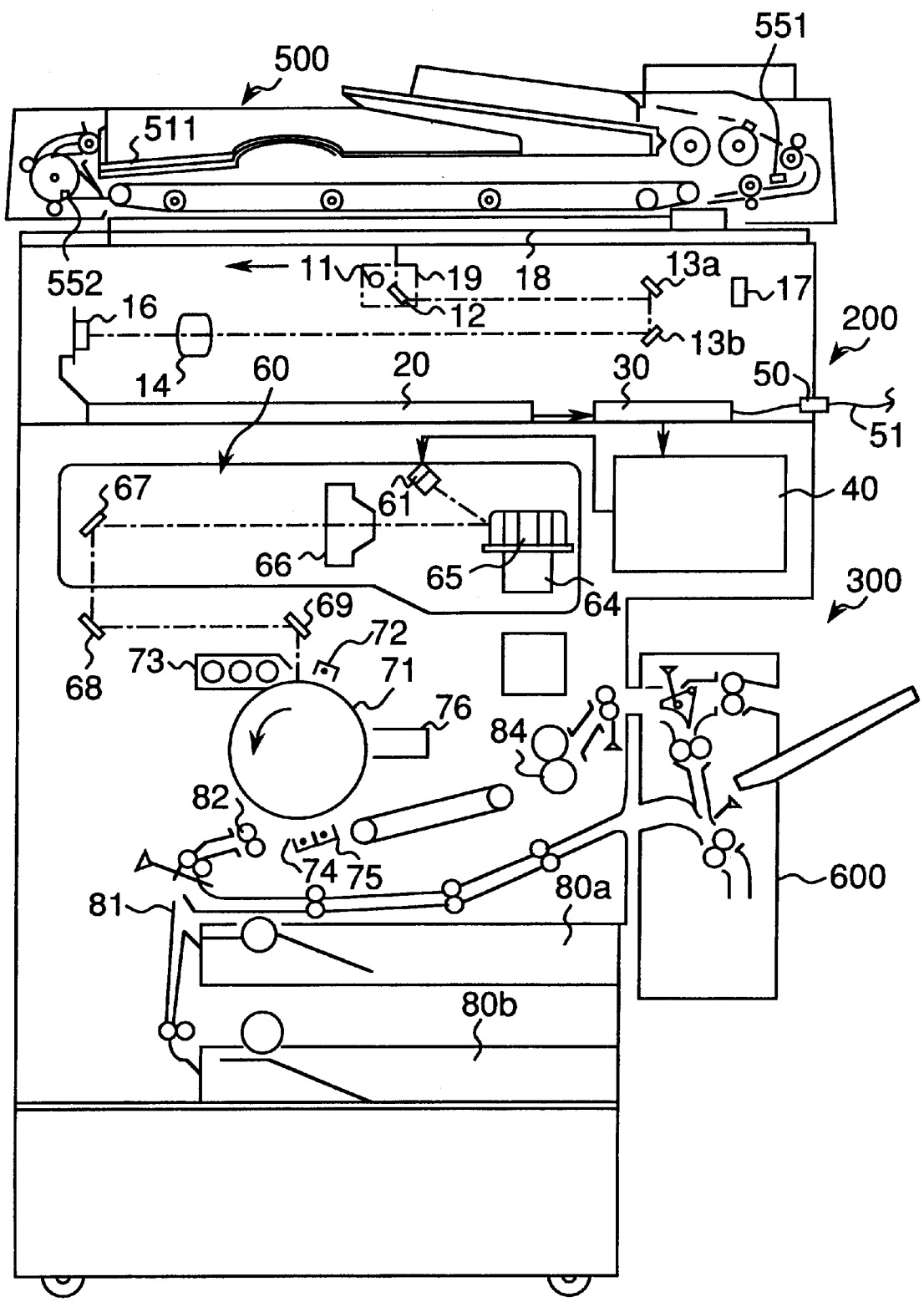
FIG. 1 is a schematic sectional view of a digital copying machine.

Referring now to the drawings, wherein like reference characters designate like or corresponding parts throughout the views, preferred embodiments of the invention are explained.

A. Structure of the copying machine

A digital copying machine of a first embodiment of the invention is explained. FIG. 1 shows schematically an entire structure of the digital copying machine 1. The digital copying machine 1 has an image reader 200, a printer 300, a document feeder 500, an operational panel (refer to FIG. 2), and a paper-re-feed unit 600.

The document feeder 500 feeds a document put on a document tray 10 automatically onto a platen glass 18. After the document is read by the image reader 200, it is carried onto a tray 511. The document size is detected by sensors 551 and 552.

The image reader 200 includes a scan system and an image processor 20. In the scan system, a document on the platen glass 18 is read and image data are generated corresponding to each pixel of the document image. That is, the document is illuminated by an exposure lamp 12 mounted to a scanner 19 which moves below the platen glass 18. A light reflected from the document propagates through mirrors 12, 13a, 13b and a condenser lens 14 to a line sensor (photoelectric conversion element) 16 such as a CCD (charge-coupled device) array. A scanner position sensor 17 is provided to detect that the scanner 19 reaches to a document read area (image area). The line sensor 16 has many photoelectric conversion elements aligned in a main scan direction (a direction vertical to the paper face of FIG. 1). For example, it reads an image at 400 dots per inch to convert the reflected light to electrical signals to be output to the image signal processor 20. The image signal processor 20 processes the input electrical signals and sends image data to a memory unit 30. The image signal processor 20 detects the tilt of a document. The memory unit 30 encodes the image data received from the image signal processor 20 and stores the code data. Next, it decodes the data and sends the image data to the printer 300. When the data are decoded, edition such as tilt angle rotation for a tilted document is performed if necessary.

The memory unit 30 has an interface as mentioned below, and it is connected through a connector 50 and a cable 51 to an external apparatus.

The printer 300 includes a print processor 40, a laser optical system 60, an image forming system. The print processor 40 controls the laser optical system 60 based on the image data received from the memory unit 30. In the laser optical system 60, a laser diode 61 emits a laser beam modulated by signals from the signal processor 40, and a polygon mirror 65 deflects it to scan a photoconductor drum 71. That is, the deflected laser beam is guided by an f-θ lens 66 and reflection mirrors 67, 68 onto an exposure position on the photoconductor drum 71, and a latent image of the document image is formed by the scan on the photoconductor drum 71.

An image is formed by the image forming system with an electrophotographic process. That is, a latent image formed on the photoconductor drum 71 is developed and the developed image is transferred and fixed on a paper to form an image on the paper. In this process, after the photoconductor drum 71 rotating counterclockwise in FIG. 1 is charged uniformly by a sensitizing charger 72, it is exposed by the laser beam to form a latent image, and the latent image is developed by a development unit 73. (For the easiness of explanation, only one development unit is shown in FIG. 1, but actually development units for toners of four colors of cyan, magenta, yellow and black are used.) On the other hand, a sheet of paper is guided from a paper cassette 80*a*, 80*b* through a paper guide 81 and timing rollers 82 towards the photoconductor drum 71, and the toner image obtained by development is transferred onto the paper by a transfer charger 74. Next, the paper is separated by a separation charger 75 and carried to fixing rollers 84. The fixing rollers 84 fix the image with heat. Then, the paper is sent out through the paper-re-feed unit 600.

Figure 2:
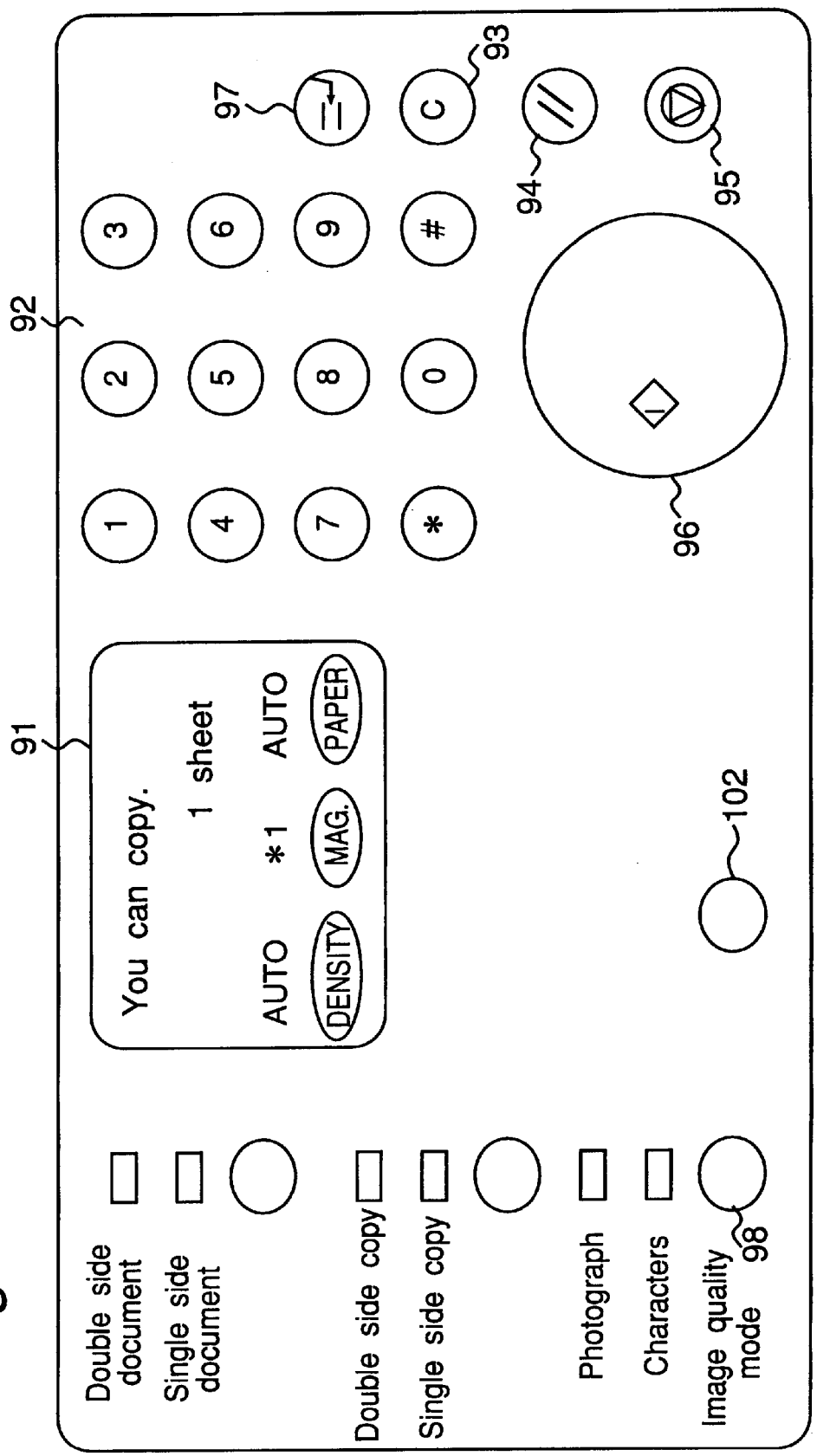
FIG. 2 is a plan view of an operational panel of the copying machine.

FIG. 2 is a plan view of the operational panel of the copying machine. The operational panel has a liquid crystal touch panel 91 which displays statuses, and various modes are set therewith. Further, it has numeral keys 92 for inputting numerical values such as a number of copies or magnifying power, a clear key 93 for resetting a value to the standard value, a panel reset key 94 for initializing the copy mode, a stop key 95 for stopping copy operation, a start key 96 for starting copy operation, an interrupt key 97 for activating interrupt, a key 98 for setting image quality mode (photograph/character), and a key 102 for setting tilt angle rotation correction mode. By pressing the key 102, various choice for modes, parameters and the like can be performed with reference to the tilt angle rotation function.

Figure 3:
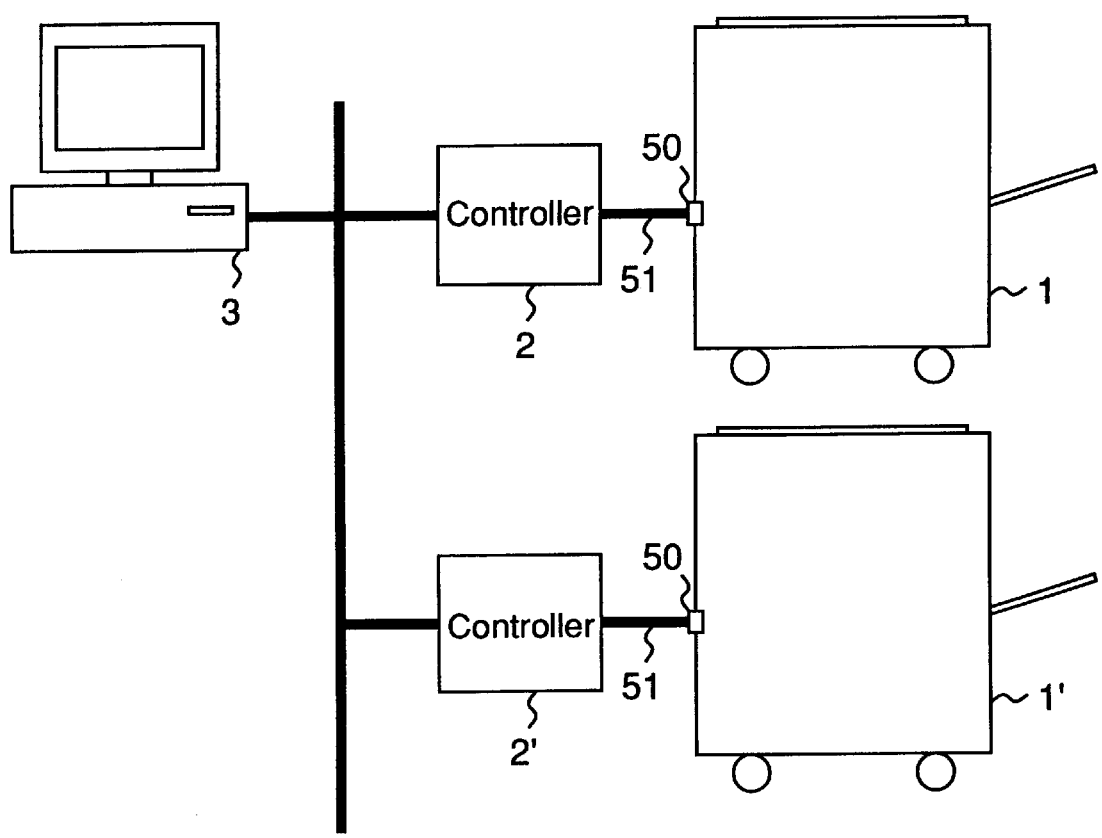
FIG. 3 is a diagram of a system including a plurality of copying machines.

FIG. 3 shows an example of a system including a plurality of digital copying machines 1, 1' connected in a network. The digital copying machines 1, 1' are connected through the connectors 50 to controllers 2, 2' as examples of external apparatuses. The controller 2, 2' is connected through a general interface such as Ethernet to a computer 3 and to the other copying machine. For example, in order print a data file prepared by the computer 3, in the print processing in the computer 3, various conditions such as paper size, magnifying power, copy number or conditions for staple or sorting mode, and an output instruction are input, and the computer 3 sends them to the controller 2. The controller 2 converts the image data such as PostScript data received from the computer 3 to luster data. A memory having a capacity of at least one page is provided in the controller 2. After converted to the bit map data, the image data as well as the various setting conditions sent also through the controller 2 are transmitted to the digital copying machine 1, and the copying machine 1 performs image forming and other various processes. The invention is not limited to the above system, and it includes a system such as a facsimile apparatus connected through a telephone line and a modem.

B. Control system of copying machine

Figure 4A:
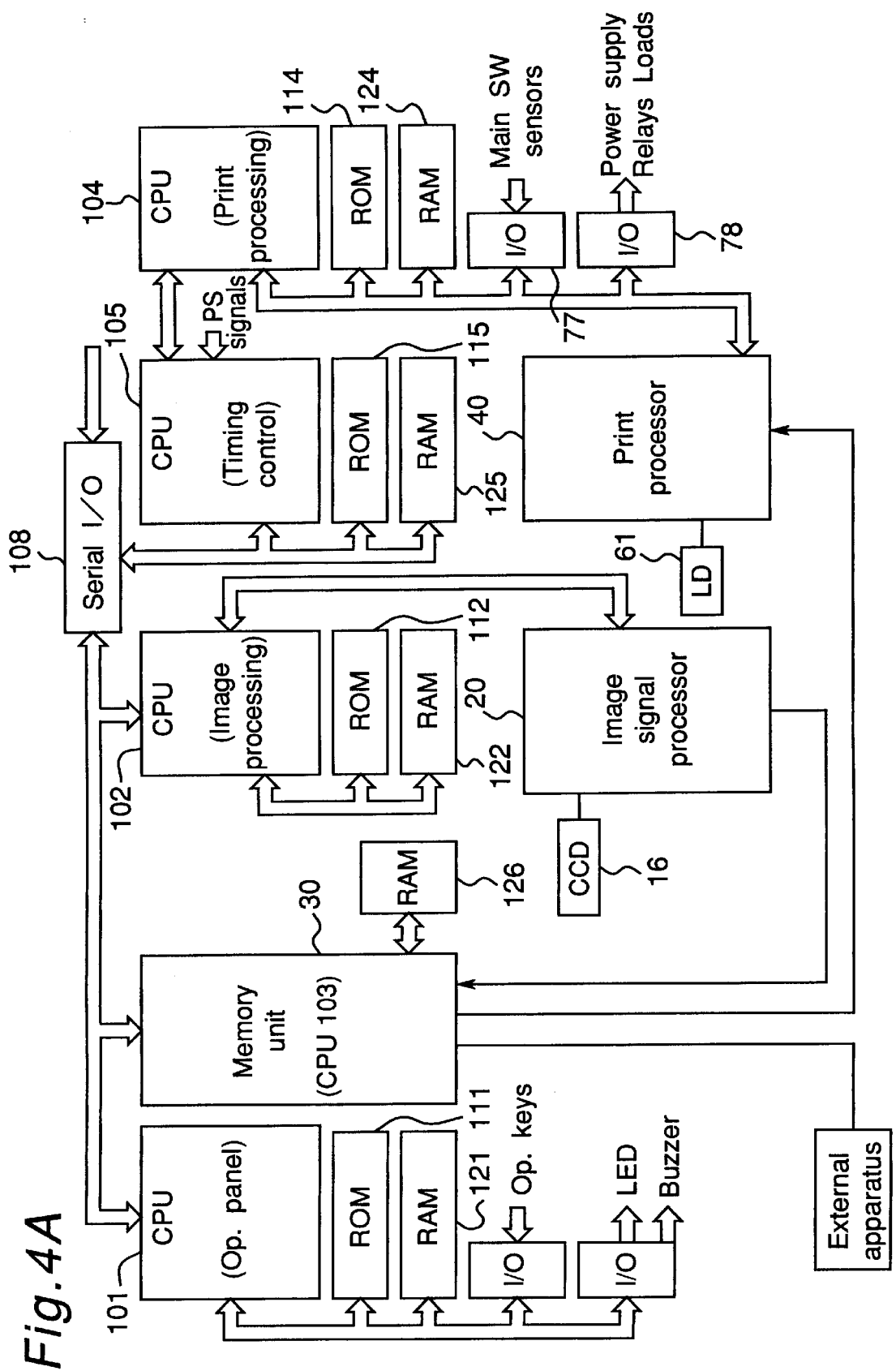
FIGS. 4A and 4B are block diagrams of a control section of the copying machine.
Figure 4B:
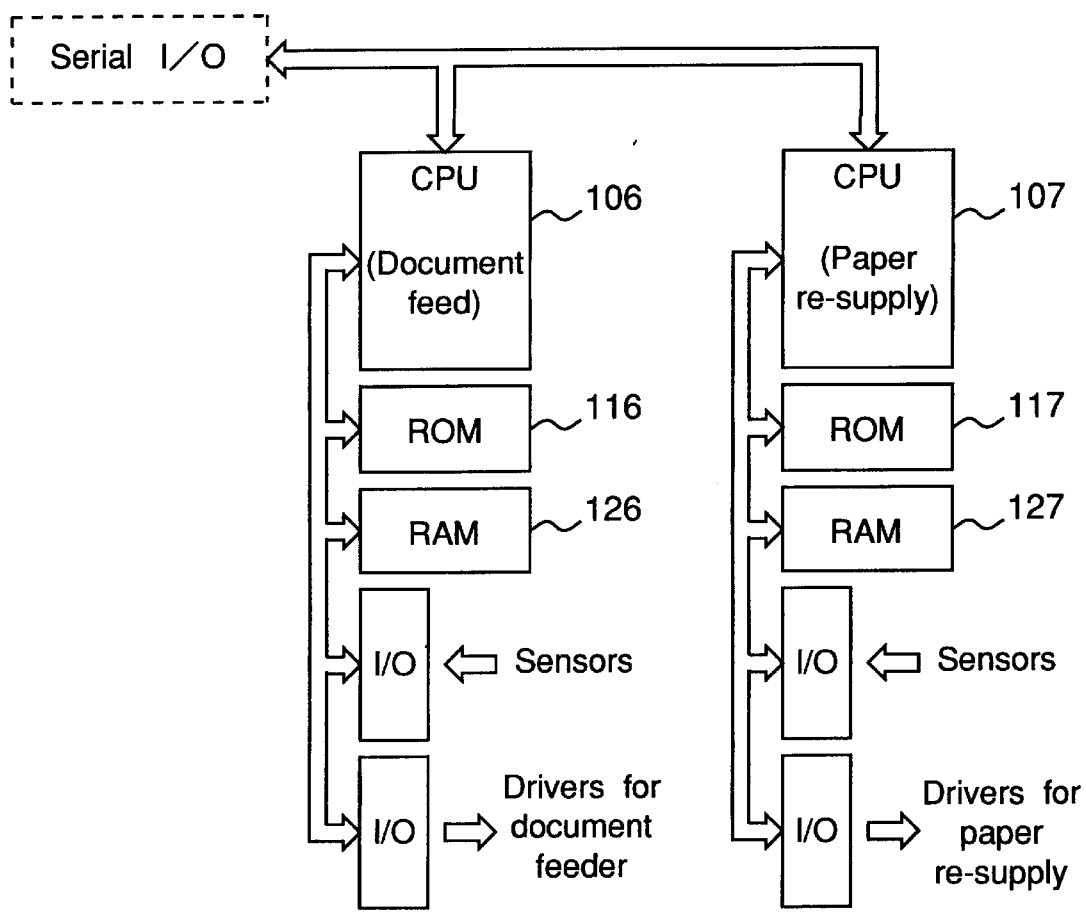

FIGS. 4A and 4B show a control system 100 which controls the copying machine 1. The control system 100 has eight central processing units (CPUs) 101–107. Each of the CPUs 101–107 is connected to a read only memory (ROM) 111–117 storing a program, a random access memory (RAM) 121–127 used as a work area for executing the program. The CPU 103 is provided in the memory unit 30.

The first CPU 101 controls key-input signals from various operational keys in the operational panel (refer to FIG. 2) and display in the liquid crystal touch panel.

The second CPU 102 controls the driving in the scan system in the image reader 200 and processing in the image signal processor 20. The tilt of a document is detected from the image read by the image reader 200.

The third CPU 103 controls the memory unit 30 to code the read image data to be stored in a code memory 303 and to read them therefrom to be sent to the print processor 40. When the image data are read, rotation and edition on the image data including image tilt correction. The memory unit 30 has a function to interface with an external apparatus to send or receive image data and control data.

The fourth CPU 104 controls the print processor 40, the optical system 60 and the image forming system in the printer 300.

The fifth CPU 105 controls timings in the entire control system and processes setting on an operation mode.

The sixth CPU 106 controls the document feeder 500.

The seventh CPU 107 controls the paper-re-feed unit 600.

Among the seven CPUs 101–107, serial transmission is performed by using interrupt processing to send and receive commands, reports and the like between them.

Figure 5:
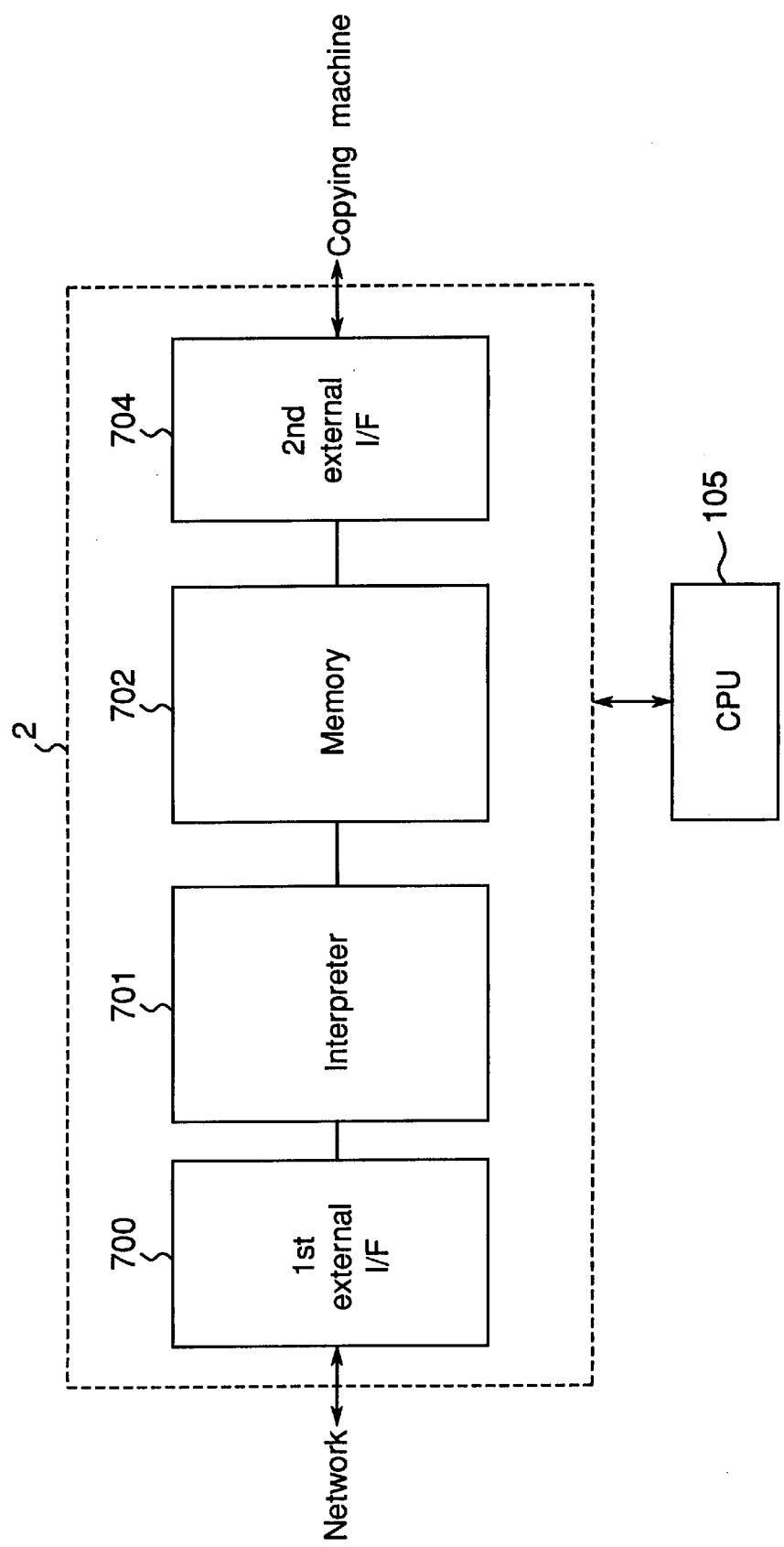
FIG. 5 is a block diagram of a controller.

FIG. 5 is a block diagram of the controller 2 controlled by the CPU 105. A first external interface 700 sends and receives signals to and from the external computer 3. An interpreter 701 interprets the data such as PostScript data received from the computer 3 and develops them to luster data, while a memory 702 stores the luster data. When a page of image data are stored, the image data are sent through a second external interface 704 to the printer 300.

Figure 6:
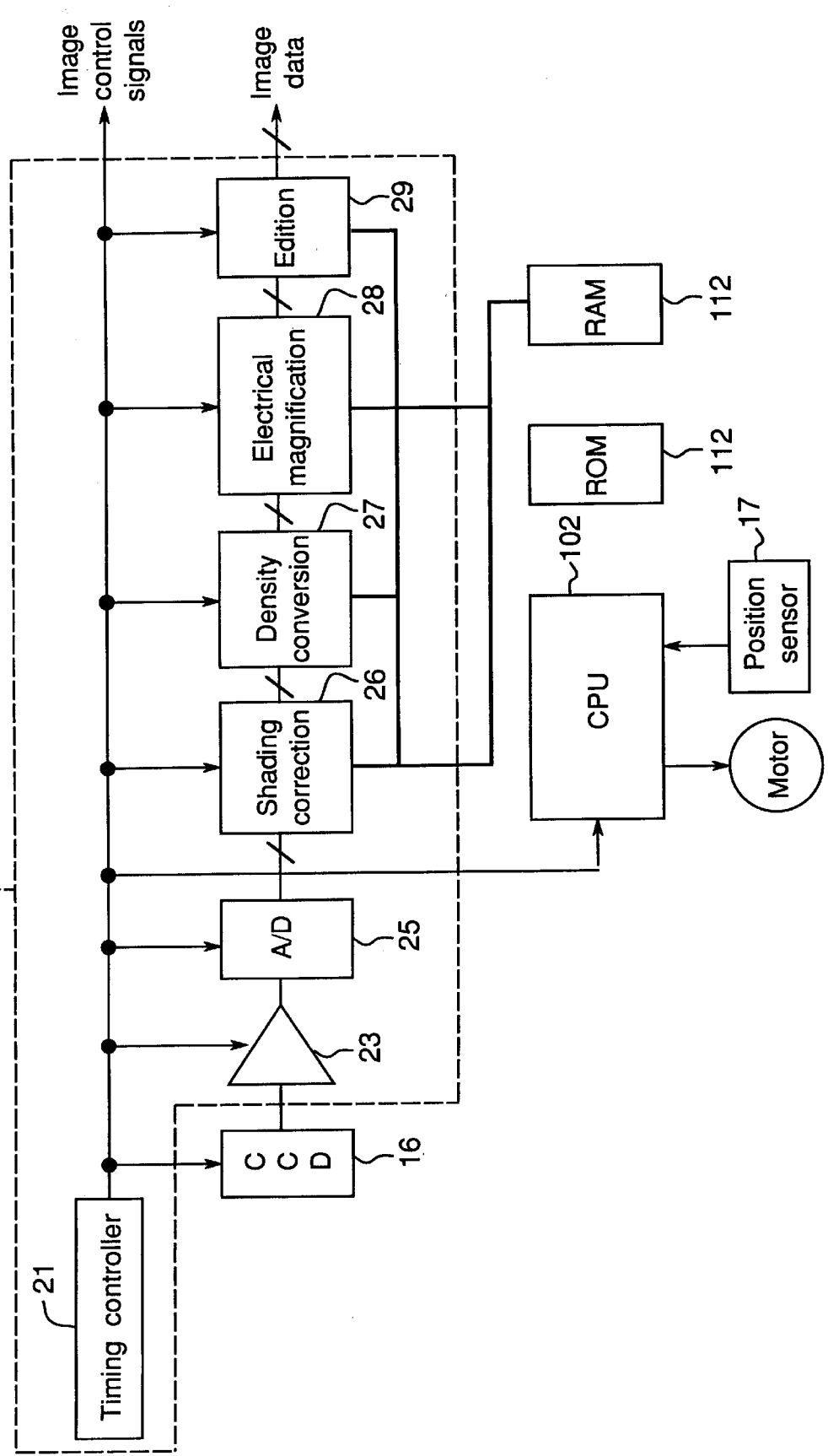
FIG. 6 is a block diagram of an image signal processor.

Next, image data processing is explained. FIG. 6 is a block diagram of the image signal processor 20. The image signal processor 20 has a timing controller 21, an amplifier 23, an analog-to-digital converter 25, a shading correction section 26, a density converter 27, an electrical magnification section 28 and an edition section 29, and it is controlled by the CPU 102. In the image signal processor 20, an input signal from the line sensor 16 is amplified by the amplifier 23 and quantized as an 8-bit data for each pixel by the analog-to-digital converter 25. Then, the image data are subjected to shading correction, conversion to density data (gamma correction), electrical magnification and edition. Then, the data are sent as image data to the memory unit 30 or to the printer. The second CPU 102 sets various parameters for the parts 26–29 in the image signal processor 20, controls a scan motor in the laser scan system and communicates with the CPU 105 to control the entire image reader 200.

The document size and document orientation are detected as follows. When it is checked whether a document is read or not, a document on the platen glass 18 is scanned with a document cover of specular face of the document feeder 500, and a portion having large reflection intensity is decided to be a document. Because there is practically no reflection light from the specular face, the decision is easy. The scan may be performed while the document cover is opened. When a command of document size detection is received from the CPU 105, the CPU 102 performs a prescan. The CPU 102 controls the scanner motor which drives the scanner 19 according to the position information from the scanner position sensor in the subscan direction. The document size and the document orientation of vertical or horizontal setting are detected from the content of the image data and the monitor position information at the timing corresponding to the subscan position. The CPU 102 sends the detection results to the CPU 105. The CPU 102 controls the speed of the scanner motor according to the magnifying power received from the CPU 102 when the image is read.

Figure 7:
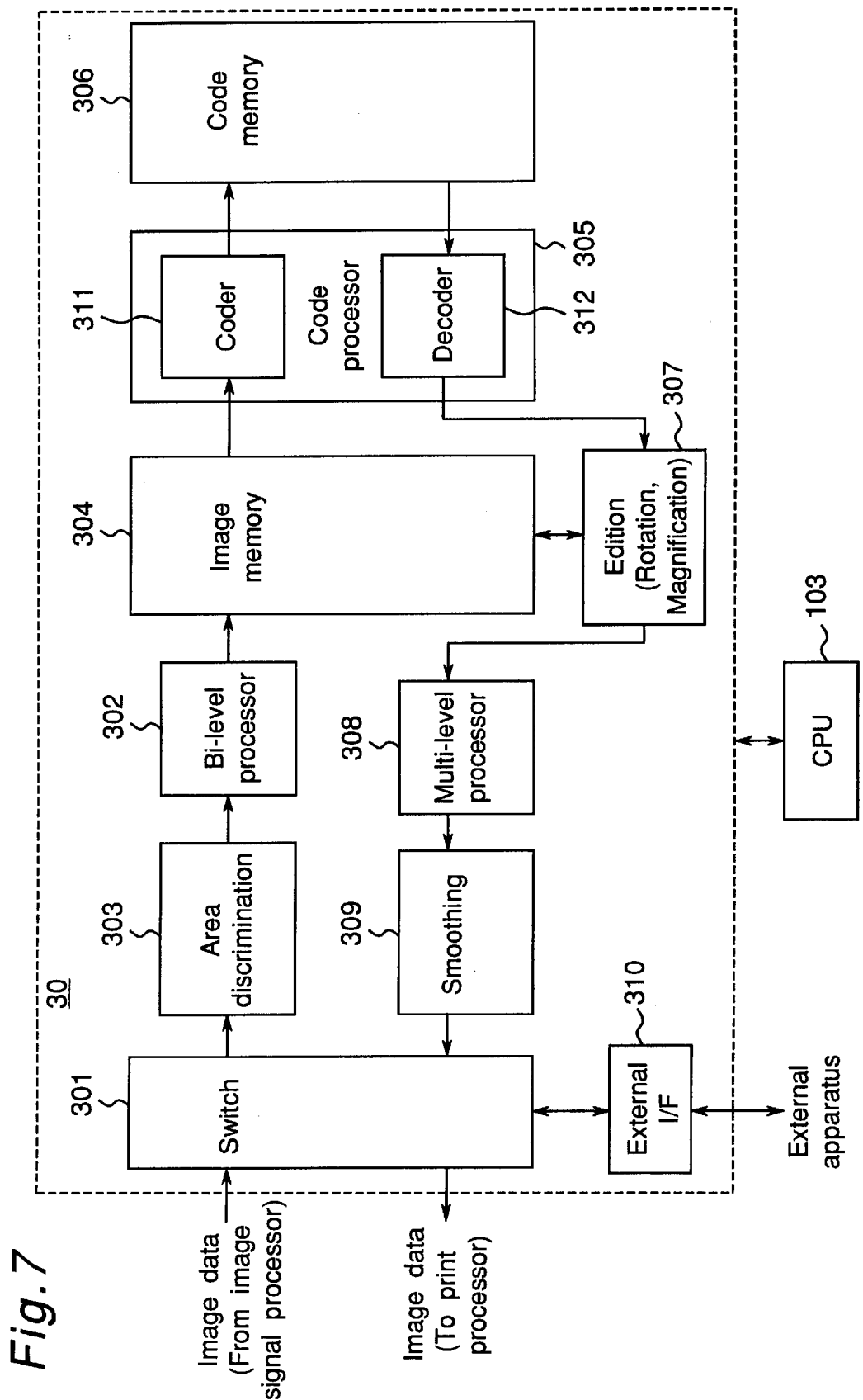
FIG. 7 is a block diagram of a memory unit.

FIG. 7 is a block diagram of the memory unit 30. A switch 301 switches a route of image between the image signal processor 20, the print processor 40 and the external interface 310. An area discrimination section 303 discriminates whether input image data are simple bi-level data or a half-tone data. A bi-level processor 302 binarizes the image data according to the parameters set by the CPU 103 with a process such as error dispersion or dither process in a range which can be recovered to multi-level data. An image memory 304 has a capacity of two pages, and the bi-level data are stored in the image memory 304. Next, the bi-level data stored in the image memory 304 are coded by a coder 311 in the code processor 305, and the code data are stored in a code memory 306. The code memory 306 is for example a multi-port memory having a capacity of one hundred pages of A4 size at 400 dots per inch. As data of a plurality of pages can be stored in the code memory, the code memory 306 is managed by a code management table provided in the RAM 126.

When printing is performed, the code data compressed in the code memory 306 are expanded by a decoder 312. If image edition is needed, an edition processor 307 performs edition (rotation, magnification, shift or the like) and decoding at the same time. If necessary, tilt angle rotation is also performed when the data are decoded. The decoded data are transmitted to the image memory. When data of one page are decoded, the bi-level data read from the image memory 304 are converted to multi-level data by a multi-level processor 308, and, if necessary, subjected to smoothing in a smoothing processor 309. Then, the data are sent through the switch 301 to the print processor 40 or the external apparatus. The CPU 103 sends control parameters to the multi-level processor 308 and the smoothing processor 309.

Figure 8:
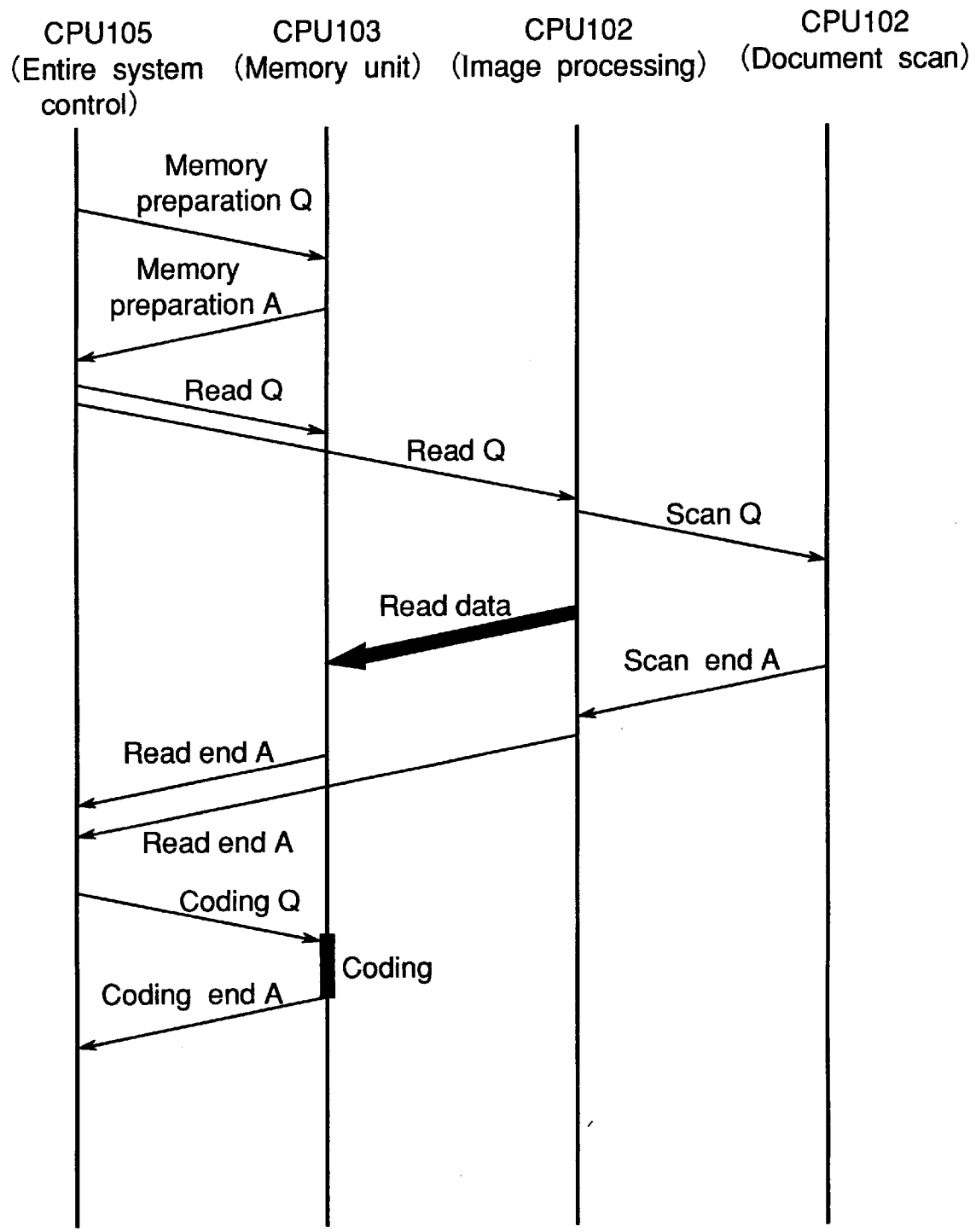
FIG. 8 is a sequence diagram of write to memory.

Next, operation sequences in the copying machine 1 on image reading and on printing are explained mainly on data flow of request commands (Q), reports (A) and data transmitted between the CPUs 101–106. FIG. 8 is a sequence diagram of write to memory. First, the CPU 105 which controls the entire sequence sends a memory preparation command to the CPU 103 which controls the memory unit 30. Then, the CPU 103 sets bus connection for transmitting image data from the image signal processor 20 to the image memory 304, sets a mode for binarization, and sets a start address in a write area in the image memory 30 and XY length information. After the preparation is completed, the CPU 103 notifies memory preparation end report to the CPU 105.

Next, the CPU 105 sends a read instruction to the CPUs 103 and 102. Then, the CPU 102 requests a scan to the document scan section in the image reader 20. Thus, a document scan is started. When the scanner 19 reaches to the document read area on the platen glass, the document is read, and the read data (image data D2) are sent through the image signal processor 20 to the memory unit 30 according to image processing mode set by the CPU 102. When the scan is completed, a scan end signal is sent to the CPU 102, and read end reports are notified by the CPUs 102 and 103 to the CPU 105.

Next, the CPU 105 requests data compression (coding) to the CPU 103. Then, the CPU 103 sets read address for the image memory 304, XY length information, write address for the code memory 306, a mode of the coder 311 such as arithmetic coding or modified Huffman coding, etc. and activates various parts. Then, the coder 311 performs coding (data compression), and the code data are stored in the code memory 306.

After the data compression is completed, the CPU 103 notifies coding end to the CPU 105. If the code memory 306 is full with data, the coding end answer includes a parameter which means coding impossible, and the CPU 105 knows that the code memory 306 is full.

Figure 9:
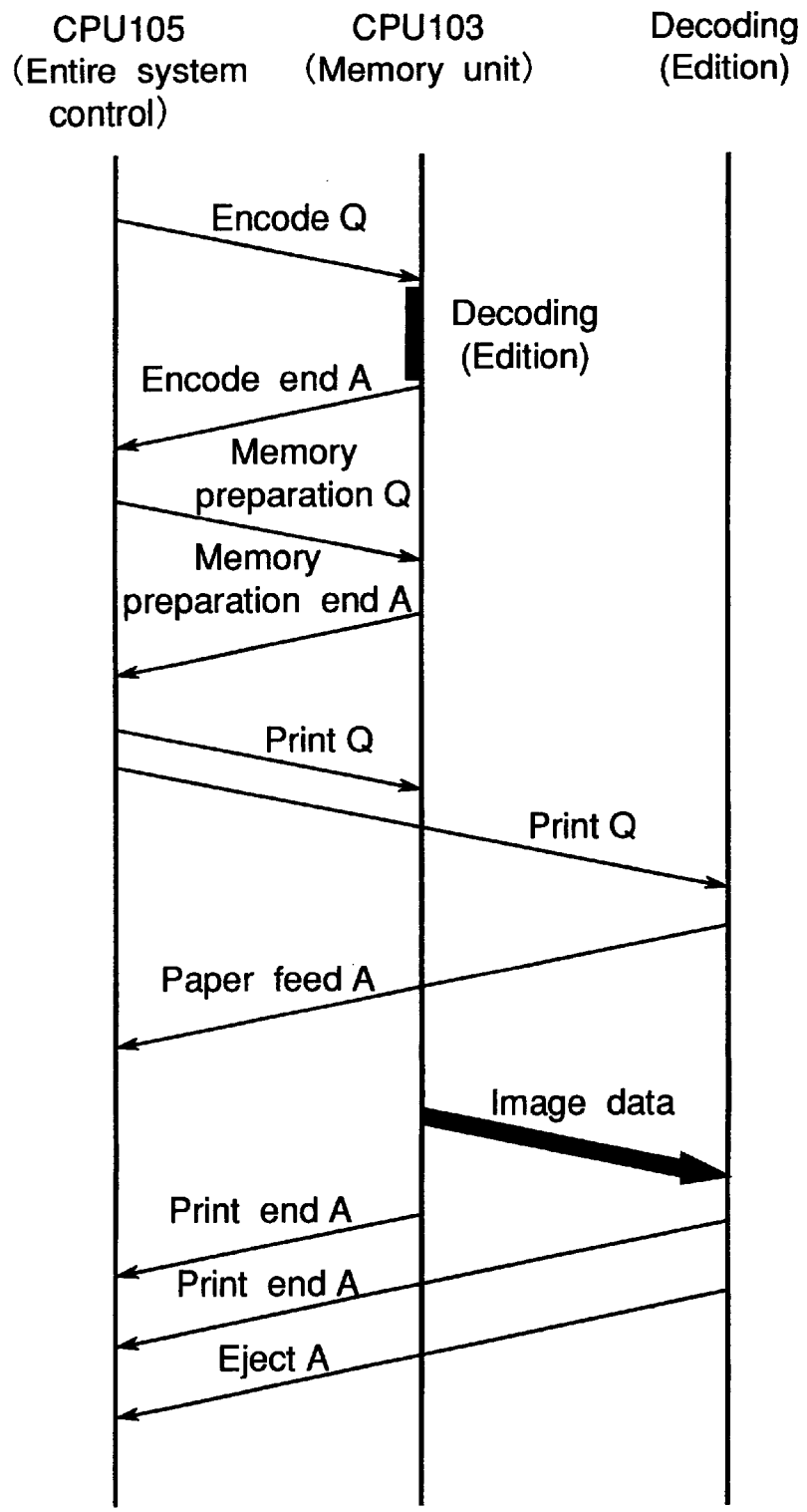
FIG. 9 is a sequence diagram of read from memory.

FIG. 9 shows a sequence diagram of read from memory, wherein image data are read from the image memory 304 and a reproduced image is printed on a paper based on the image data. First, the CPU 105 requests data expansion (decoding) to the CPU 103. Then, the CPU 103 sets read address for the code memory 306, XY length information, write address for the image memory 304, a mode of the decoder 312 such as arithmetic coding or modified Huffman coding, an edition mode such as tilt angle rotation and the like. Further it activates various parts. Then, the decoder 312 performs expansion (data decoding), and image data are written to the image memory 304. After the decoding is completed, the CPU 103 notifies decoding end to the CPU 105.

Next, the CPU 10 sends a memory preparation command to the CPU 103 for reading the image data from the image memory 304. Then, the CPU 103 sets bus connection for transmitting the image data from the image memory 304 to the print processor 40. Further, it sets a start address in a read area in the image memory 304, XY length information and the like. Then, the CPU 103 notifies memory preparation end report to the CPU 105.

Next, the CPU 105 sends a print instruction to the CPU 103 and to the print processor 40. Then, the print processor 40 sends a paper supply report which describes a paper supply status to the CPU 105. Then, image data read from the image memory 304 are sent to the print processor 40 for printing. After the printing is completed, the CPU 103 and the print processor 40 send print end report and eject end report to the CPU 105. The CPU 105 receives these reports and sends memory clear request to the memory 103 if necessary.

C. Document reading for a document at a tilt

Figure 10:
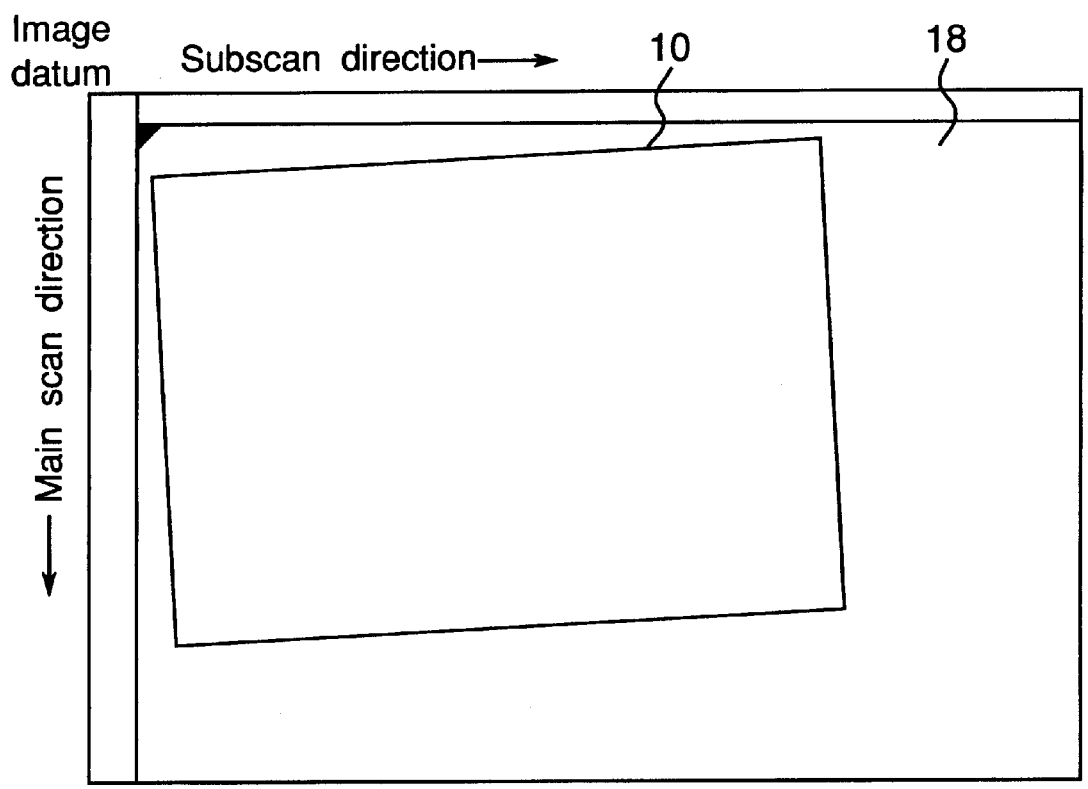
FIG. 10 is a diagram for explaining on reading a document image with scanning.

Image reading is explained when a document to be read is at a tilt on the platen glass 18. In FIG. 10, a document 10 is shown to be put on the platen glass 18 with face down. The platen glass 18 has a datum at the top-rightmost corner shown with a solid triangle in FIG. 10. The longitudinal direction of the platen glass 18 is the subscan direction when the document is scanned for reading, and a direction perpendicular thereto is the main scan direction. In the example shown in FIG. 10, the document is put off the image datum, and its direction is not parallel to the subscan direction. The document does not extend over the image read area in contrast an example dealt in a sixth embodiment explained later.

Figure 11:
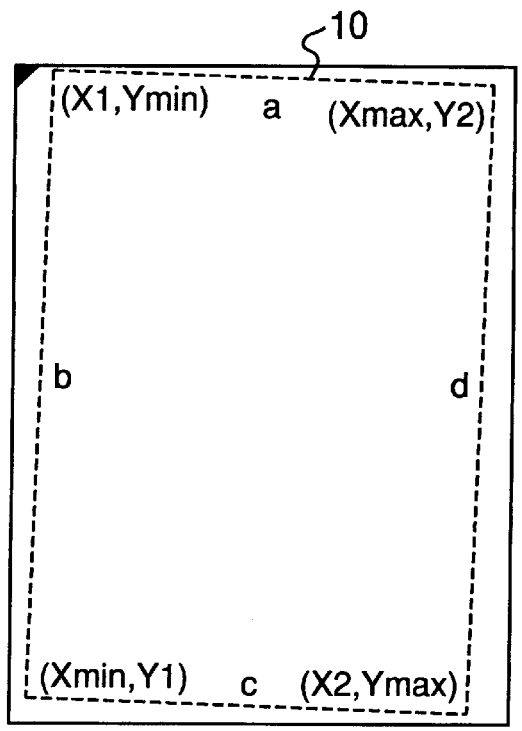
FIG. 11 is a diagram of an example of a document image which is read.
Figure 12:
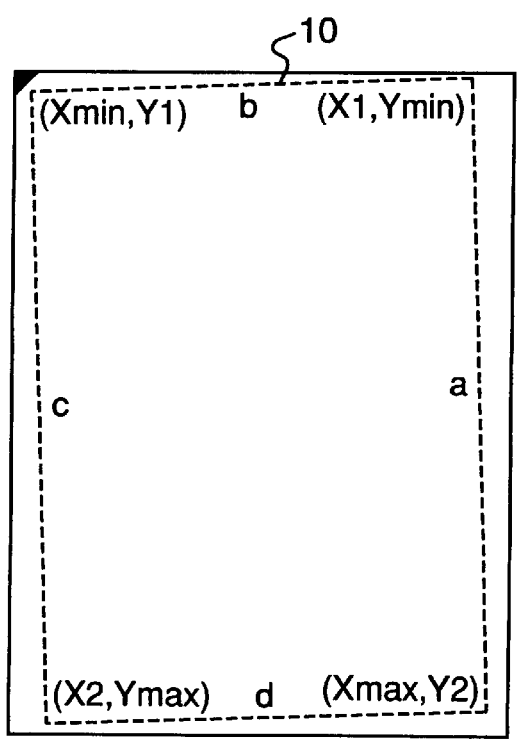
FIG. 12 is a diagram of another example of a document image which is read.

FIGS. 11 and 12 show two examples of read document image when the document (denoted with dashed lines) does not extend beyond the image read area (a rectangle area denoted with solid lines). Because the document 10 is viewed from the face to be read, the image datum is located at the top-leftmost corner. In the image processor 20, the image data of the rectangle area including at least the document area are processed to detect the document area. Then, as shown in FIGS. 11 and 12, the coordinates of the four corners of the rectangle document are detected from the coordinates of all the periphery thereof (that is, edges of the document). The main scan direction is X axis, the subscan direction is Y axis. Parameters $X_{max}$ and $X_{min}$ denote the maximum and minimum X coordinates, $X_1$ denotes the larger among the remaining two X coordinates and $X_2$ denotes the smaller among them. On the other hand, $Y_{min}$ and $Y_{min}$ denote the maximum and minimum Y coordinates, and $Y_1$ denotes the larger among the remaining two Y coordinates, and $Y_2$ denotes the smaller among them. In the example shown in FIG. 11, X and Y coordinates of the four corners are $(X_1, Y_{min})$, $(X_{max}, Y_2)$, $(X_{min}, Y_1)$, $(X_2, Y_{max})$. The lengths of the four sides "a", "b", "c" and "d" of the document 10 are calculated from the document coordinates as follows.

$$a = \sqrt{(X_{max}-X_1)^2 + (Y_2-Y_{min})^2},$$

$$b = \sqrt{(X_1-X_{min})^2 + (Y_1-Y_{min})^2},$$

$$c = \sqrt{(X_2-X_{min})^2 + (Y_{max}-Y_1)^2},$$

and $$d = \sqrt{(X_{max}-X_2)^2 + (Y_{max}-Y_2)^2}. \quad (1)$$

In the example shown in FIG. 12, the direction of the tilt of the document is different from the counterpart of FIG. 11, and X and Y coordinates of the four corners are $(X_{min}, Y_1)$, $(X_1, Y_{min})$, $(X_2, Y_{max})$, $(X_{max}, Y_2)$. The lengths of the four sides "a", "b", "c" and "d" of the document 10 are calculated from the document coordinates by the same formulae.

Edition parameters for correcting the tilted document are obtained as follows. First, if $X_1-X_{min} < Y_1-Y_{min}$ (FIG. 11), Rotation coordinates: $(X_1, Y_{min})$.

Rotation angle θ: $\tan^{-1} \{(X_1-X_{min})/(Y_1-Y_{min})\}$.

Destination address (pmdax, pmday): $(-X_1, -Y_{min})$. (2)

On the other hand, if $X_1-X_{min} > Y_1-Y_{min}$ (FIG. 12),

Rotation coordinates: $(X_{min}, Y_1)$.

Rotation angle θ: $\tan^{-1}\{(Y_1-Y_{min})/(X_1-X_{min})\}$.

Destination address (pmdax, pmday): $(-X_{min}, -Y_1)$. (3)

The rotation coordinates denotes the coordinates at the corner near the top-leftmost corner in FIGS. 11 and 12. The rotation angle θ is used to rotate the document at the position of the rotation coordinates to make the document parallel to the read area. The destination address denotes the coordinates to be transmitted to the memory, and it corresponds to a length between the top-leftmost position to the image datum.

D. Tilt angle correction by tilt angle rotation

When a tilt of a document is detected, the document image is rotated automatically by the tilt angle to provide a normal image without tilt. Therefore, for example, when a user puts a document at a tilt erroneously, a normal image thereof can be obtained by automatically rotating the image by the tilt angle. The rotation by the tilt angle uses a technique of arbitrary angle rotation for rotating image data by an arbitrary angle. The rotation by a tilt angle using the arbitrary angle rotation is called below as tilt angle rotation.

Figure 13:
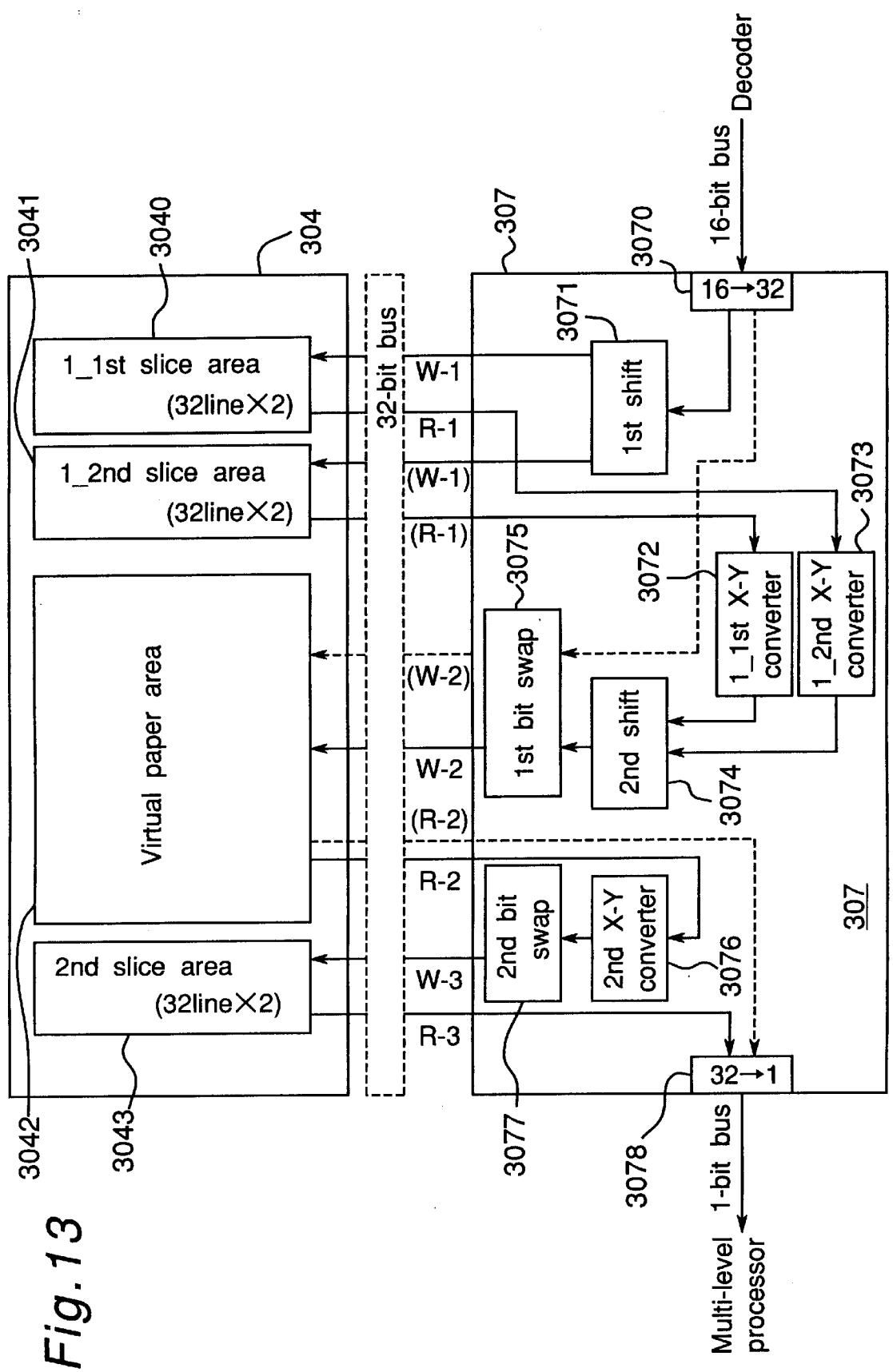
FIG. 13 is a block diagram of an editor in the memory unit.

The tilt angle rotation is performed by the edition processor 307 in the memory unit 30 based on the edition parameters detected by image reading. First, the edition processor 307 is explained. FIG. 13 is a block diagram of a part of the edition processor 307 related to the tilt angle rotation and of the image memory 304. Edition such as rotation in the edition processor 307 uses the image memory 304 and it combines shift, X-Y conversion and bit swap (refer to FIGS. 14 and 15). When the rotation is not performed (0° rotation), only the bit. swap is performed as shown with dashed lines, and only signals W2 and R2 are accessed.

In the rotation, input image data transmitted from the decoder 312 are 16-bit data, and they are converted by a 16→32 converter 3070 to 32-bit data. Thus, the data processing are all performed in 32 bits in order to speed up internal operations in the edition operator 307 and accesses to the image memory 304. If data after bit conversion are needed, a first shift section 3071 performs shift on a data and writes the sifted data to a 1__1 slice area 3040 and a 1__2 slice area 3041 in the image memory 304. A 1__1 X-Y converter 3072 and a 1__2 X-Y converter 3073 perform X-Y conversion on data R1 read from the 1__1 slice area 3040 and the slice area 3041, respectively. If data after X-Y conversion are needed, a second shift section 3074 performs shift on the data after the bit conversion. If necessary, a first bit swap section 3075 performs bit swap on the data from the 16→32 converter 3070 or from the second shift section 3074 and writes the bit swap data to a virtual paper area 3042 in the image memory 304 which has a capacity of A3 size at maximum. When the data are output for printing, if necessary, a second X-Y converter 3076 performs X-Y conversion on data R2 read from the virtual paper area 3042 by a second bit swap section 3077 and writes the data to a second slice area 3043 in the image memory 304. When printing is performed, R2 data read from the virtual paper area 3042 or R3 data read from the second slice area 3043 are converted to 1-bit data by a 32→1 converter 3078, and it is sent to the multi-level processor 308. On continuous operation, accesses to the image memory 304 (signals W1–W3 and R1 R3) are processed in parallel in time sharing through the 32-bit bus line.

Next, by referring to FIG. 14, 90° rotation of image data is explained. The input image transmitted from the decoder 312 are received with the image datum at the top-leftmost side in FIG. 14. Then, the input image is read in the unit of 32 bits * 32 bits from the data of 32 bits * 32 lines in the 1__1 X-Y slice area 3040 and edited by the 1__1 X-Y converter 3072. Next, for the 90° rotation, the data is read and written to the virtual paper area 3042 so as to have the image datum, or the destination address (pmdax, pmday), at the bottom-leftmost end. The 1__1 X-Y slice area 3040 and the 1__2 X-Y slice area 3041 form a pair, and the above processing is performed as double-buffers operation.

Next, bit swap of the image data by the 1__1 and 1__2 bit swap sections 3040, 3041 is explained with reference to FIGS. 15A and 15B. In the processing, as shown in FIG. 15A, the alignment of the 32-bit data is reversed. Then, as shown in FIG. 15B, the reversed data are written to the virtual paper area 3042 with the image datum (destination address) at the bottom-rightmost end. Further, 270° rotation is performed by combining the 90° rotation and the bit swap processing with the image datum at the top-rightmost end.

In the editor 307, translation of the image can be performed at the same time by changing the transmission address (or destination address) of the image datum to the virtual paper area. Further, erase, copy, paste or the like of an image at a specified area can also be performed, though not explained here.

Next, calculation for the tilt angle rotation is explained. The following equations show rotation in affine transformation. As shown in Eq. (4), coordinates (X, Y) are rotated by an angle θ to coordinates (U, V). The calculation is decomposed as shown in Eq. (5) as a combination of first shift, 90° rotation, second shift and −90° rotation. The editor 307 performs the calculation by combining these processes. In the first and second shifts, only X-axis parameter is processed while Y-axis parameter is fixed.

$$\begin{pmatrix} U \\ V \end{pmatrix} = \begin{pmatrix} \cos\theta & \sin\theta \\ -\sin\theta & \cos\theta \end{pmatrix}\begin{pmatrix} X \\ Y \end{pmatrix} = \frac{1}{\sqrt{s^2+t^2}}\begin{pmatrix} s & t \\ -t & s \end{pmatrix}\begin{pmatrix} X \\ Y \end{pmatrix} \quad (4)$$

$$= \begin{pmatrix} 0 & -1 \\ 1 & 0 \end{pmatrix}\begin{pmatrix} 1/\cos\theta & \tan\theta \\ 0 & 1 \end{pmatrix}\begin{pmatrix} 0 & 1 \\ -1 & 0 \end{pmatrix}\begin{pmatrix} \cos\theta & \sin\theta \\ 0 & 1 \end{pmatrix}\begin{pmatrix} X \\ Y \end{pmatrix} \quad (5)$$

−90°, 2nd shift, 90°, 1st shift $$= \begin{pmatrix} 0 & -1 \\ 1 & 0 \end{pmatrix}\begin{pmatrix} z/s & t/s \\ 0 & 1 \end{pmatrix}\begin{pmatrix} 0 & 1 \\ -1 & 0 \end{pmatrix}\begin{pmatrix} s/z & t/z \\ 0 & 1 \end{pmatrix}\begin{pmatrix} X \\ Y \end{pmatrix},$$

where $z=\sqrt{s^2+t^2}$.

Next, the reverse calculation for the above rotation address calculation is explained. Eqs. (6) and (7) show the reverse transformation of Eqs. (4) and (5).

$$\begin{pmatrix} X \\ Y \end{pmatrix} = \begin{pmatrix} \cos\theta & -\sin\theta \\ \sin\theta & \cos\theta \end{pmatrix}\begin{pmatrix} U \\ V \end{pmatrix} = \frac{1}{\sqrt{s^2+t^2}}\begin{pmatrix} s & -t \\ t & s \end{pmatrix}\begin{pmatrix} U \\ V \end{pmatrix} \quad (6)$$

$$= \begin{pmatrix} 1/\cos\theta & -\tan\theta \\ 0 & 1 \end{pmatrix}\begin{pmatrix} 0 & -1 \\ 1 & 0 \end{pmatrix}\begin{pmatrix} \cos\theta & -\sin\theta \\ 0 & 1 \end{pmatrix}\begin{pmatrix} 0 & 1 \\ -1 & 0 \end{pmatrix}\begin{pmatrix} U \\ V \end{pmatrix} \quad (7)$$

1st shift, 90°, 2nd shift, −90°

$$= \begin{pmatrix} z/t & -t/s \\ 0 & 1 \end{pmatrix}\begin{pmatrix} 0 & -1 \\ 1 & 0 \end{pmatrix}\begin{pmatrix} s/z & -t/z \\ 0 & 1 \end{pmatrix}\begin{pmatrix} 0 & 1 \\ -1 & 0 \end{pmatrix}\begin{pmatrix} U \\ V \end{pmatrix},$$

where $z=\sqrt{s^2+t^2}$.

Figure 16:
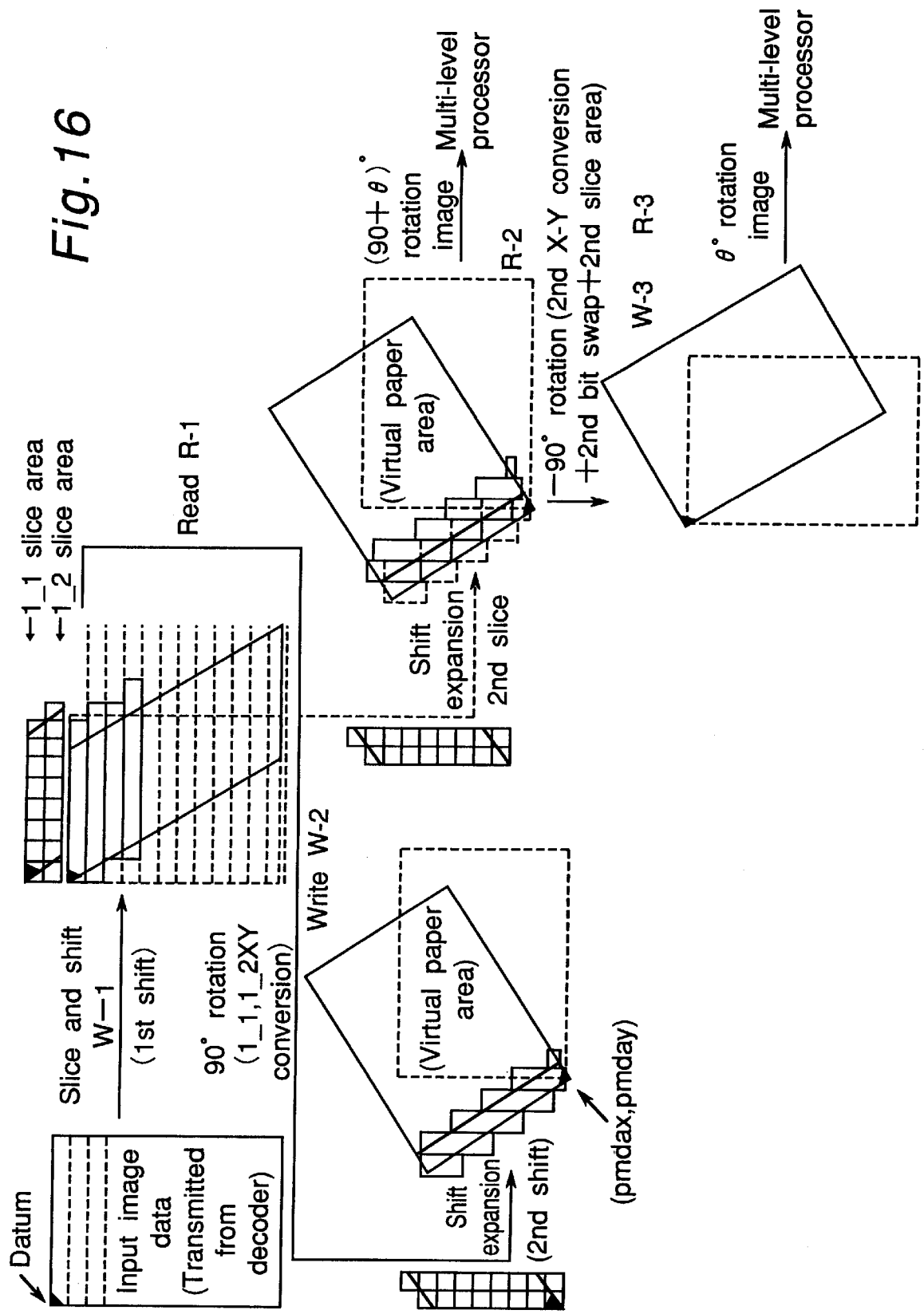
FIG. 16 is a diagram for explaining tilt angle rotation (shift-and-shift processing) of image data.

In the tilt angle rotation of image data, the image data are processed according to the above-mentioned calculation for tilt angle rotation. The tilt angle rotation (shift-and-shift technique) of image data is explained with reference to FIG. 16. In the editor 307, as shown at the top-leftmost side in FIG. 16, input image data are received from the decoder 312 with the datum at the top-leftmost end. The input image data are subjected to the first shift by the first shift section 3071 according to the set rotation angle θ, as shown at the top center in FIG. 16, and they are written to the 1_1 and 1_2 slice areas 3041 and 3042 in the unit of line. Next, the data are read from the 1_1 and 1_2 slice areas 3041 and 3042 in the unit of block of 32 bits * 32 bits and are processed by the 1_1 and 1_2 X-Y converters 3072 and 3073. Next, data of two blocks are subjected to the second shift by the second shift section 3074 according to the rotation angle θ, and the data are written to the virtual paper area 3042. The two slice areas 3040 and 3041 forms a pair, and the above-mentioned operation is performed as double-buffers operation. Thus, the image is brought to a state rotated by (90°+θ). When the data are output for printing from the virtual paper area 3042, −90° rotation (270° rotation) is processed by the second X-Y converter 3076 and the second bit swap section 3077. After they are buffered to the second slice area 3043 (bit conversion), they are sent to the multi-level processor 308. The rotation angle θ is desirable to be as small as possible in the above-mentioned shift-shift rotation, by considering the image quality after the rotation. Then, −45°<θ<45°. The rotation angle outside the range is processed by combining rotation in the unit of 90°.

Next, the relationship is explained for simultaneously processing the tilt angle rotation and magnification of image data. Eq. (8) shows rotation and magnification in the affine transformation, and the coordinates (X, Y) are rotated by an angle θ with a magnifying power of a to coordinates (U, V). It is decomposed as shown in Eq. (9) to first shift, 90° rotation, second shift and −90° rotation. In the first and second shifts, only X-axis parameters are processed while Y-axis parameter is fixed.

$$\begin{pmatrix} U \\ V \end{pmatrix} = \alpha\begin{pmatrix} \cos\theta & \sin\theta \\ -\sin\theta & \cos\theta \end{pmatrix}\begin{pmatrix} X \\ Y \end{pmatrix} = \frac{1}{\sqrt{s^2+t^2}}\begin{pmatrix} s & t \\ -t & s \end{pmatrix}\begin{pmatrix} X \\ Y \end{pmatrix} \quad (8)$$

$$= \begin{pmatrix} 0 & -1 \\ 1 & 0 \end{pmatrix}\begin{pmatrix} \alpha/\cos\theta & \tan\theta \\ 0 & 1 \end{pmatrix}\begin{pmatrix} 0 & 1 \\ -1 & 0 \end{pmatrix}\begin{pmatrix} \alpha\cos\theta & \sin\theta \\ 0 & 1 \end{pmatrix}\begin{pmatrix} X \\ Y \end{pmatrix} \quad (9)$$

−90°, second shift, 90°, first shift $$= \begin{pmatrix} 0 & -1 \\ 1 & 0 \end{pmatrix}\begin{pmatrix} \alpha z/s & t/s \\ 0 & 1 \end{pmatrix}\begin{pmatrix} 0 & 1 \\ -1 & 0 \end{pmatrix}\begin{pmatrix} \alpha s/z & t/z \\ 0 & 1 \end{pmatrix}\begin{pmatrix} X \\ Y \end{pmatrix},$$

where $z=\sqrt{s^2+t^2}$.

Next, the reverse calculation for the above rotation address calculation is explained. Eqs. (10) and (11) show the reverse transformation of Eqs. (8) and (9).

$$\begin{pmatrix} X \\ Y \end{pmatrix} = \frac{1}{\alpha}\begin{pmatrix} \cos\theta & -\sin\theta \\ \sin\theta & \cos\theta \end{pmatrix}\begin{pmatrix} X \\ Y \end{pmatrix} = \frac{1}{\alpha\sqrt{s^2+t^2}}\begin{pmatrix} s & -t \\ t & s \end{pmatrix}\begin{pmatrix} U \\ V \end{pmatrix} \quad (10)$$

$$= \begin{pmatrix} 1/\alpha\cos\theta & -\tan\theta \\ 0 & 1 \end{pmatrix}\begin{pmatrix} 0 & -1 \\ 1 & 0 \end{pmatrix}\begin{pmatrix} \cos\theta/\alpha & -\sin\theta/\alpha \\ 0 & 1 \end{pmatrix}\begin{pmatrix} 0 & 1 \\ -1 & 0 \end{pmatrix}\begin{pmatrix} U \\ V \end{pmatrix} \quad (11)$$

first shift, 90°, second shift, −90°

$$= \begin{pmatrix} z/\alpha t & -t/s \\ 0 & 1 \end{pmatrix}\begin{pmatrix} 0 & -1 \\ 1 & 0 \end{pmatrix}\begin{pmatrix} s/\alpha z & -t/\alpha z \\ 0 & 1 \end{pmatrix}\begin{pmatrix} 0 & 1 \\ -1 & 0 \end{pmatrix}\begin{pmatrix} U \\ V \end{pmatrix},$$

where $z=\sqrt{s^2+t^2}$.

Figure 17:
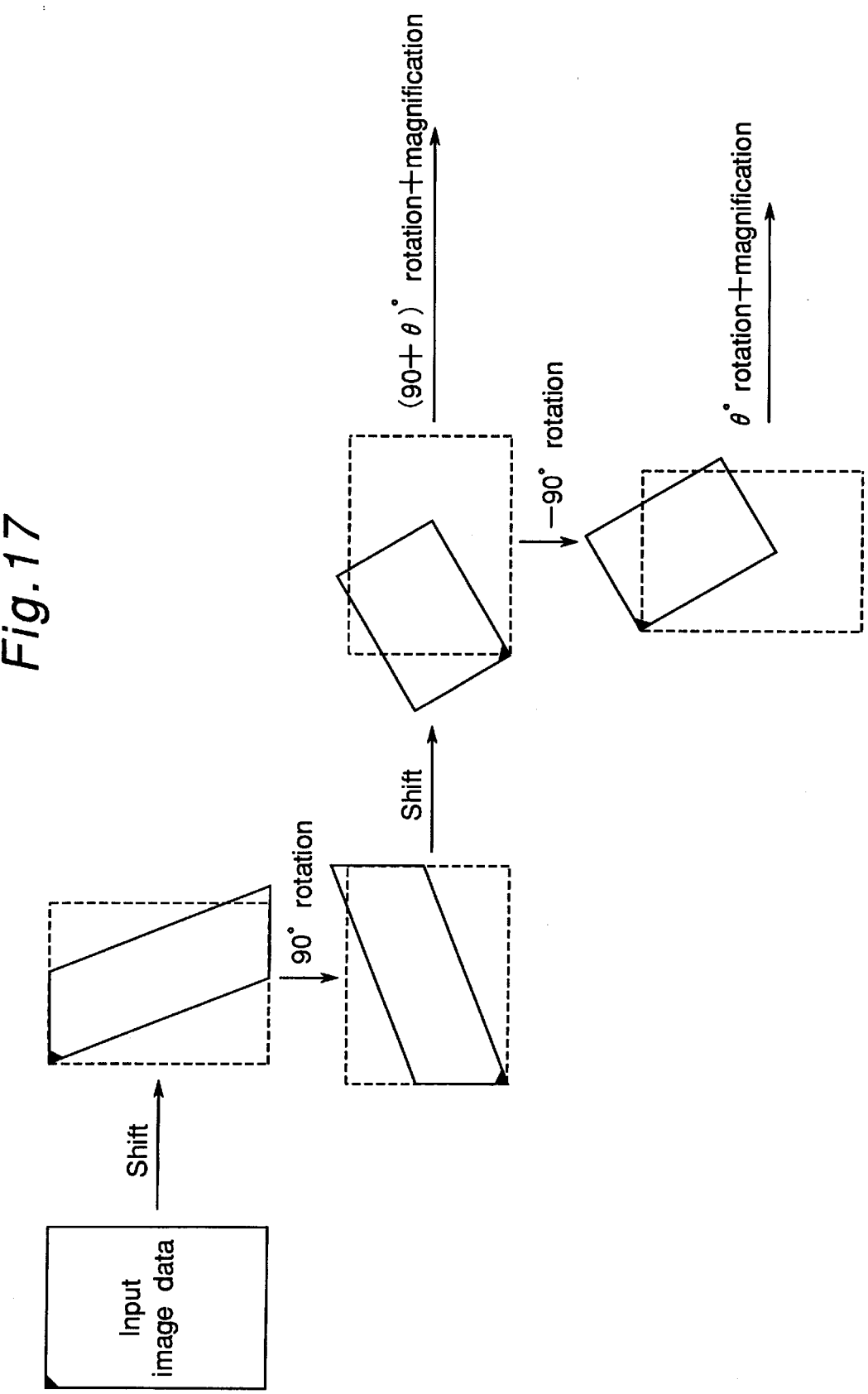
FIG. 17 is a diagram for explaining tilt angle rotation (shift-and-shift processing) and magnification of image data performed at the same time.

FIG. 17 shows the above-mentioned tilt angle rotation of image data. The operation consists of first shift, 90° rotation, second shift and −90° rotation. The magnification is performed by the editor 307 shown in FIG. 13 in the first and second shift sections by setting appropriate parameters for the magnification. For some parameters, it becomes necessary to increase the number in slice area. In this case, only the magnification is processed, and the rotation angle is set to 0° when the rotation is not performed.

E. Tilt angle rotation according to the properties of image

When the tilt angle of an image is corrected by rotation, the quality of the image obtained by the tilt angle rotation depends on the rotation angle. Further, the degree of deterioration of image quality is different among the types of images. If the input image data is a simple bi-level image such as a character image, the quality of the image nearly changes by the tilt angle rotation. However, if the input image data is a half-tone image, the quality is deteriorated after the tilt angle rotation. Correction such as smoothing or the like is necessary especially for a half-tone image on which image quality is important. Further, if deterioration of image quality is not favorable, it is desirable that the tilt angle correction is inhibited.

Then, in this embodiment, the rotation angle of input image is set according to 2-dimensional input image of a document on the platen glass, and the tilt of the image is corrected by rotating the input image by the set rotation angle. Further, smoothing is performed on the rotated image, when the rotation angle is larger than a predetermined angle (refer to FIGS. 25 and 27). The predetermined angle is for example 15°, and it is set by a user according to the characteristics of the image or to the degree of deterioration of image quality. Thus, when the image is corrected along the normal direction, smoothing is performed if the rotation angle is larger than the predetermined angle in order to decrease deterioration of image quality such as coarsening of image.

Figure 24:
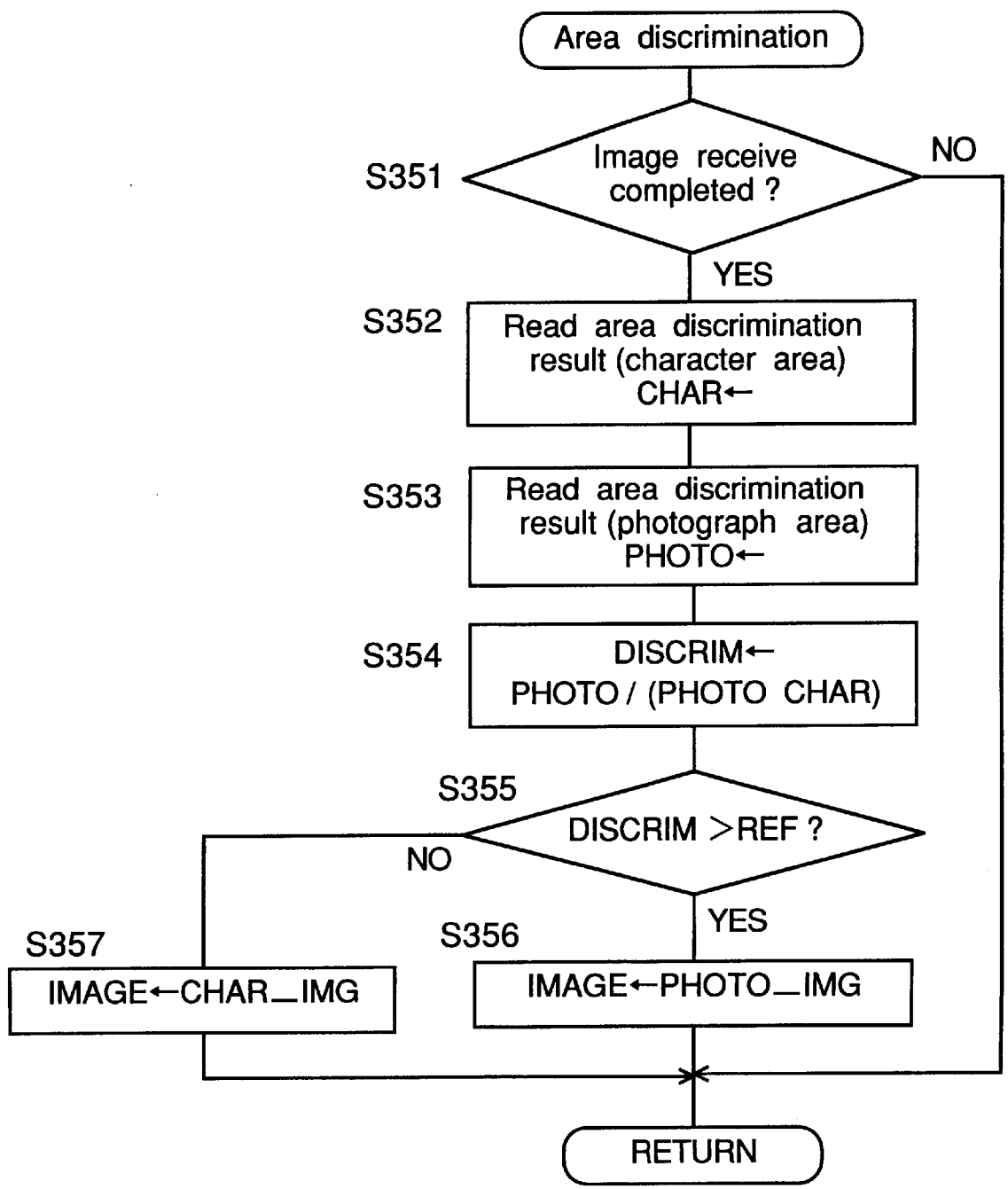
FIG. 24 is a flowchart of area discrimination.

It is checked further whether the input image data is a simple bi-level image or a half-tone image (refer to FIG. 24). Smoothing is performed if a ratio of half-tone image in the input image data obtained from the result of the image attribute decision is larger than a predetermined value or a ratio (refer to steps S355 and 356 in FIG. 24) and if the rotation angle is larger than the predetermined value. Smoothing is performed only for half-tone image because the image quality, is deteriorated largely for half-tone image, but not so largely for simple bi-level image.

Figure 18:
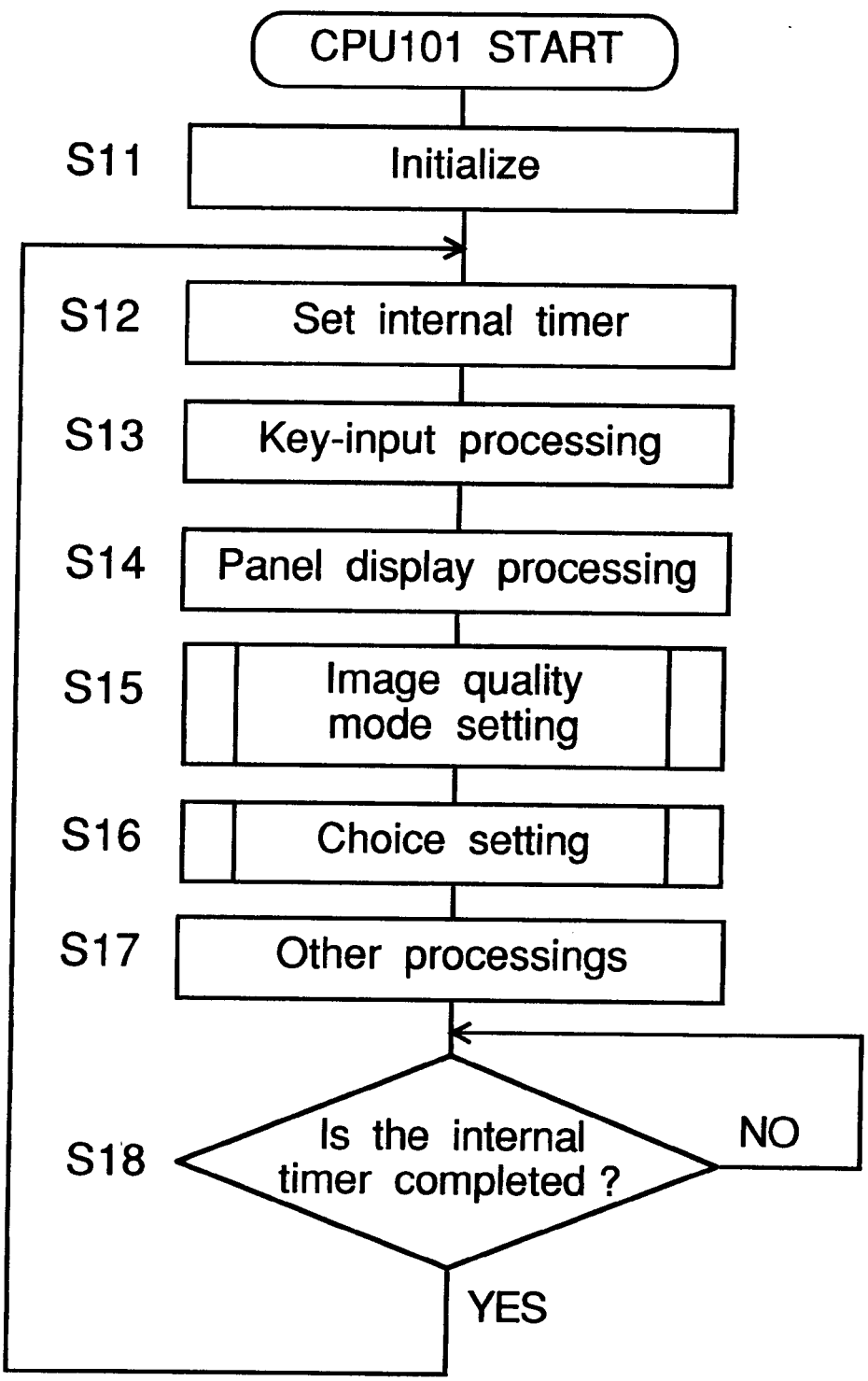
FIG. 18 is a main flowchart of a first CPU.

The copying machine has the operational panel for setting image quality mode with the key 98 by a user. If the set mode is photograph mode (half-tone image mode) (refer to step S363 in FIG. 25), smoothing is performed when the rotation angle is larger than the predetermined value. That is, in photograph mode, smoothing is performed in order to decrease influence of rotation to image a quality F. Control of copying machine Control flows of the copying machine will be explained below. FIG. 18 is a main flowchart of the first CPU 101 which controls the operational panel. When the electrical power source is turned on, first initialization is performed for initializing the RAM, registers or the like (step S11). Next, an internal timer which defines a time of one routine is set (step S12). Then, key-inputs are processed to receive key operation (step S13), and a display is performed in the panel, according to the key-input operation (step S14). Then, image quality mode is set (step S15), and choice setting is performed for the tilt angle rotation (step S16). After other processings are performed (step S17), it is waited that the internal timer is completed (YES at step S18). Then, the flow returns to step S12 to repeat the above processes.

Figure 19:
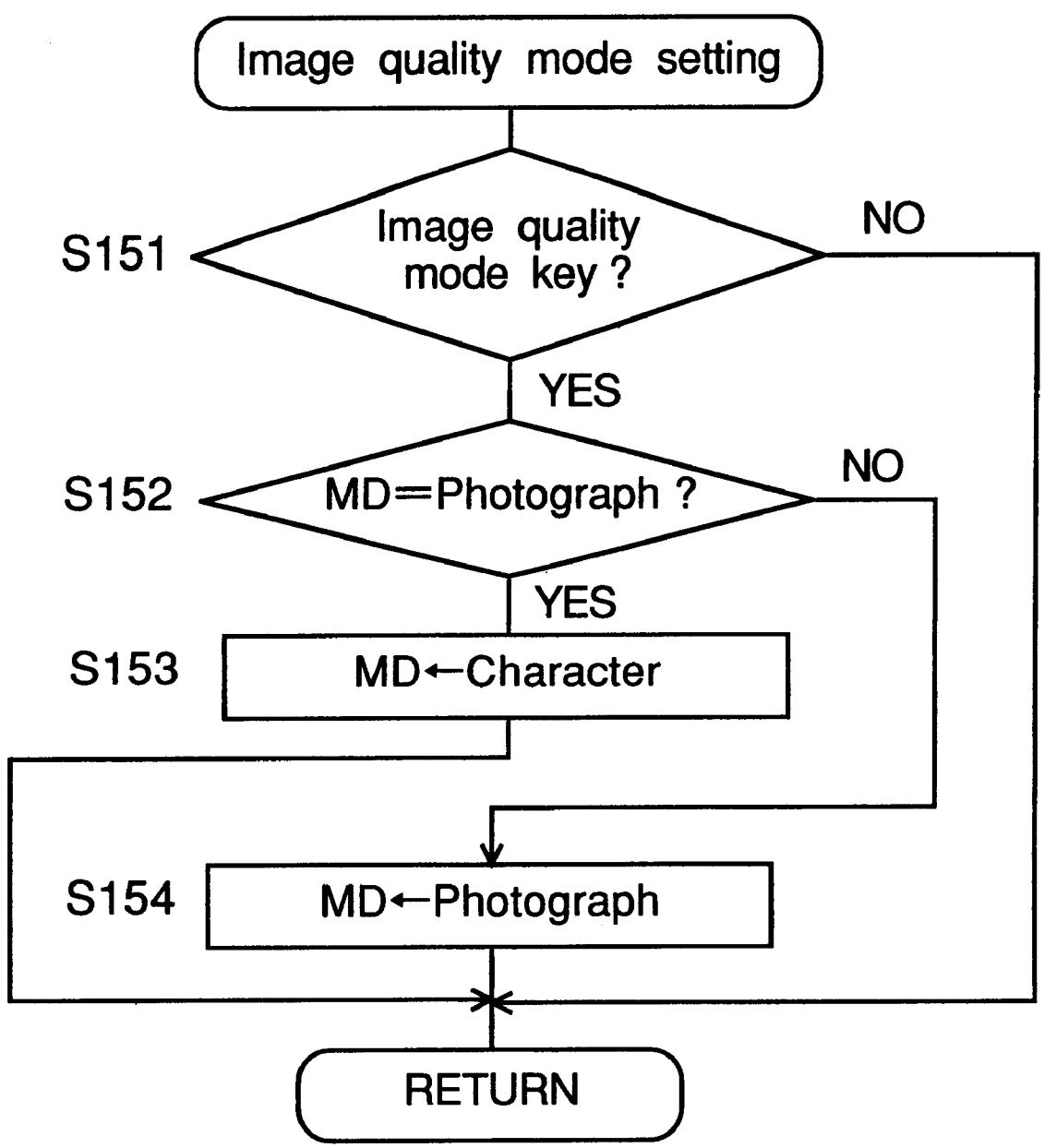
FIG. 19 is a flowchart of image quality mode setting.

FIG. 19 is a flowchart of the image quality mode setting (step S15 in FIG. 18). When the image quality mode key 98 is pressed in the operational panel (YES at step S151), if the current image quality mode MD is decided to be photograph mode (YES at step S152), character mode is set (step S153), else photograph mode is set (step S154). Then, the flow returns to the main flow.

Figure 20:
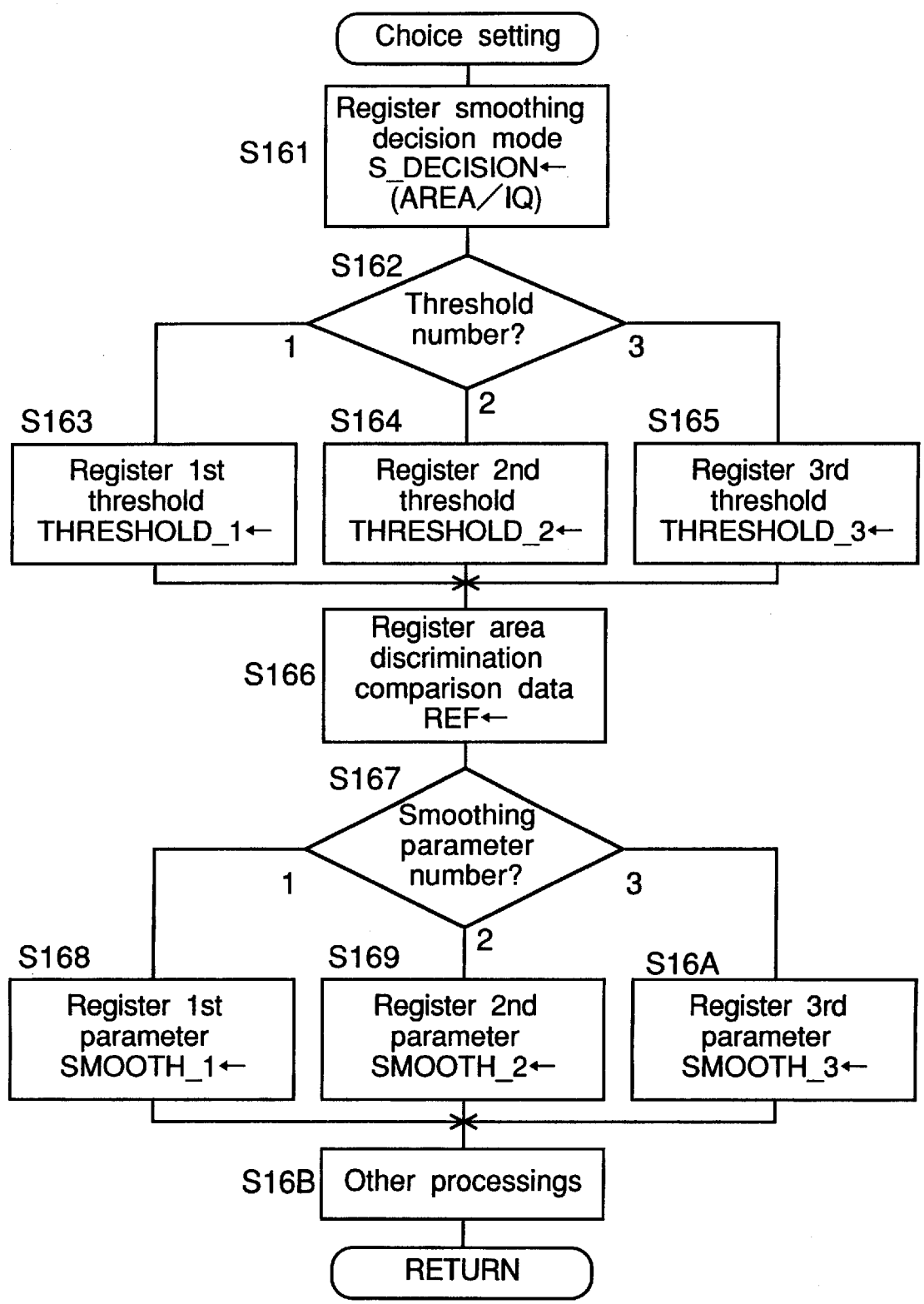
FIG. 20 is a flowchart of choice setting.

FIG. 20 is a flowchart of the choice setting (step S16 in FIG. 18). In the operational panel, an image for choice setting is displayed in the display panel 91, and various set values are input. First, area discrimination mode (AREA) or image quality mode (IQ) is registered as smoothing decision mode S_DECISION (step S161). Next, the flow branches according to threshold number (step S162), and one of a plurality of tilt angle thresholds is registered as THRESHOLD_1, THRESHOLD_2 or THRESHOLD_3 (steps S163–S165). Then, area discrimination comparison data is registered to REF (step S166). Next, the flow branches according to smoothing parameter number (step S167), and one of a plurality of smoothing parameters is registered as SMOOTH_1, SMOOTH_2 or SMOOTH_3 (steps S168–S16A). After other processings are processed, the flow returns to the main flow.

Figure 21:
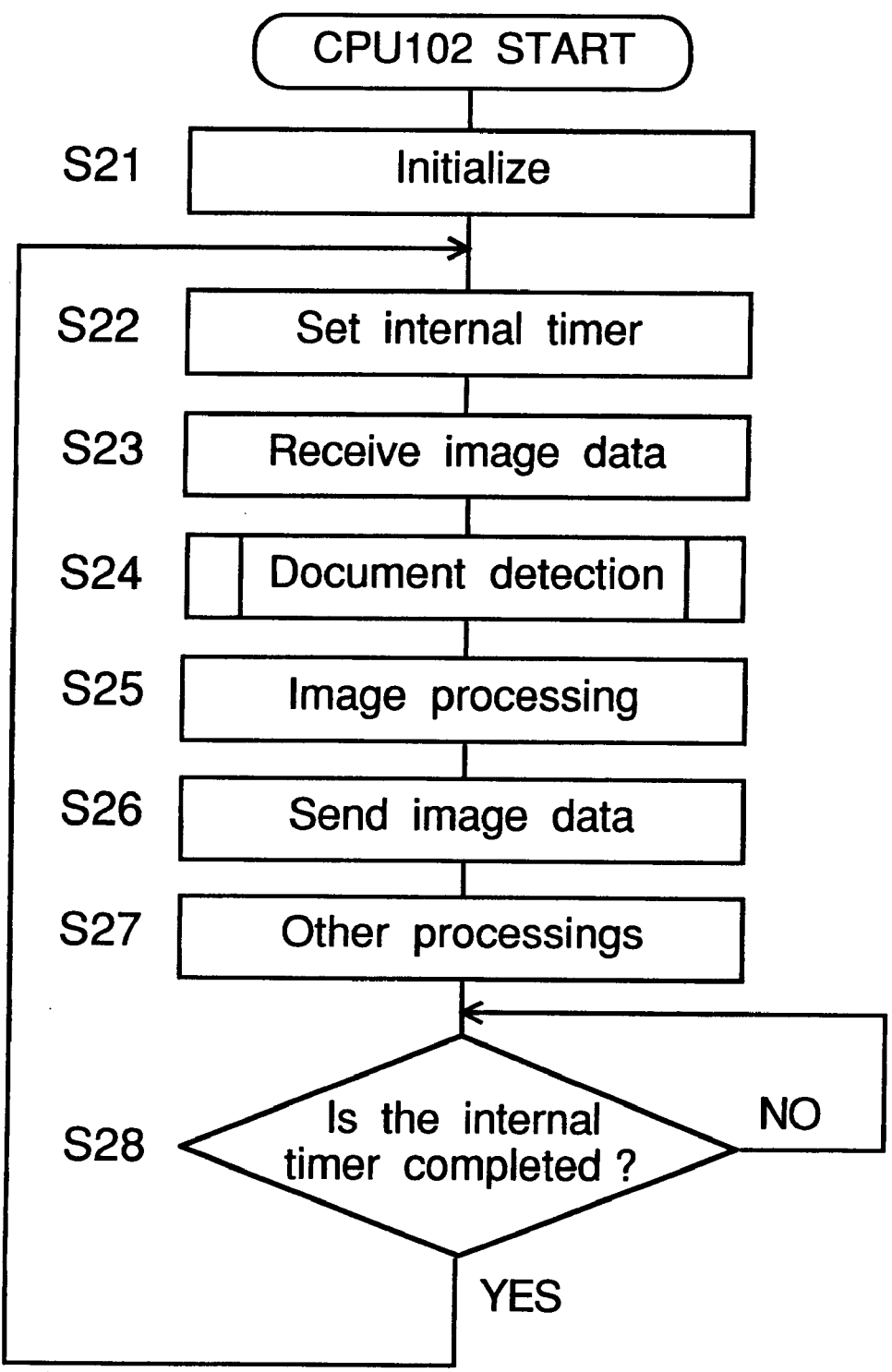
FIG. 21 is a main flowchart of a second CPU.

FIG. 21 is a main flowchart of the second CPU 102 which controls the image signal processor 20. After the RAM, the registers and the like are initialized (step S21), an internal timer which defines a time of one routine is set (step S22). Then, image data are received (step S23), document detection is performed (step S24), image processing is performed (step S25), and the image data are output (step S26). After other processings are performed, it is waited that the internal timer is completed (YES at step S27). Then, the flow returns to step S22 to repeat the above processes.

Figure 22:
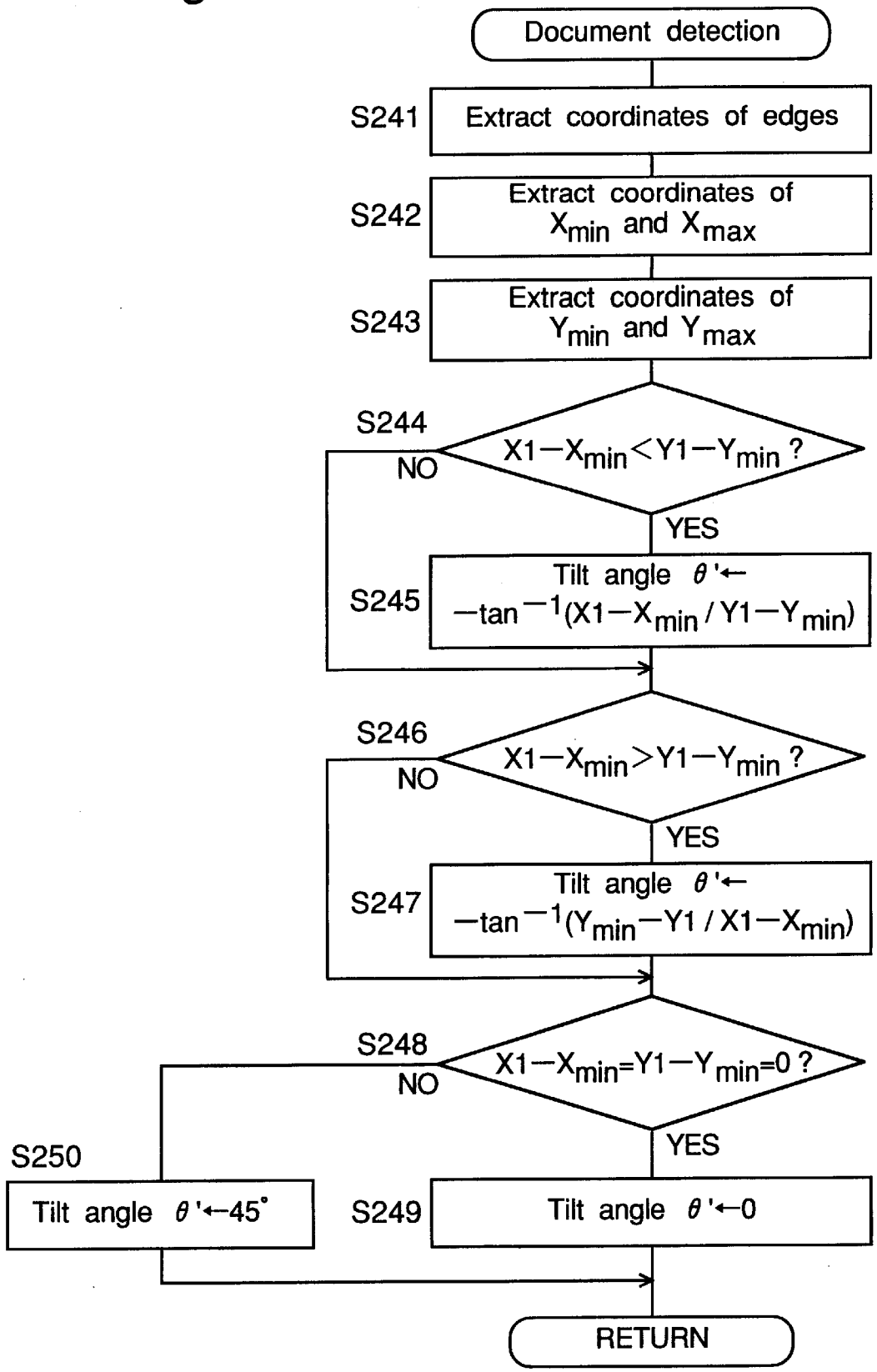
FIG. 22 is a flowchart of document detection.

FIG. 22 is a flowchart of the document detection (step S24 in FIG. 21). First, coordinates of edges of a document area are extracted, and straight lines consisting of a plurality of extracted coordinates are regarded as sides of the document area (step S241). Next, coordinates at points $X_{min}$ and $X_{max}$ and at points $Y_{min}$ and $Y_{max}$ (refer to FIGS. 11 and 12) are extracted (steps S242 and S243). If $X_1-X_{min}<Y_1-Y_{min}$ (YES at step S244), then $-\tan^{-1}\{(X_1-X_{min})/(Y_1-Y_{min})\}$ is set to inclination angle θ' (step S245). If $X_1-X_{min}>Y_1-Y_{min}$ (YES at step S246), then $-\tan^{-1}\{(Y_1-Y_{min})/(X_1-X_{min})\}$ is set to inclination angle θ' (step S247). Further, if $X_1-X_{min}=Y_1-Y_{min}$ (YES at step S248), 0 is set to inclination angle θ' (step S249), else 45° is set to inclination angle θ' (step S250).

Figure 23:
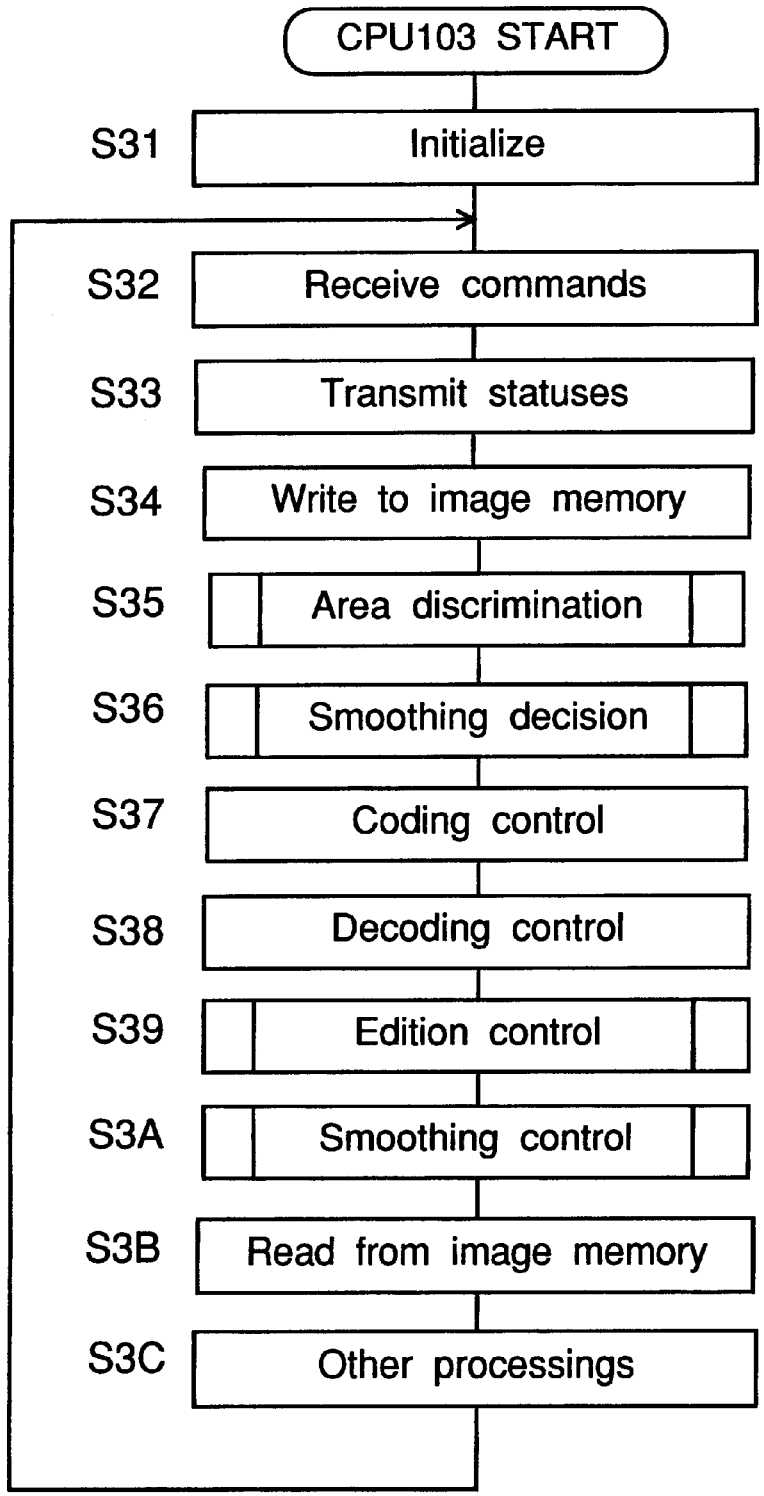
FIG. 23 is a main flowchart of a third CPU.

FIG. 23 is a main flowchart of the third CPU 103 which controls the memory unit 30. First the RAM, the registers and the like are initialized (step S31). Then, a command from the CPU 105 is received (step S32), a status is sent to the CPU 105 (step S33), write to the image memory is performed (step S34), areas are discriminated (step S35, refer to FIG. 24), smoothing decision is performed (step S36, refer to FIG. 25), and coding is controlled (step S37). Further, decoding is controlled (step S38), edition control is performed (step S39, refer to FIG. 26), smoothing control is performed (step S3A), and read from the image memory is performed (step S3B). After other processings are performed (step S3C), the flow returns to step S32 to repeat the above processes.

FIG. 24 is a flowchart of the area discrimination (step S35 in FIG. 23). In the area discrimination mode, character area and photograph area are discriminated in the input image, and it is decided according to a ratio of areas discriminated as character areas to those discriminated as photograph areas. When image data receive is completed (YES at step S351), image discrimination results are read, and CHAR and PHOTO are set for character areas and for photograph areas (steps S352 and S353). Next, a ratio, PHOTO/(PHOTO+CHAR), of the photograph areas to the entire image is set to calculation result DISCRIM (step S354). Then, the calculation result DISCRIM is compared with data REF for area decision comparison (step S355). If the calculation result DISCRIM is larger, photograph image (PHOTO_IMG) is set to area discrimination result IMAGE (step S356), else character image (CHAR_IMG) is set to IMAGE (step S357). The data REF for comparison is set in the choice setting.

Figure 25:
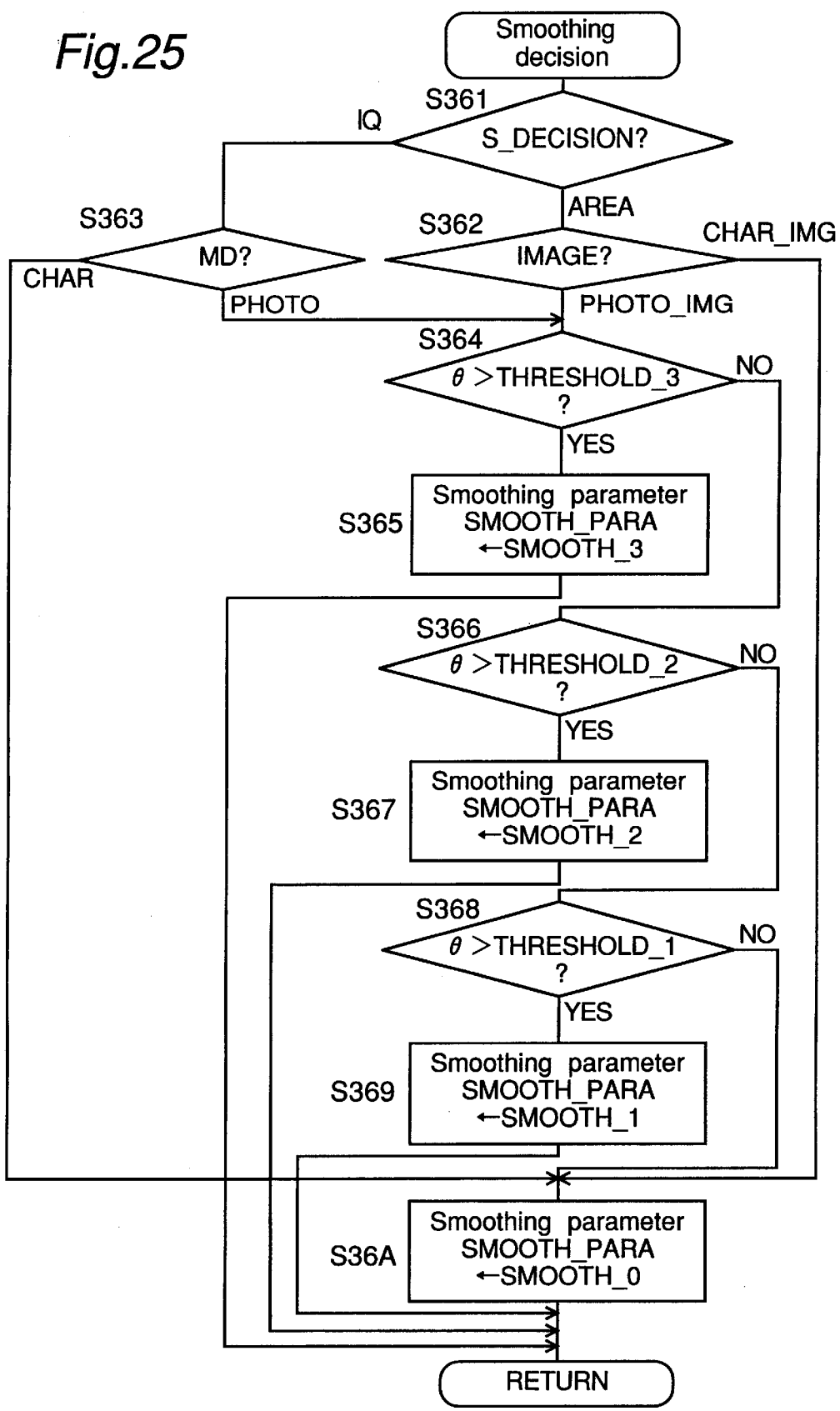
FIG. 25 is a flowchart of smoothing decision.

FIG. 25 is a flowchart of the smoothing decision (step S36 in FIG. 23). The flow branches first according to the smoothing decision mode S_DECISION (step S361). If the smoothing decision mode S_DECISION is area discrimination mode AREA, the flow branches according to the content of IMAGE (step S362). If the smoothing decision mode S_DECISION is image quality mode IQ, the flow branches further according as the image quality mode is photograph mode or character mode (step S363).

Smoothing is performed if the smoothing decision mode is photograph image PHOTO_IMG or if the image quality mode is photograph mode. The smoothing parameter is increased with increase in the magnitude of rotation angle. If the rotation angle is larger than the threshold THRESHOLD_3 (YES at step S365), SMOOTH_3 is set to a smoothing parameter SMOOTH_PARA (step S365). If the rotation angle is smaller than the threshold THRESHOLD_3 and larger than the threshold THREESHOLD_2 (YES at step S366), SMOOTH_2 is set to the smoothing parameter SMOOTH_PARA (step S367). If the rotation angle is smaller than the threshold THREESHOLD_2 and larger than the threshold THREESHOLD_1 (YES at step S368), SMOOTH_1 is set to the smoothing parameter SMOOTH_PARA (step S369). If the rotation angle is smaller than the threshold HRESHOLD_1 (NO at step S368), SMOOTH_0 is set to the smoothing parameter SMOOTH_PARA (step S369). If the smoothing decision mode is character image CHAR_IMG, or if the image quality mode is character image mode, the flow proceeds readily to step S36A to set the smoothing parameter SMOOTH_PARA to SMOOTH_0.

Figure 28:
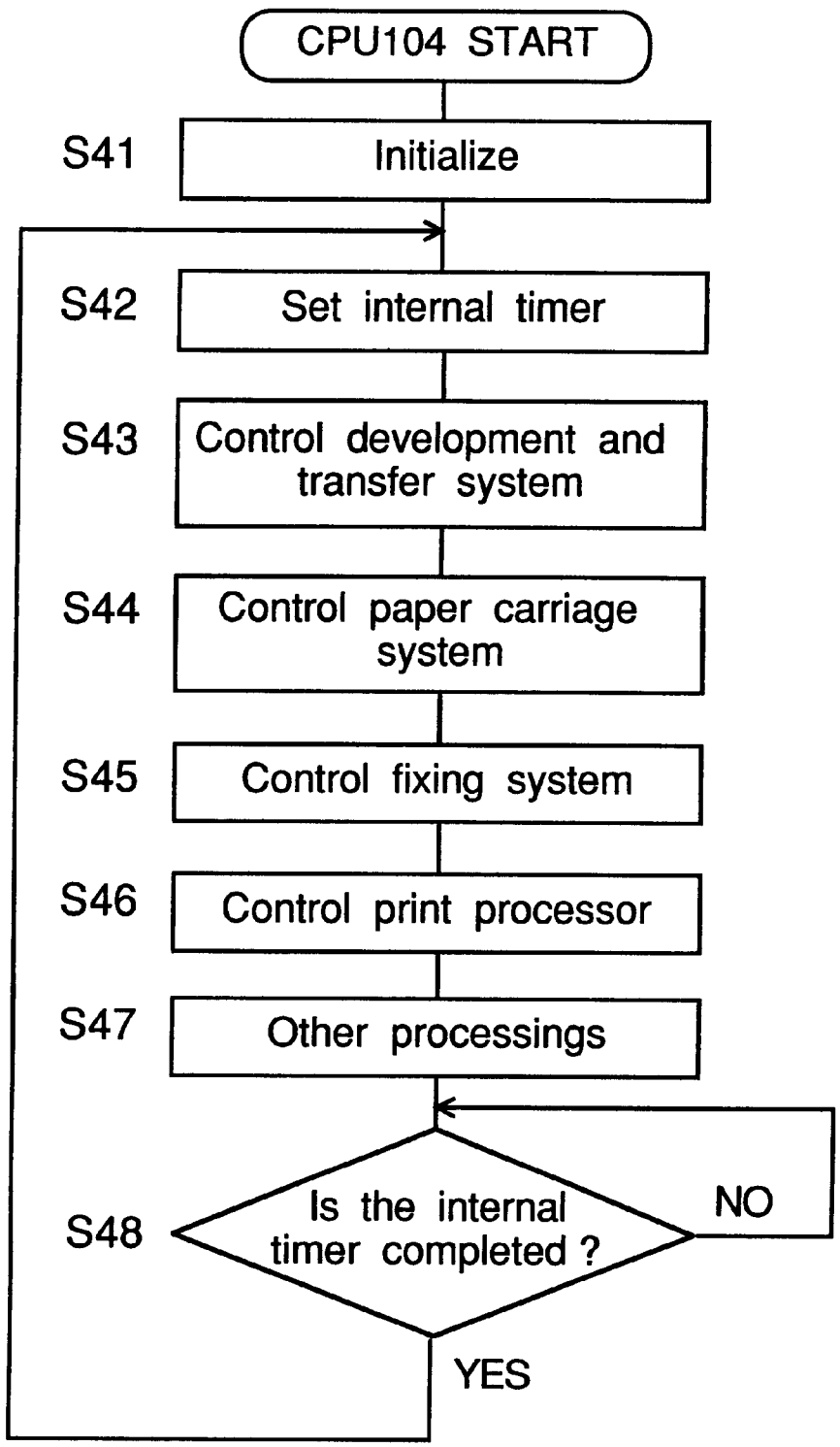
FIG. 28 is a main flowchart of a fourth CPU.

As explained above, for a character image, the smoothing parameter is set to SMOOTH_0 because image deterioration due to image rotation is small. (As shown in FIG. 28, smoothing is inhibited in this case.) On the other hand, for a photograph image, smoothing is performed because influence of image rotation to image quality is large, but the smoothing parameter is increased as the rotation angle increases.

Figure 26:
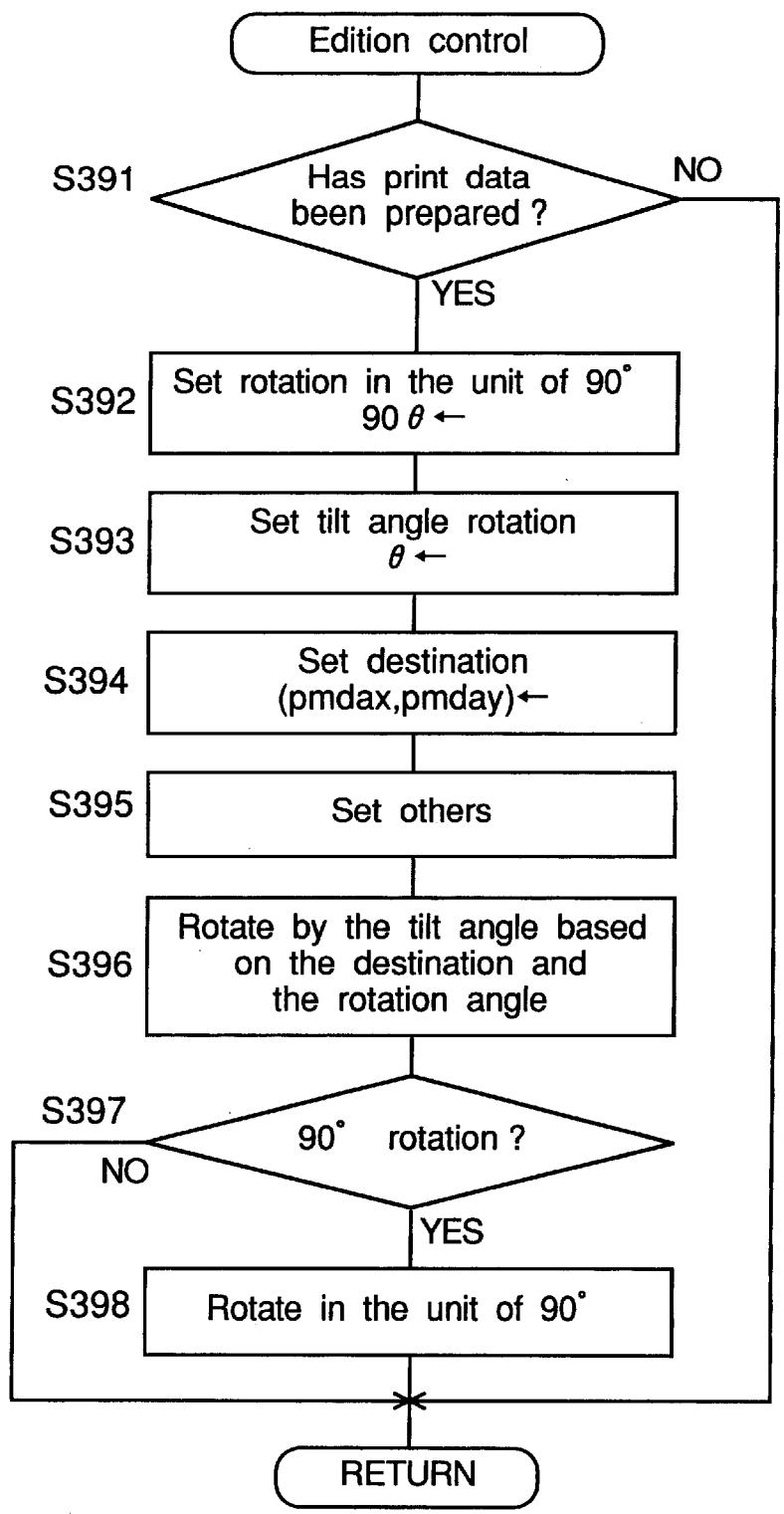
FIG. 26 is a flowchart of edition control.

FIG. 26 is a flowchart of the edition control (step S39 in FIG. 23). When data for printing have been stored in the code memory 306 (YES at step S391), following parameters are set: Rotation parameter in the unit of 90° (step S392), tilt angle rotation parameter (step S393), destination parameter (pmdax, pmday) (step S394), and other parameters (step S395). Then, the tilt angle rotation is performed according to the destination and the rotation angle set above (step S396). Next, if it is decided that rotation in the unit of 90° is necessary (YES at step S397), the image is rotated in the unit of 90° (step S398).

Figure 27:
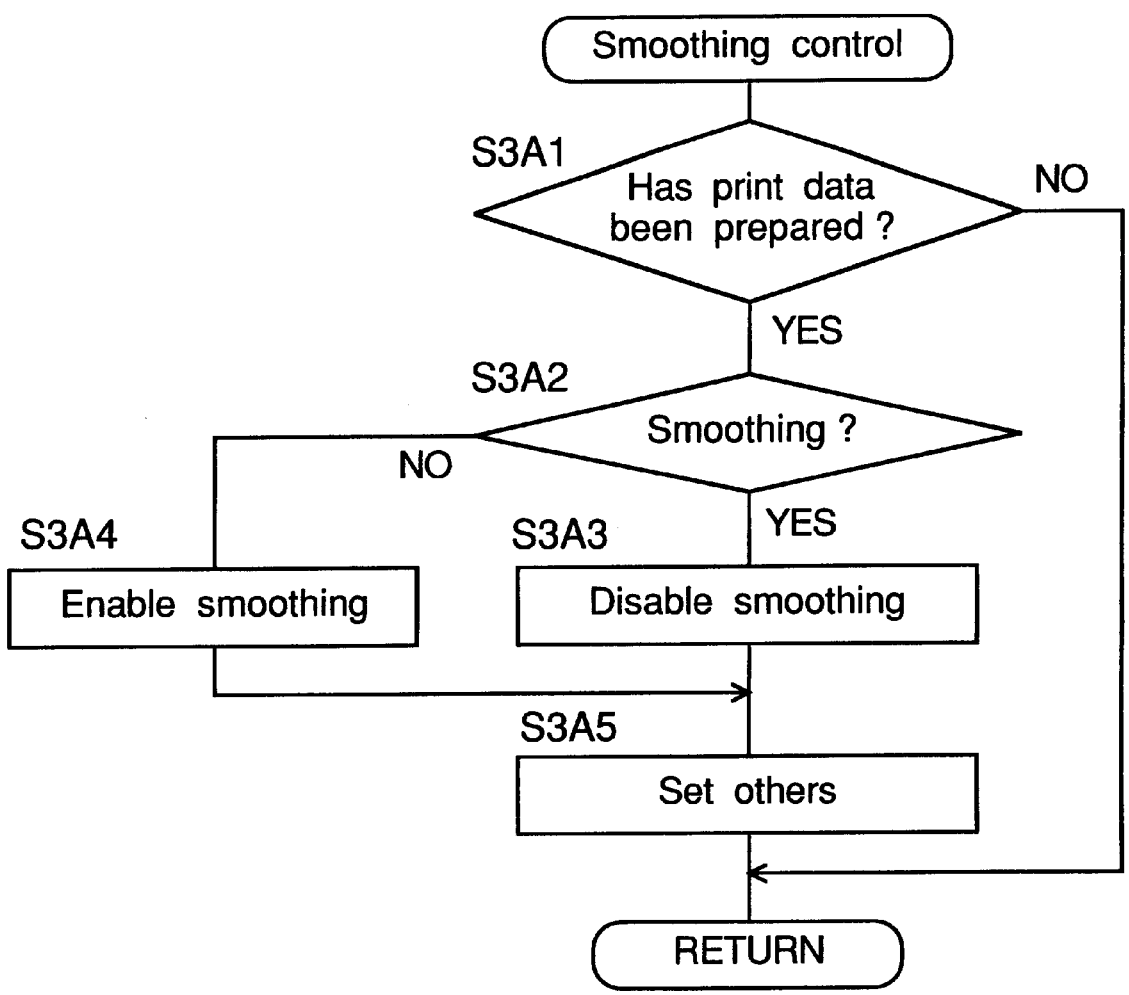
FIG. 27 is a flowchart of smoothing control.

FIG. 27 is a flowchart of the smoothing control (step S3A in FIG. 23). When data for printing have been stored in the code memory 306 (YES at step S3A1), if the smoothing parameter SMOOTH_PARA is decided to be SMOOTH_0 (YES at step S3A2), the smoothing is set disable (step S3A3), else the smoothing is set enable (stepS3A4). Then, otherparameters are set (stepS3A5).

FIG. 28 is a main flowchart of the fourth CPU 104 for controlling the printer 300. First the RAM, the registers and the like are initialized (step S41). Next, an internal timer which defines a time of one routine is set (step S42). Then, the development and transfer system (step S43), the paper carriage system (step S44), the fixing system (step S45), the print processor (step S46) are controlled. Further, after other processings are performed (step S47), it is waited that the internal timer is completed (YES at step S48). Then, the flow returns to step S42 to repeat the above processes.

Figure 29:
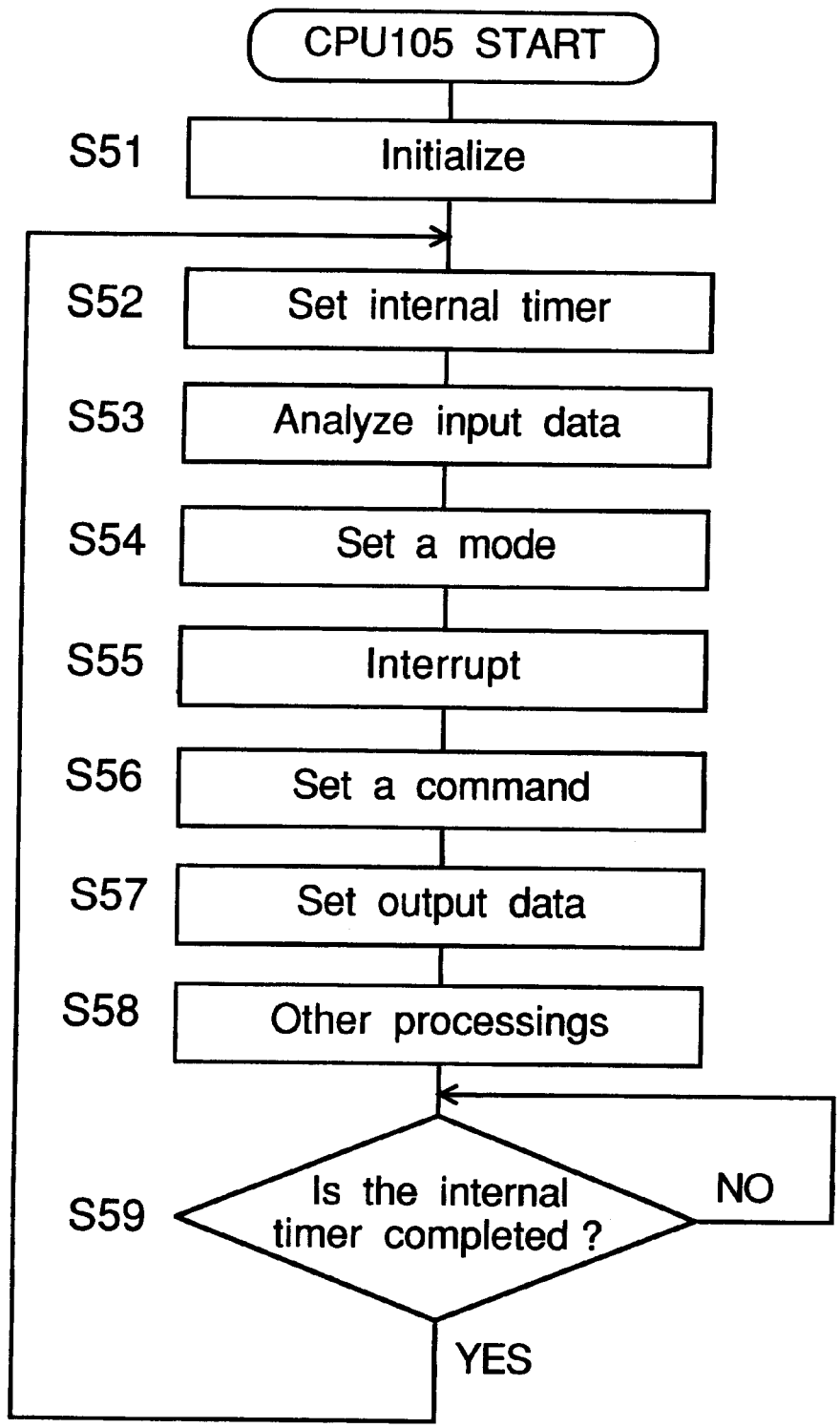
FIG. 29 is a main flowchart of a fifth CPU.

FIG. 29 is a main flowchart of the fifth CPU 105 which controls the entire copying machine. First, the RAM, the registers and the like are initialized (step S51). Next, an internal timer which defines a time of one routine is set (step S52). Then, following processing are performed successively: Input data analysis for checking input data from other CPUs (step S53), mode setting for setting an operation mode according to the contents of operation (step S54), switch due to interrupt (step S55), command setting according to the mode (step S56), and output data setting for providing a command to the communication port (step S57). Further, after other processings are performed (step S58), it is waited that the internal timer is completed (YES at step S59). Then, the flow returns to step S52 to repeat the above processes.

G. Digital copying machine of second embodiment

Next, a copying machine of a second embodiment of the invention is explained where the operation of the tilt angle rotation is allowed or inhibited according to the image attribute. The rotation angle is set according to the input 2-dimensional input image, and the tilt of the image is corrected by rotating the image by the rotation angle. In this processing, the image attribute of the input image data is decided, and the tilt angle rotation is allowed or inhibited according to the decided image attribute and the set rotation angle (refer to FIG. 32). That is, when the image deterioration is decided to be large, the tilt angle rotation is inhibited to prevent image deterioration. In an example shown in FIG. 31, the tilt angle rotation is inhibited if the amount of half-tone image is larger than a predetermined amount or ratio in the input image data and the rotation angle to be rotated in the tilt angle rotation is larger than a predetermined angle.

In a different way, the allowance/inhibition of the tilt angle rotation is controlled according to the image quality mode set by a user. When the image quality mode is set, the allowance/inhibition of the tilt angle rotation is controlled according to the set image quality mode (refer to FIG. 32). For example, when photograph mode (half-tone image mode) on which image deterioration is not favorable is set, the tilt angle rotation is inhibited.

The structure of the copying machine of the second embodiment of the invention is the same as the counterpart of the first embodiment shown in FIGS. 1–17, and the explanation is omitted here. The flowcharts on the control for the copying machine of the second embodiment have common parts to the counterparts of the first embodiment shown in FIGS. 18–29, and only different parts will be explained below.

Figure 30:
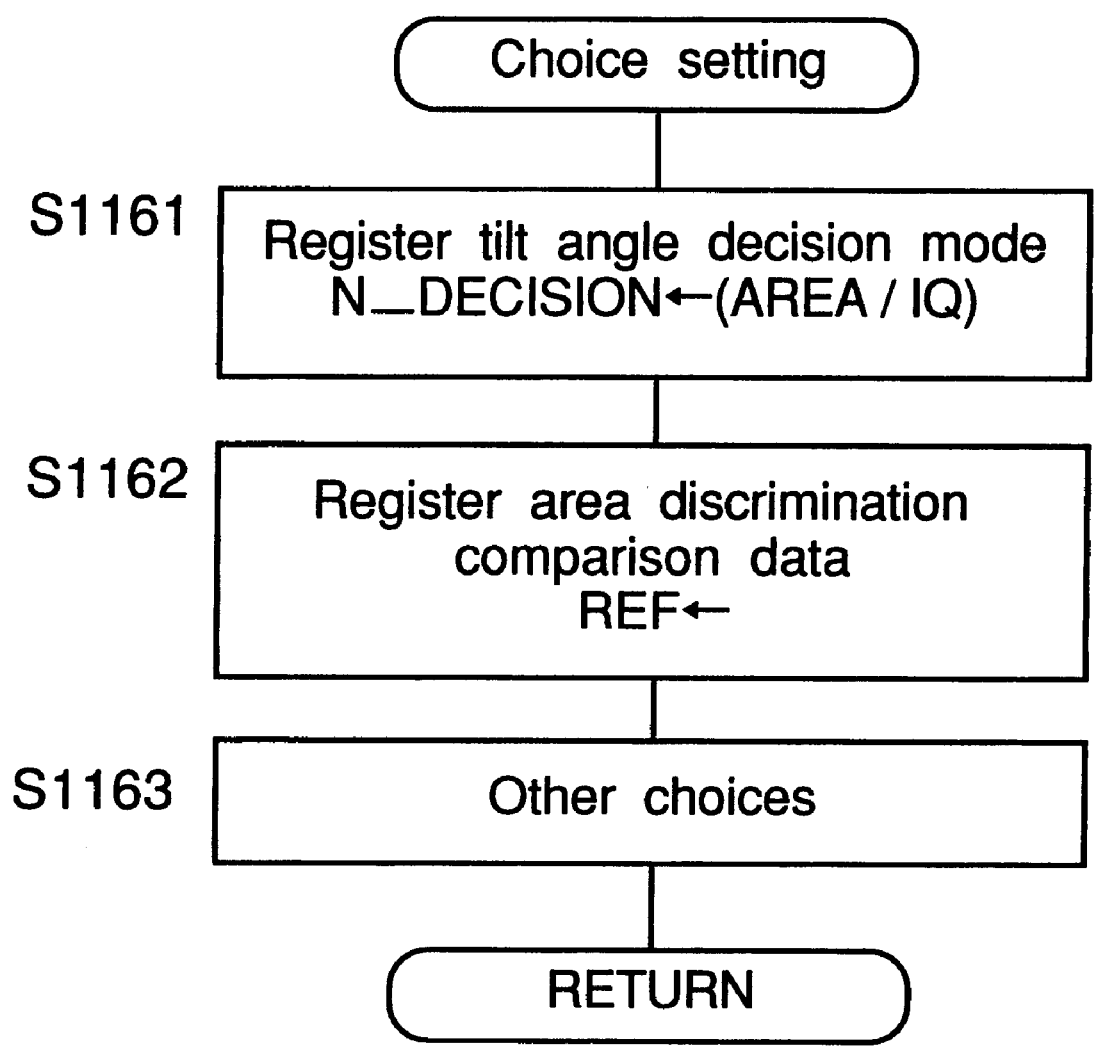
FIG. 30 is a flowchart of choice setting in a second embodiment of the invention.

FIG. 30 is a flowchart of the choice setting (step S15 in FIG. 15). In the operational panel, an image for choice setting is displayed. First, smoothing mode, area discrimination mode (AREA) or image quality mode (IQ), is registered as tilt angle decision mode N_DECISION (step S1161). That is, AREA is set for area discrimination mode, and IQ is set for image quality mode. Then, area discrimination comparison data is registered to REF (step S1162). After other choices are set (step S1163), the flow returns to the main flow.

Figure 31:
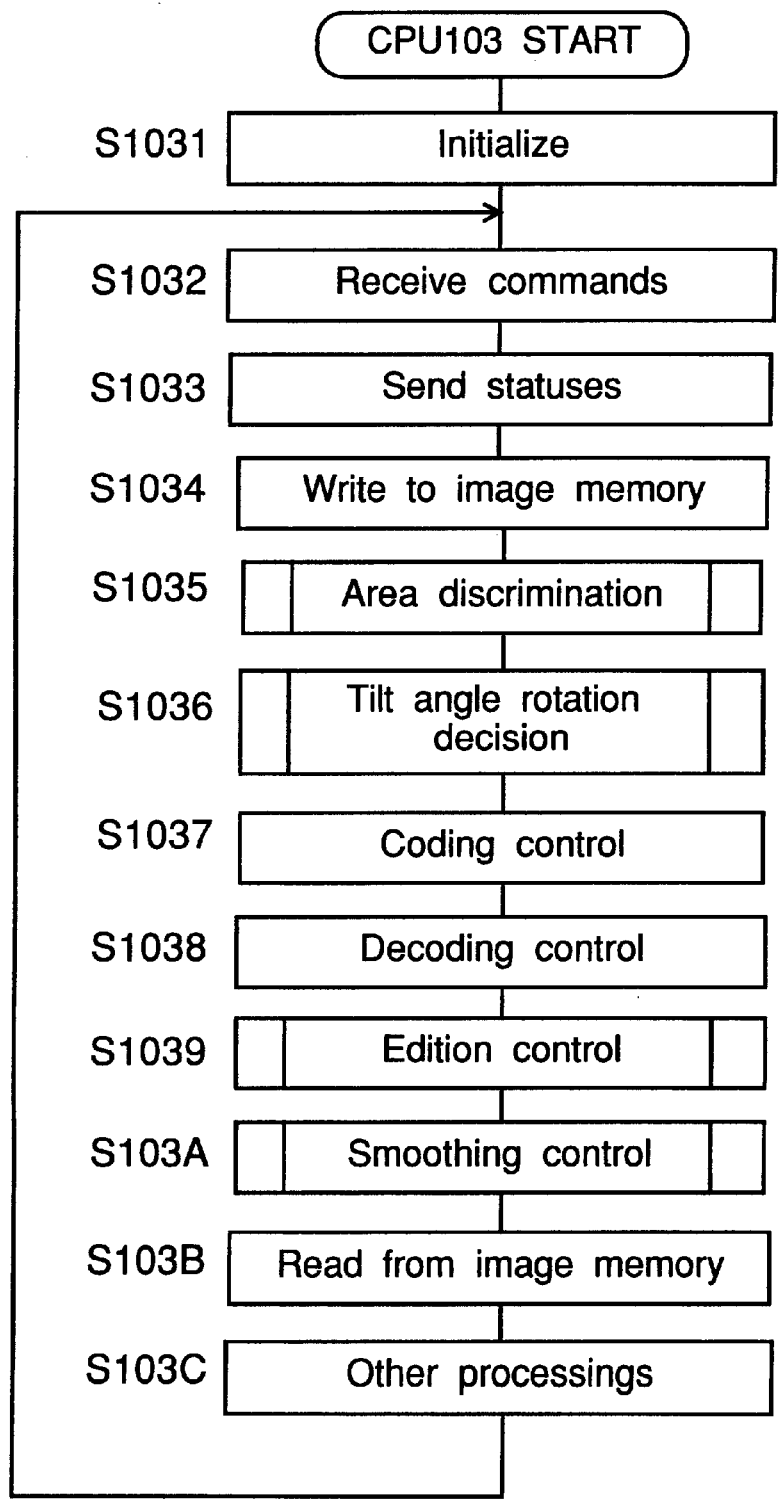
FIG. 31 is a main flowchart of the third CPU.

FIG. 31 is a main flowchart of the third CPU 103 which controls the memory unit 30. First, the RAM, the registers and the like are initialized (step S1031), and a command from the CPU 105 is received (step S1032). Then, when image data are read, a status is sent to the CPU 105 (step S1033), write to the image memory is performed (step S1034), areas are discriminated (step S1035), tilt angle rotation decision is performed (step S1036, refer to FIG. 32), and coding is controlled (step S1037). Further, when printing is performed, decoding is controlled (step S1038), edition control is performed (step S1039), smoothing control is performed (step S103A), and read from the image memory is performed (step S103B). After other processings are performed (step S103C), the flow returns to step S1032 to repeat the above processes.

Figure 32:
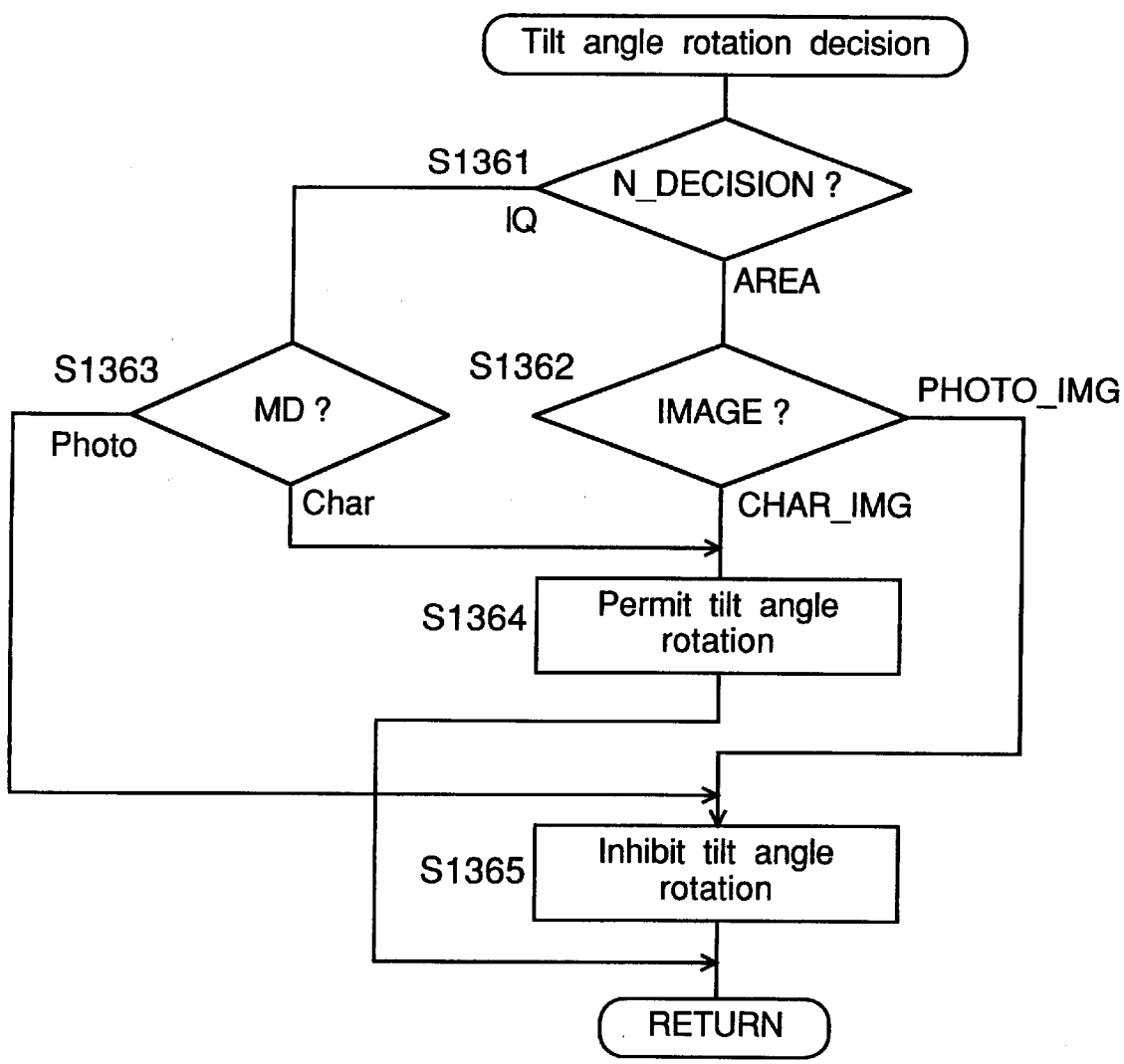
FIG. 32 is a flowchart of tilt angle rotation decision.

FIG. 32 is a flowchart of the tilt angle decision (S1036 in FIG. 31). The flow branches according to the tilt angle decision mode N_DECISION which is set in the choice processing (step S1361). If the tilt angle decision mode N_DECISION is area discrimination mode AREA, the flow branches further according to the content of the image quality mode IMAGE (step S1362). If the stilt angle decision mode N_DECISION is image quality mode IQ, the flow branches further according the content MD thereof (step S1363). If the image quality mode IMAGE is character image (CHAR_IMG), the tilt angle rotation is permitted (step S1364), while if it is photograph image (PHOTO_

IMG), the tilt angle rotation is inhibited (step S1365). On the other hand, if the content MD of the image quality mode is character mode (CHAR), the tilt angle rotation is permitted (step S1364), while if the content is photograph mode (PHOTO), the tilt angle rotation is inhibited (step S1365).

Figure 33:
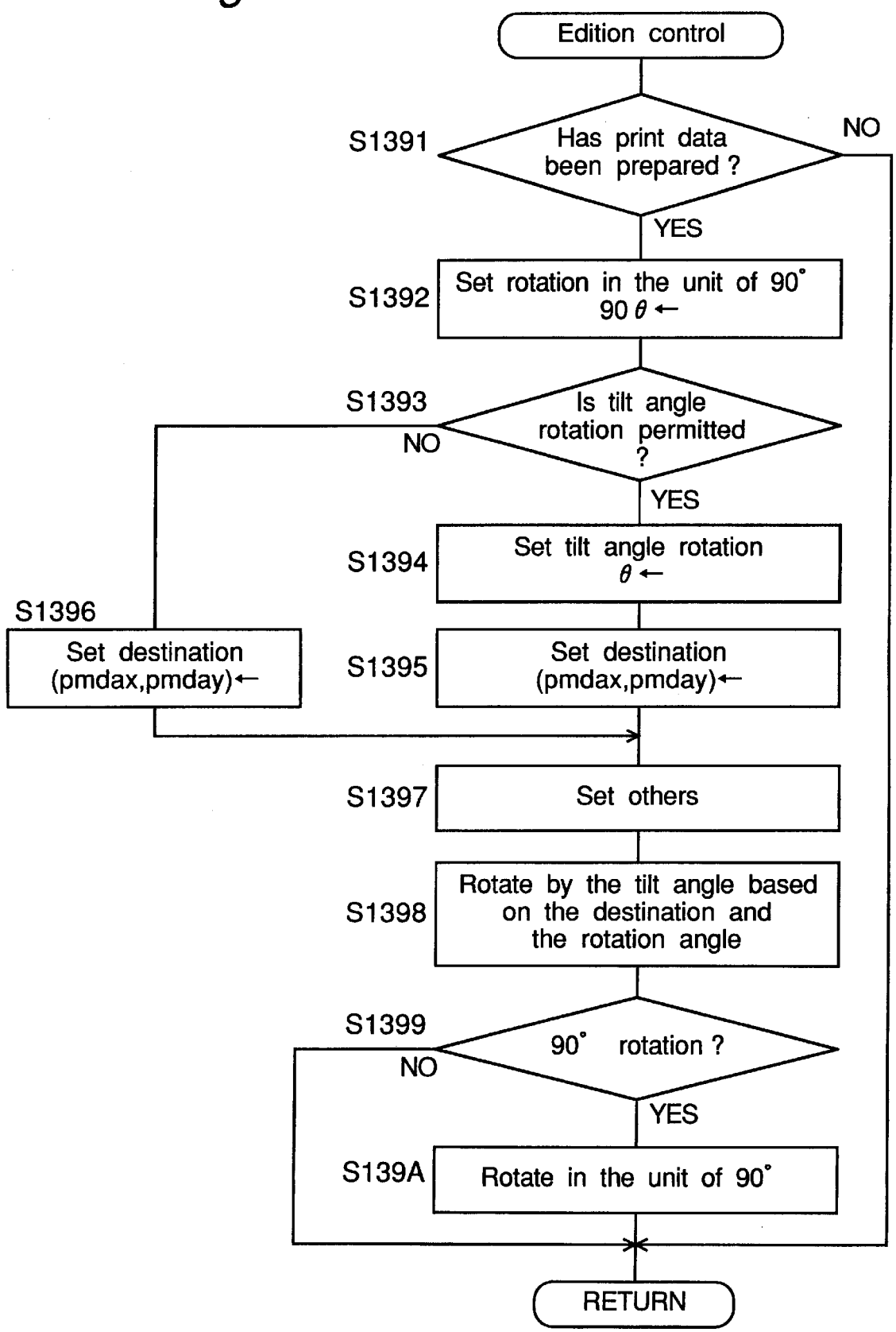
FIG. 33 is a flowchart of edition cotrol.

FIG. 33 is a flowchart of the edition control (step S1039 in FIG. 31). When data for printing are stored in the code memory 306 (YES at step S1391), rotation parameter in the unit of 90° (step S1392). Next, if the tilt angel rotation is permitted (YES at step S1393), tilt angle rotation parameter (step S1394) and destination parameter (pmdax, pmday) (step S1396) are set. On the other hand, if the tilt angel rotation is not permitted (NO at step S1393), only the destination parameter (pmdax, pmday) is set (step S1396). The destination address is different in these cases. Then, other parameters are set (step S1397). Next, the tilt angle rotation is performed according to the destination and the rotation angle set above (step S1398). If it is decided that rotation in the unit of 90° is necessary (YES at step S1399), the image is rotated in the unit of 90° (step S139A).

As explained above on the first and second embodiments, when a document is put on the platen glass at a tilt, smoothing is performed on the rotated image data if the rotation angle is larger than a predetermined angle, so that the deterioration of the rotated image can be decreased. Further, even when a document is put on the platen glass at a tilt, the rotation is inhibited for a photograph image (half-tone image). Therefore, deterioration of image quality of the reproduced image can be reduced.

H. Digital copying machine of third embodiment

Next a copying machine of a third embodiment of the invention is explained. In the copying machine, the tilt angle rotation is controlled according to characteristics of document image data for a document including both character image and photograph image. Image quality is deteriorated by the tilt angle rotation, especially for a half-tone image. The deterioration of image quality becomes larger as the rotation angle becomes larger (say above about 15°). (It is to be noted that it is difficult to use a single criterion, because various half-tone images are read and user's purposes are also different.) Therefore, smoothing is desirable for a photograph image. Then, in this embodiment, it is decided whether the input image is a simple bi-level image or a photograph image, and smoothing is performed on a photograph image. Because the processing is changed according to the attribute of input image, deterioration of image quality for photograph image becomes small, and when a document includes a character image and a photograph image, a document image formed on a sheet of paper can be looked better. Further, when a user sets image quality mode and the quality mode is photograph mode, only half-tone areas in the image are subjected to smoothing.

The structure of the copying machine of this embodiment is the same as the counterpart of the first embodiment shown in FIGS. 1–17, and the explanation thereof is omitted here. The flowcharts on the control for the copying machine of this embodiment have common parts to the counterparts of the first embodiment shown in FIGS. 18–29, and only different parts will be explained below.

Figure 34:
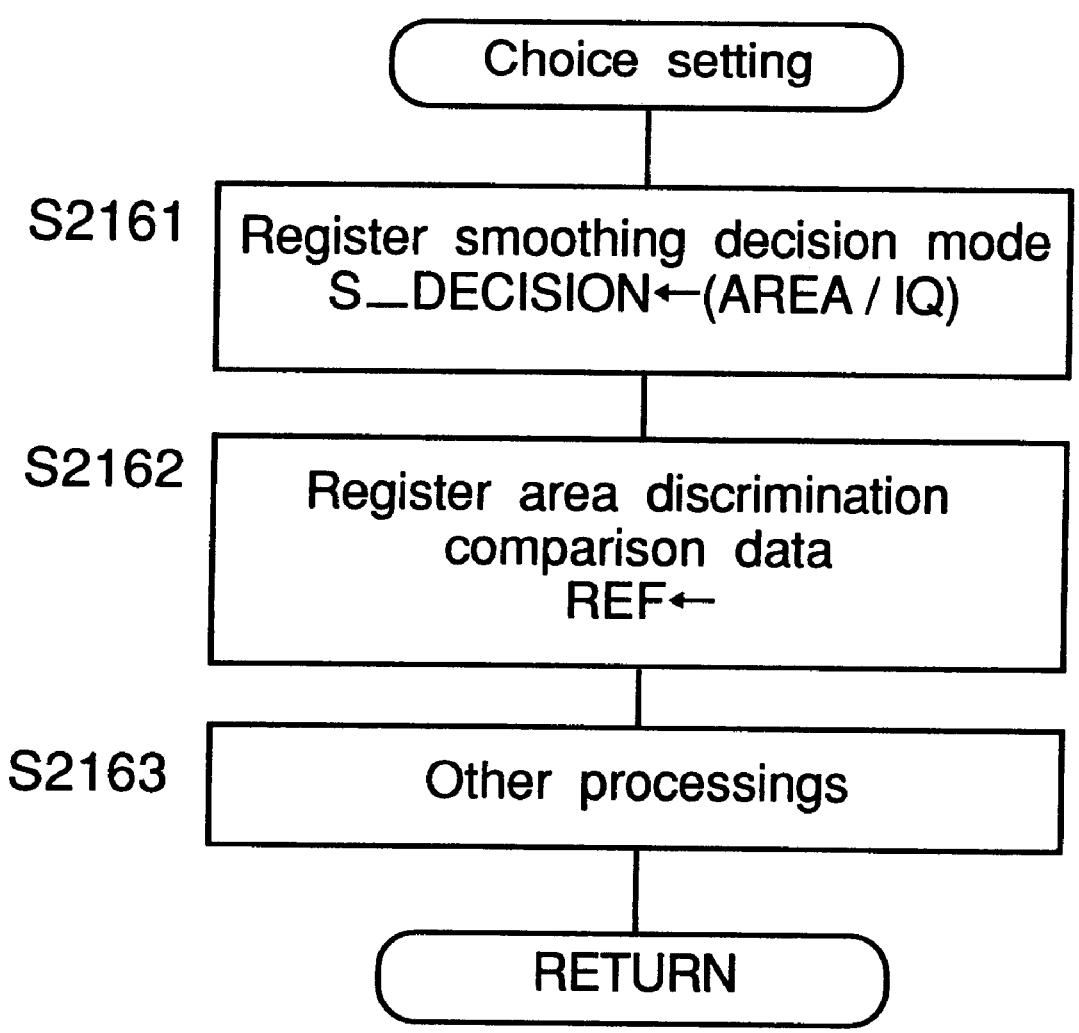
FIG. 34 is a flowchart of the choice setting in a third embodiment of the invention.

FIG. 34 is a flowchart of the choice setting (step S15 in FIG. 15) in the third embodiment of the invention. In the operational panel, an image for choice setting is displayed. First, smoothing mode, area discrimination mode (AREA) or image quality mode (IQ), is registered as smoothing decision mode S_DECISION (step S2161). That is, AREA is set for area discrimination mode, and IQ is set for image quality mode. Then, area discrimination comparison data is registered to REF (step S2162). After other choices are set (step S2163), the flow returns to the main flow.

Figure 35:
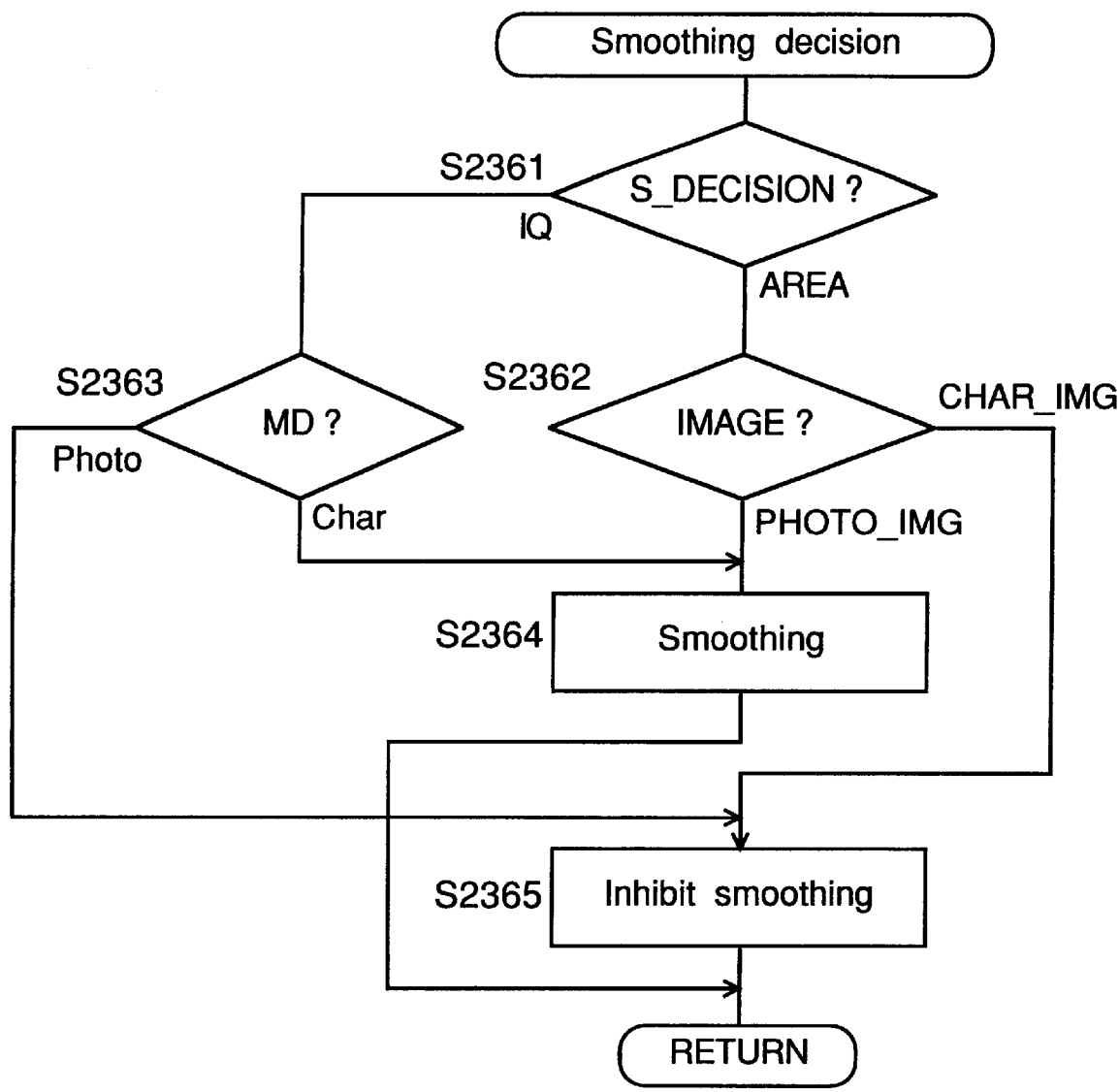
FIG. 35 is a flowchart of smoothing decision in the third embodiment.

FIG. 35 is a flowchart of the smoothing decision (step S36 in FIG. 23) in the third embodiment. The flow branches according to the smoothing decision mode S_DECISION set in the choice or by the operational panel (step S2361). If the smoothing decision mode S_DECISION is area discrimination mode AREA, the flow branches further according to the content of IMAGE (step S2362). If the smoothing decision mode S_DECISION is image quality mode IQ, the flow branches further according as the image quality mode is photograph mode (PHOTO) or character mode (CHAR) (step S2363). If the smoothing decision mode is photograph image (PHOTO_IMG), or if the image quality mode is character mode, smoothing is permitted (step S2364). On the contrary, if the smoothing decision mode is character image (CHAR_IMG), or if the image quality mode is photograph mode, the parameter SMOOTH_0 is set to the smoothing parameter SMOOTH_PARA, or smoothing is inhibited (step S2365).

I. Digital copying machine of fourth embodiment

Next, a copying machine of a fourth embodiment of the invention is explained where smoothing is performed on photograph image when a document has character and photograph (half-tone) images mixed therein, as in the third embodiment. In this embodiment, when printing is performed, the attribute of image is decided and the smoothing is controlled according to the attribute. That is, as to the image data read from the image memory, the image is divided into regions, and the type of image (character/photograph) is decided in each area in a document image. Smoothing is performed only for photograph areas on the image data after the rotation.

The structure of the copying machine is the same as the counterpart of the first embodiment shown in FIGS. 1–17, except the memory unit 3030, and only the memory unit is explained here. In the memory unit 3030, the image attribute is decided for each area when the image data are read for printing, and smoothing is controlled for photograph images according to the result of the decision.

Figure 36:
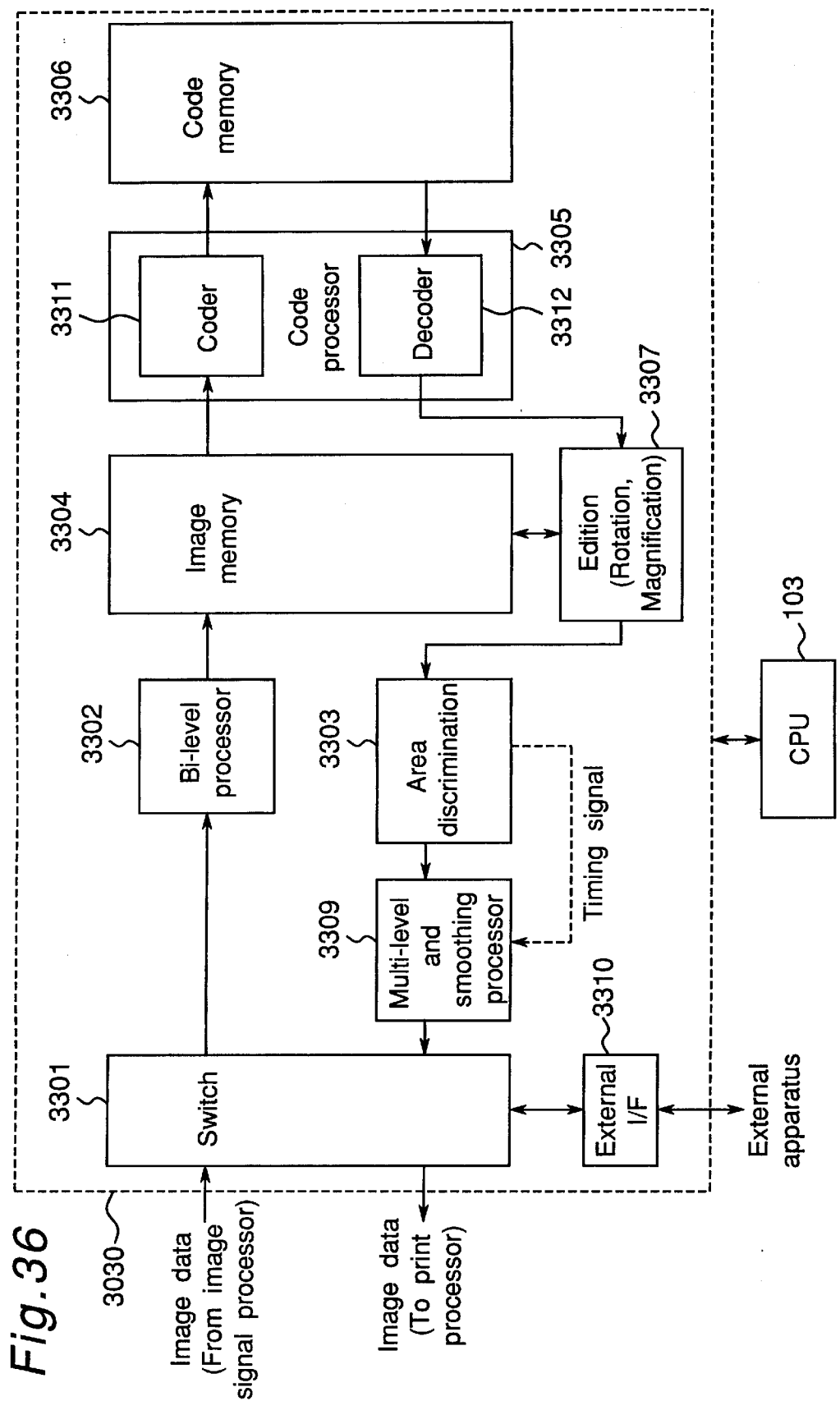
FIG. 36 is a block diagram of the memory unit.

FIG. 36 is a block diagram of the memory unit 3030. A switch 3301 switches a route of image between the image signal processor 20, the print processor 40 and the external interface 3310. A bi-level processor 3302 binarizes the image data according to the parameters set by the CPU 103 with a process such as error dispersion or dither process in a range which can be recovered to multi-level data. An image memory 3304 has a capacity of two pages, and the bi-level data are stored in the image memory 3304. Next, the bi-level data stored in the image memory 3304 are compressed or coded by a coder 3311 in a code processor 3305, and the code data are stored in a code memory 3306. The code memory 3306 is for example a multi-port memory having a capacity of one page of A4 size at 400 dots per inch. Data of a plurality of pages can be stored in the code memory 3306, and the code memory 3306 is managed by a code management table provided in the RAM 126.

When printing is performed, the code data compressed in the code memory 3306 are expanded by a decoder 3312. If image edition is needed, an edition processor 3307 performs edition (rotation, magnification, shift or the like) and decoding at the same time. If necessary, tilt angle rotation is also performed when the data are decoded. The decoded data are transmitted to the image memory 3304. After data of one page are decoded, the bi-level data read from the image memory 3304 are subjected to area discrimination by the area discrimination section 3303 to discriminate whether the image data in each area is simple bi-level data or half-tone data. Then, it sends a timing signal to a multi-level processing and smoothing section 3309. The data are converted to multi-level data by the multi-level processing and smoothing section 3308, and if the image is half-tone image, smoothing is also performed according to the timing signal thereby. Then, the data are sent through the switch 3301 to the print processor 40 or the external apparatus. The CPU 103 sends control parameters to the multi-level processing and smoothing section 3309.

The flowcharts on the control for the copying machine of the fourth embodiment have common parts to the counterparts of the first embodiment shown in FIGS. 18–29, and only different parts will be explained below.

Figure 37:
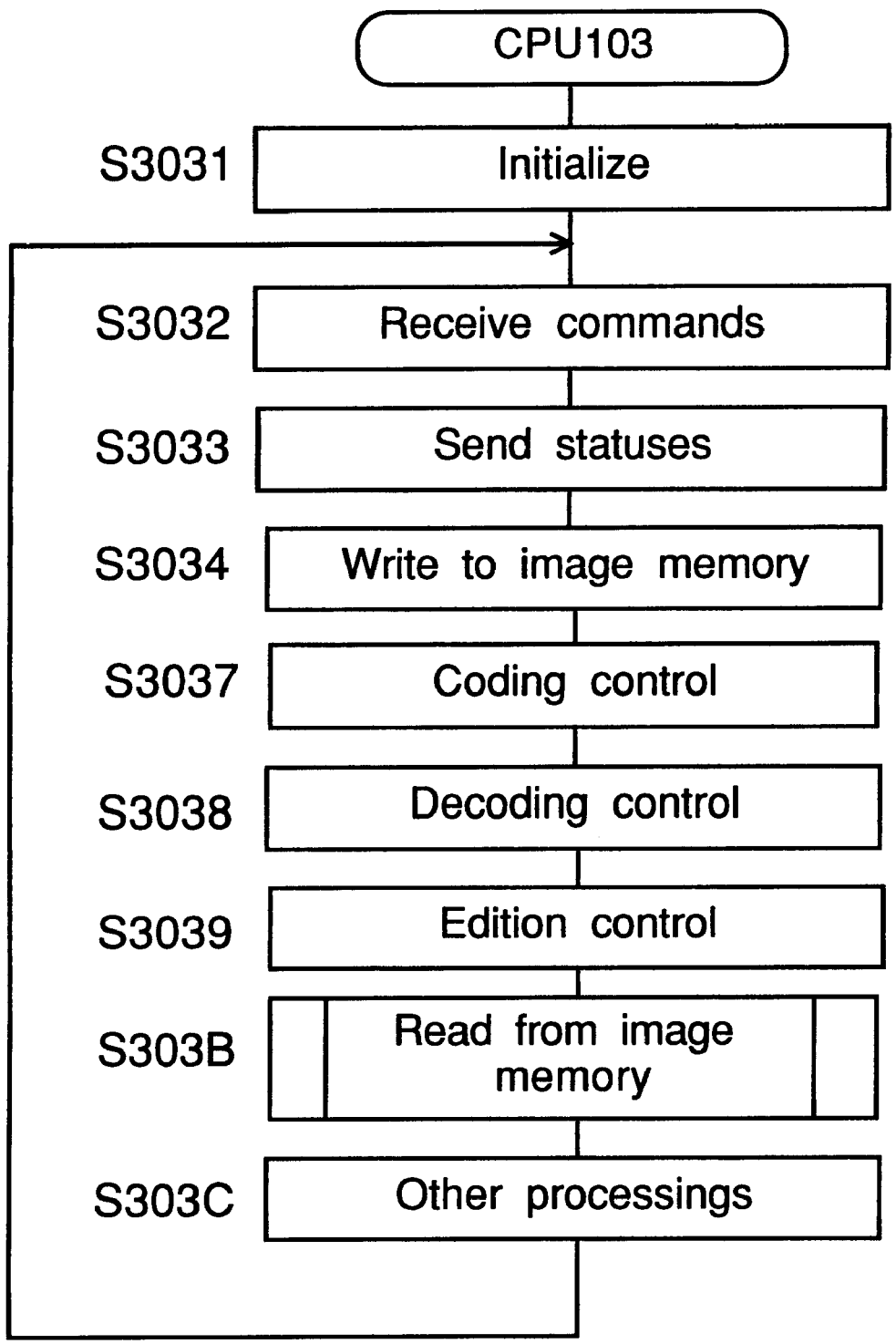
FIG. 37 is a main flowchart of the third CPU 103.

FIG. 37 is a main flowchart of the third CPU 103 which controls the memory unit 3030. First the RAM, the registers and the like are initialized (step S3031). Then, when image data are written, a command from the CPU 105 is received (step S3032), a status is sent to the CPU 105 (step S3033), write to the image memory 3304 is performed (step S3034), and coding is controlled (step S3037). Further, when the data is sent for printing, decoding is controlled (step S3038), edition control is performed (step S3039), and read from the image memory 3304 is performed (step S303B, refer to FIG. 38). After other processings are performed (step S303C), the flow returns to step S3032 to repeat the above processes. In the read from the image memory 3304 (step S303B), smoothing is controlled according to the attribute of image when printing is performed.

Figure 38:
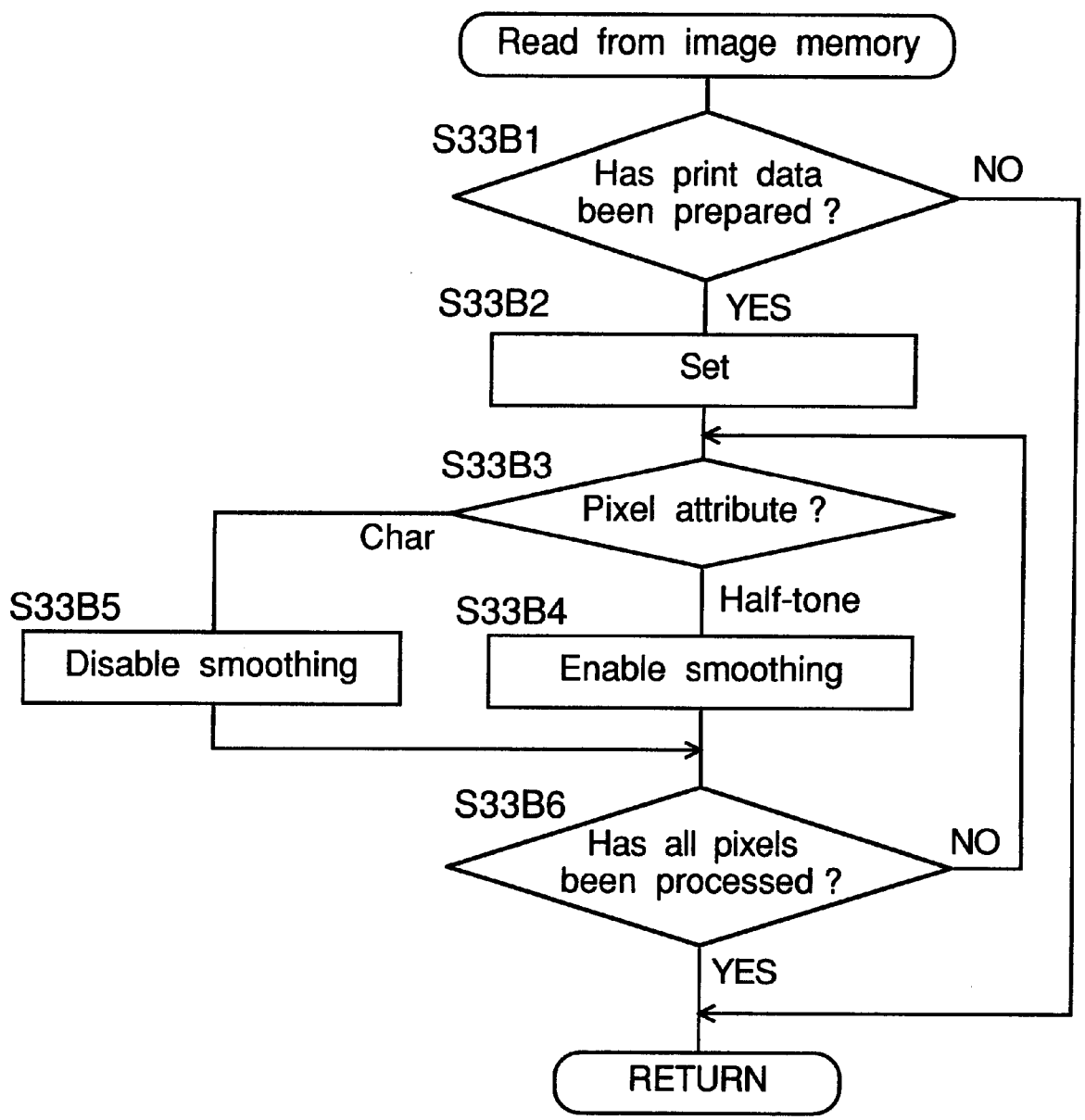
FIG. 38 is a flowchart of read from the image memory.

FIG. 38 is a flowchart of the read from the image memory 3304 (step S303B in FIG. 37). When data for printing have been stored in the code memory 3306 (YES at step S33B1), setting for printing is performed (step S33B2). Next, the flow branches according to the image attribute (step S33B3). If the image attribute is decided half-tone, the smoothing is set enable (step S33B4), and a timing signal is generated (refer to FIG. 36). If the image attribute is decided character, the smoothing is set disable (step S33B5), and a timing signal is not generated. This processing repeated until all the pixels have been processed (YES at step S3A6).

J. Digital copying machine of fifth embodiment

Next a copying machine of a fifth embodiment of the invention is explained. In the copying machine, the attribute of input image is decided (refer to FIG. 39), and the tilt angle rotation is inhibited when different attributes are included in the input image in order to prevent deterioration of image quality due to image rotation.

The structure of the copying machine of this embodiment is the same as the counterpart of the first embodiment shown in FIGS. 1–17, and the explanation thereof is omitted here. The flowcharts on the control for the copying machine of this embodiment have common parts to the counterparts of the first embodiment shown in FIGS. 18–29, and only different parts will be explained below.

Figure 39:
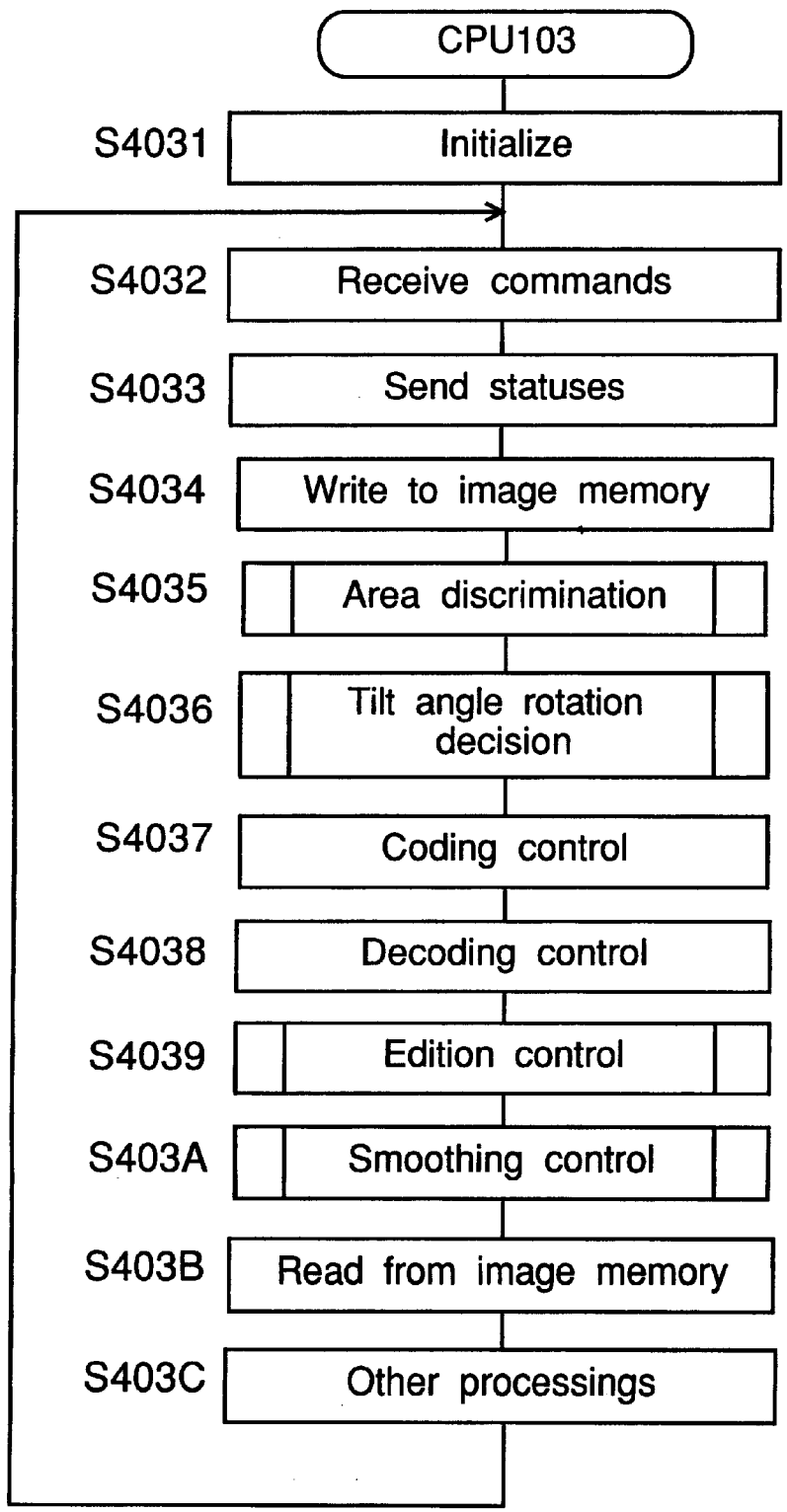
FIG. 39 is a main flowchart of the third CPU in a fourth embodiment.

FIG. 39 is a main flowchart of the third CPU 103 which controls the memory unit 30. First the RAM, the registers and the like are initialized (step S4031). Then, when data are written, a command from the CPU 105 is received (step S4032), a status is sent to the CPU 105 (step S4033), write to the image memory is performed (step S4034), areas are discriminated (step S4035, refer to FIG. 40), tilt angle rotation decision is performed (step S4036, refer to FIG. 41), and coding is controlled (step S4037). Further, when data are sent for printing, decoding is controlled (step S4038), edition control is performed (step S4039), smoothing control is performed (step S403A), and read from the image memory is performed (step S403B). After other processings are performed (step S403C), the flow returns to step S4032 to repeat the above processes.

Figure 40:
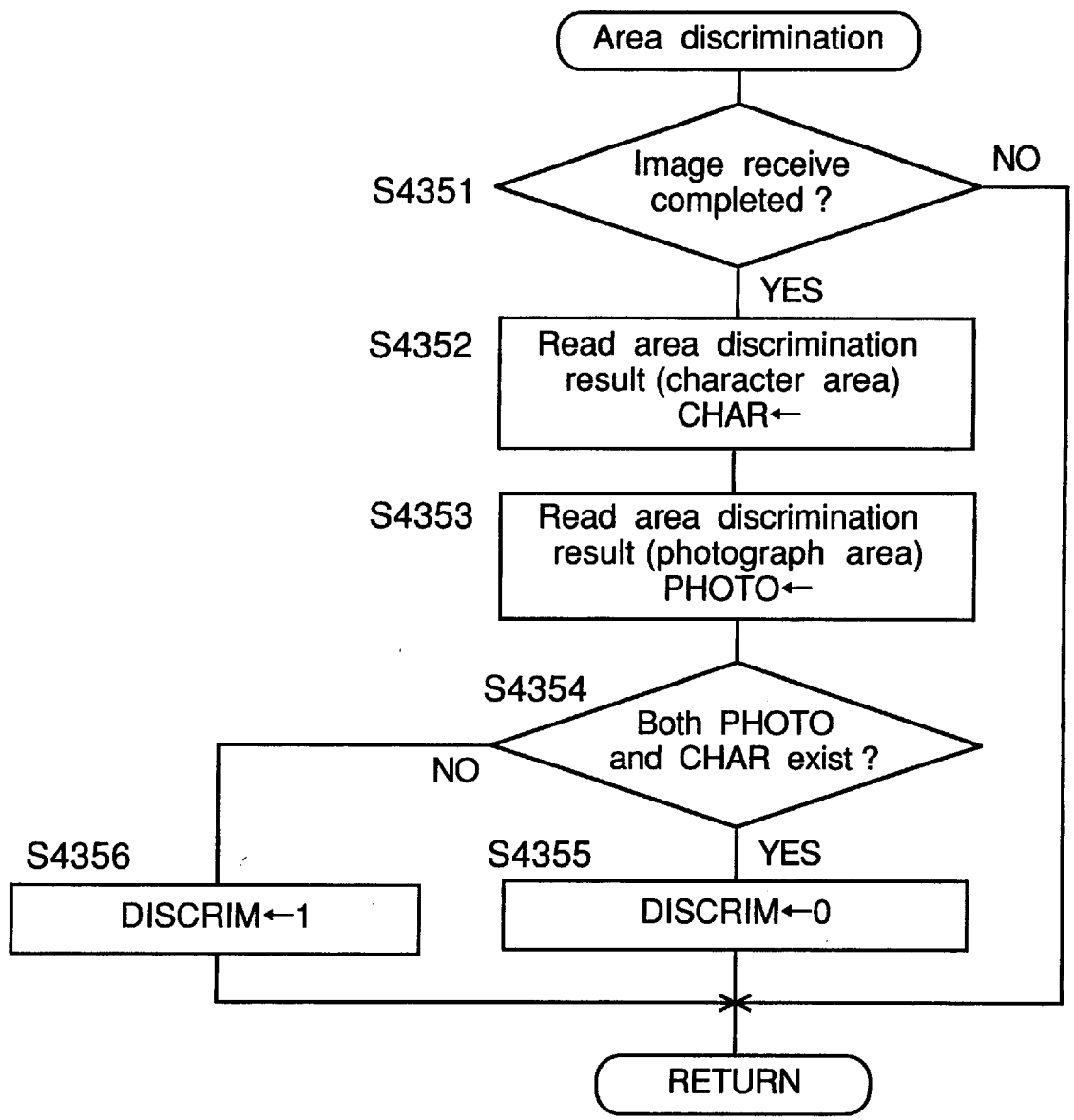
FIG. 40 is a flowchart of area discrimination.

FIG. 40 is a flowchart of the area discrimination (step S4035 in FIG. 39). When image receive is completed (YES at step S4351), image discrimination results are read, and CHAR and PHOTO are set respectively for character areas and for photograph areas (steps S4352 and S4353). When both of CHAR and PHOTO are decided to exist (YES at step S4354), discrimination result DISCRIM is set to 0 (step S4355), else it is set to 1 (step S4356).

Figure 41:
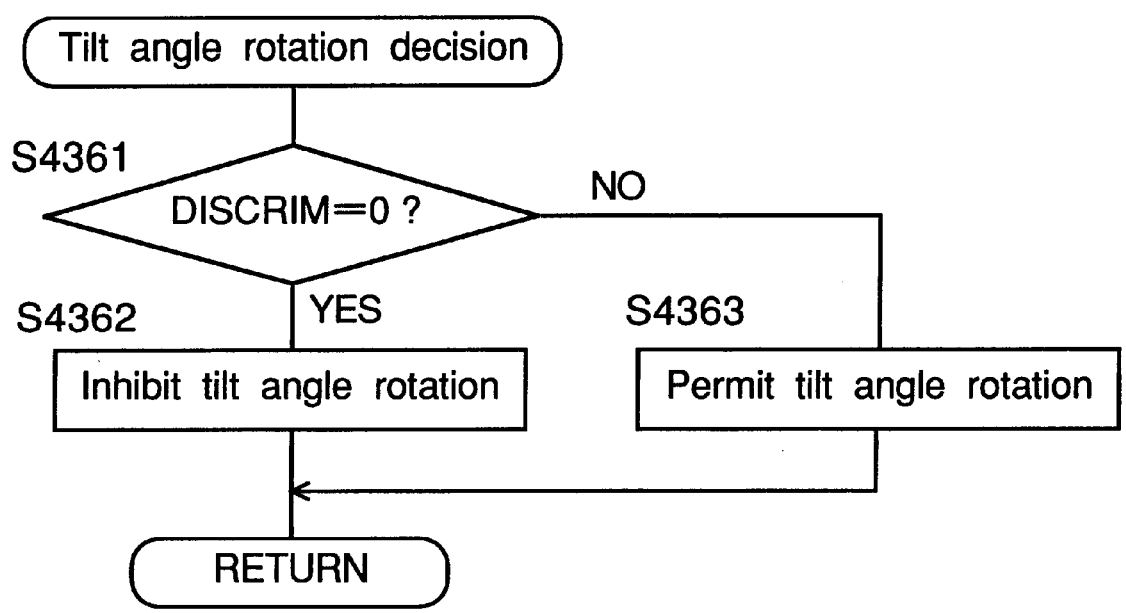
FIG. 41 is a flowchart of tilt angle rotation decision.

FIG. 41 is a flowchart of the tilt angle rotation decision (step S4036 in FIG. 39). If the discrimination result DISCRIM set in the area discrimination (FIG. 40) is decided to be 0 (YES at step S4361), or if different attributes exist, the tilt angle rotation is inhibited (step S4362), else the tilt angle rotation is permitted (step S4363).

Figure 42:
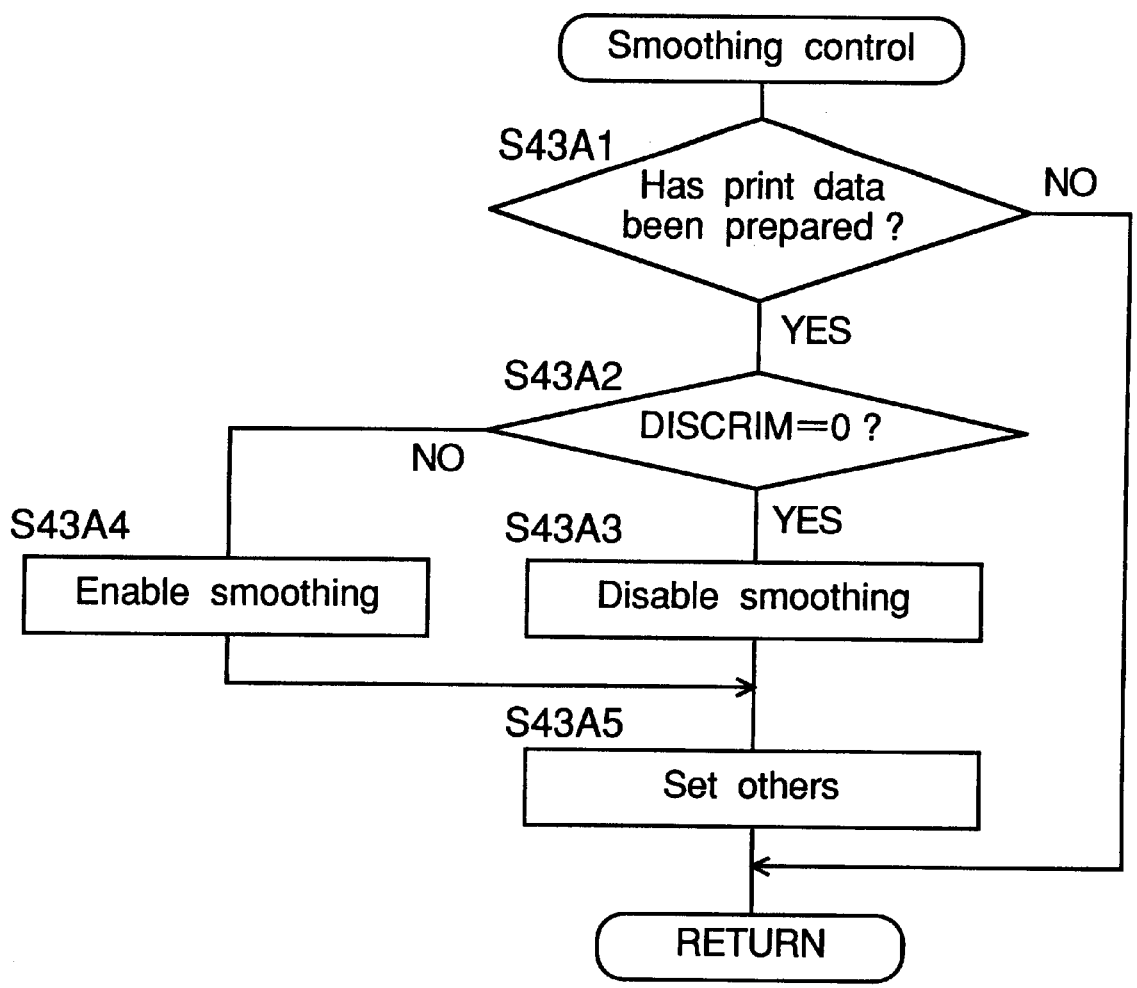
FIG. 42 is a flowchart of smoothing control.

FIG. 42 is a flowchart of the smoothing control (step S403A in FIG. 39). When data for printing have been stored in the code memory 306 (YES at step S43A1), if the discrimination result DISCRIM is decided to be 0 (YES at step S43A2), the smoothing is set disable (step S43A3), else the smoothing is set enable (step S43A4). Then, other parameters are set (step S43A5).

In the third to fifth embodiments explained above, deterioration of image quality caused by the tilt angle correction can be decreased by processing the image after the tilt angle rotation in various ways. For example, if the input image data is a half-tone image, the deterioration of image quality can be prevented by smoothing the rotated image.

Further, when different image attributes are included in one document, the tilt angle rotation is inhibited. Thus, deterioration of image quality of half-tone image can be prevented, and an image on a sheet of paper can be looked better.

K. Digital copying machine of sixth embodiment

Next a copying machine of a sixth embodiment of the invention is explained. The structure of the copying machine of this embodiment is the same as the counterpart of the first embodiment shown in FIGS. 1–17, and the explanation thereof is omitted here.

In this embodiment, image modification by tilt angle rotation is explained on a document put on the platen glass extending beyond the read area. The tilt angle rotation of such a document uses common processes to the counterpart in the first embodiment, and only different points are explained below.

Figure 43:
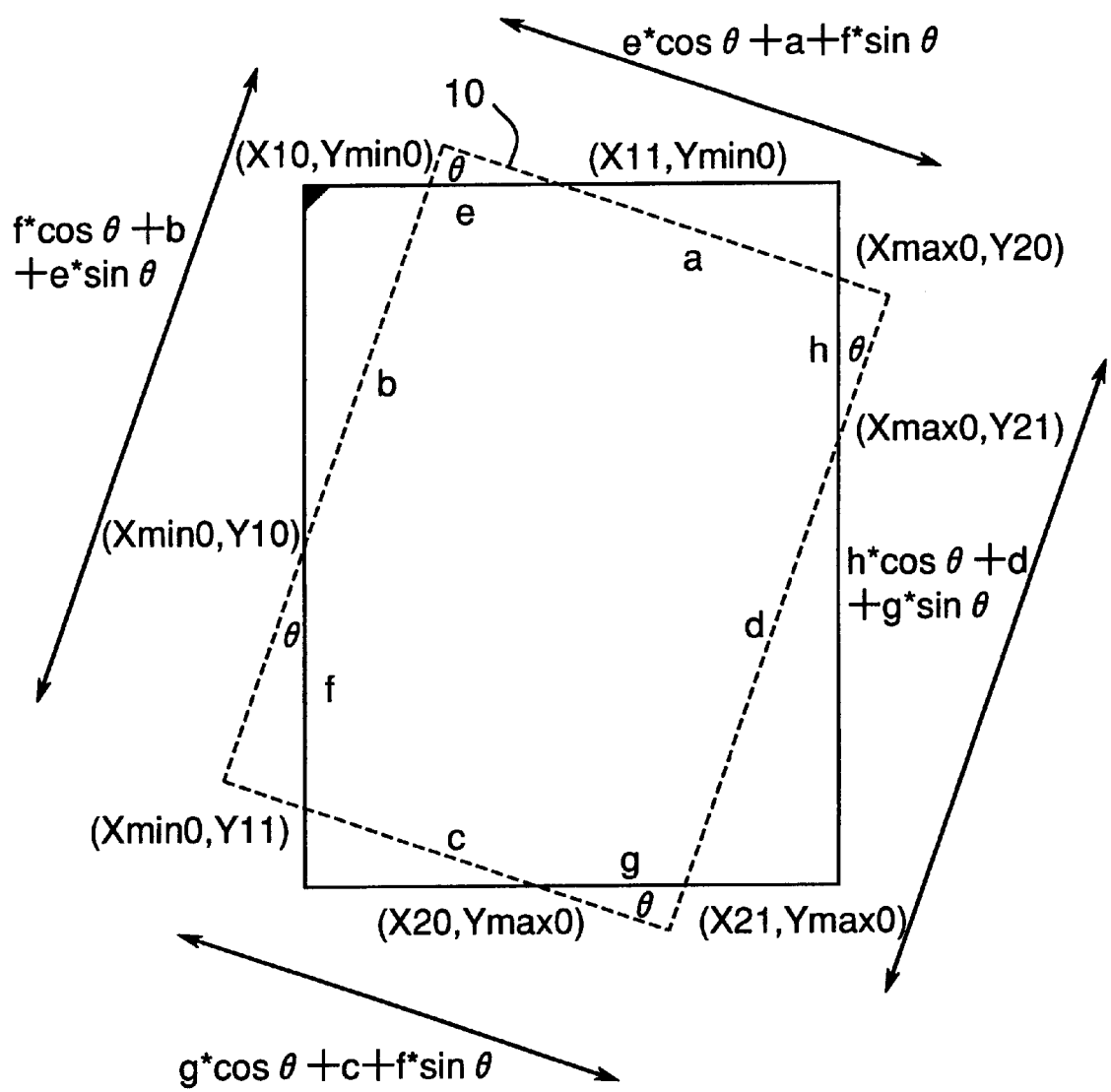
FIG. 43 is a diagram of an example of a document image which is read.
Figure 44A:
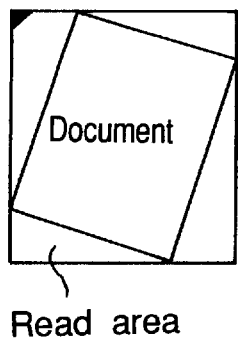
FIGS. 44A–44G are diagrams in the usual rotation address calculation using the above-mentioned tilt angle rotation (shift-shift process)
Figure 44B:
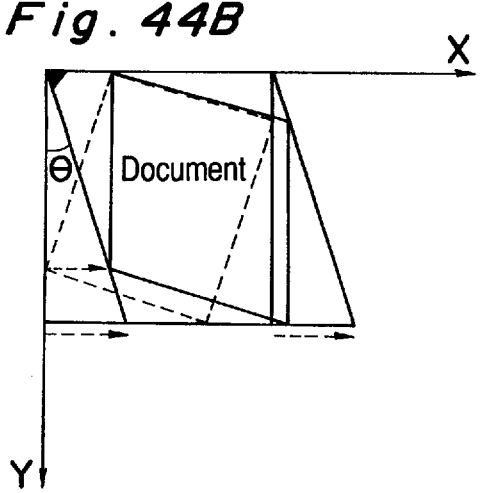
Figure 44C:
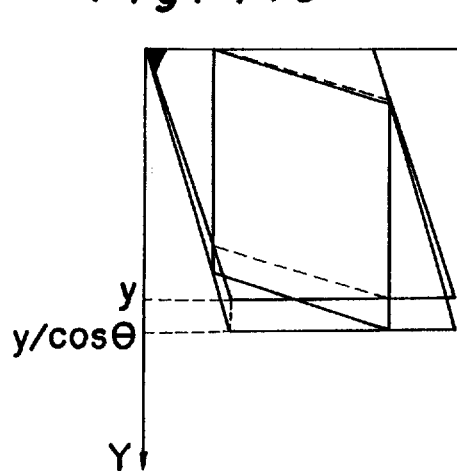
Figure 44D:
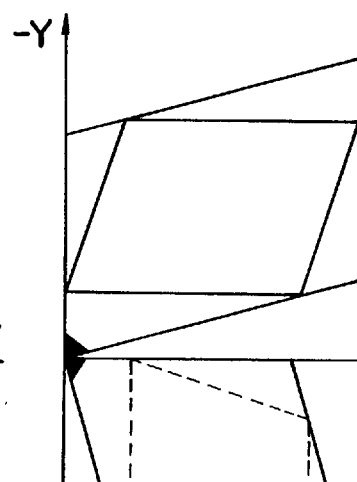
Figure 44E:
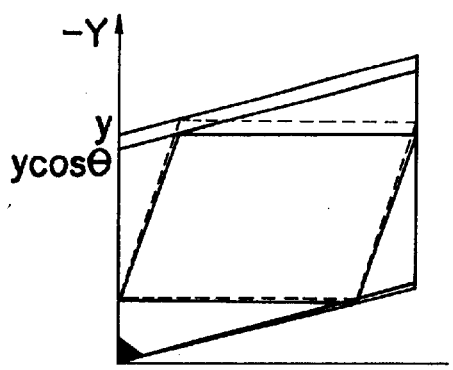
Figure 44F:
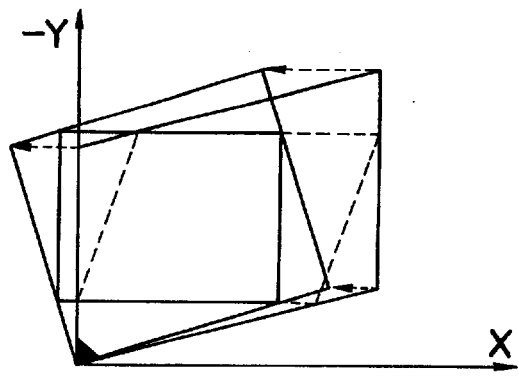
Figure 44G:
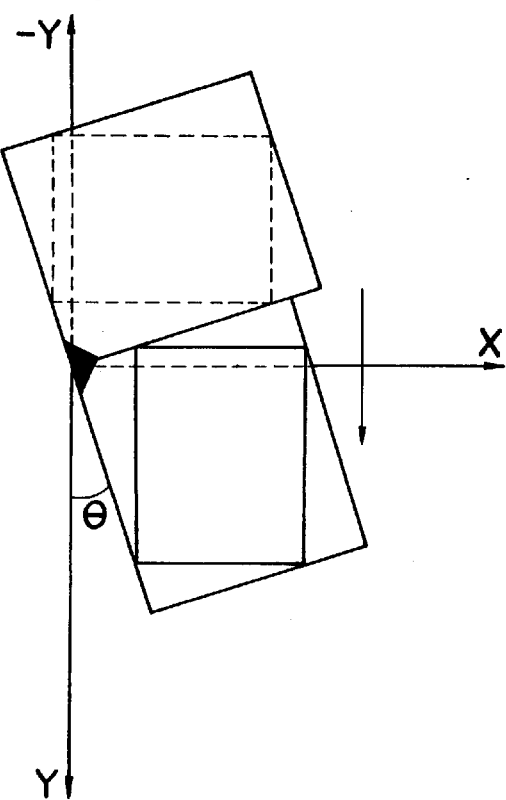
Figure 45A:
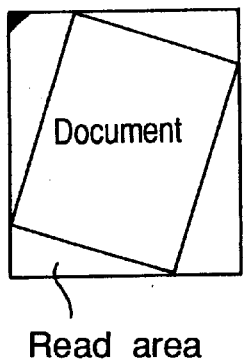
FIGS. 45A–45G are diagrams on processes in the rotation address calculation using tilt angle rotation (shift—shift process) with magnification in the subscan direction.
Figure 45B:
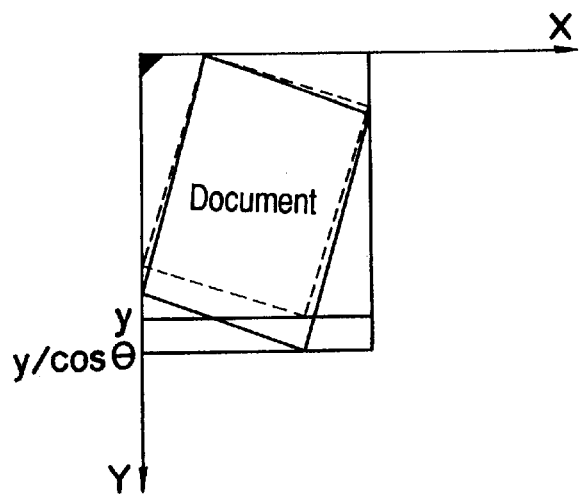
Figure 45C:
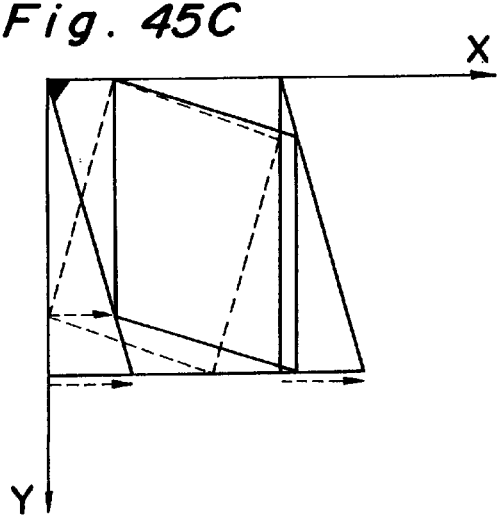
Figure 45D:
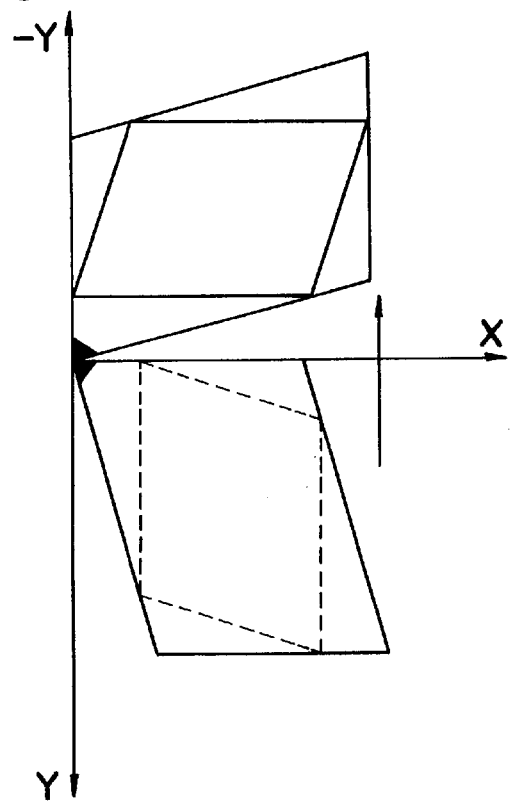
Figure 45E:
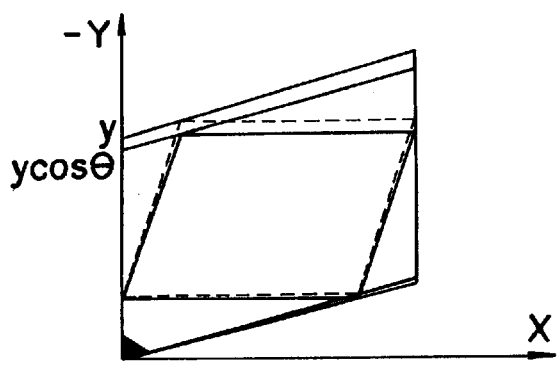
Figure 45F:
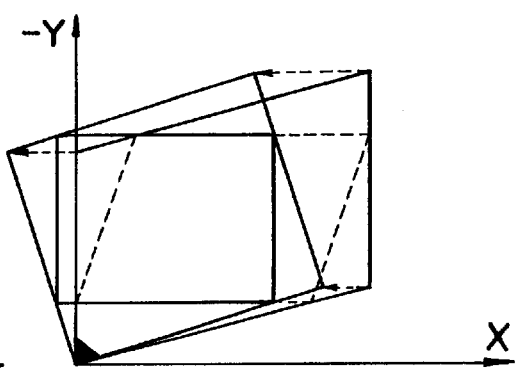
Figure 45G:
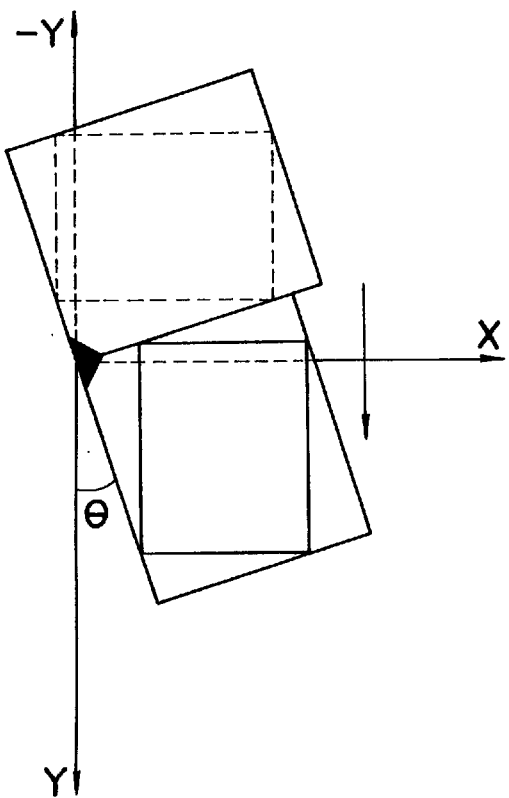

First, detection of the four corners of a document is explained. The coordinates of the four corners of a document can be detected when a document 10 extends beyond the read area (the rectangle portion of solid line), or when the read image (dashed line) is an image as shown in FIG. 43. The main scan direction is X axis and the subscan direction is Y axis in FIG. 43. It is assumed here that the read range is from $X_{min0}$ to $X_{max0}$ in the x axis and is from $Y_{min0}$ to $Y_{max0}$ in the Y axis. Because the corners of the document exist outside the read area, each of the extreme values $X_{max}$, $X_{min}$, $Y_{max}$ and $Y_{min}$ are detected at two points at the intersects of sides of the document with the periphery of the read region. For example, two points are detected if the extreme value in X or Y axis agrees with the maximum $X_{max0}$, $Y_{max0}$ or minimum $X_{min0}$, $Y_{min0}$. Thus, coordinates of the eight points for the corners of a document are $(X_{min0}, Y_{10})$, $(X_{min0}, Y_{11})$, $(X_{10}, Y_{min0})$, $(X_{11}, Y_{min0})$, $(X_{20}, Y_{max0})$, $(X_{21}, Y_{max0})$, $(X_{max0}, Y_{20})$, and $(X_{max0}, Y_{21})$. Thus, the lengths of the four sides "a", "b", "c" and "d" which exist within the read area can be extracted. Then, the lengths of the sides "a", "b", "c" and "d" existing within the read area and those "e", "f", "g" and "h" along the periphery corresponding to the extending portions are calculated from the document coordinates as follows.

$$a = \sqrt{(X_{max0} - X_{11})^2 + (Y_{20} - Y_{min0})^2},$$

$$b = \sqrt{(X_{10} - X_{min0})^2 + (Y_{10} - Y_{min0})^2},$$

$$c = \sqrt{(X_{20} - X_{min0})^2 + (Y_{max0} - Y_{11})^2},$$

$$d = \sqrt{(X_{max0} - X_{21})^2 + (Y_{max0} - Y_{20})^2},$$

$$e = X_{11} - X_{10},$$

$$f = Y_{11} - Y_{10},$$

$$g = X_{21} - X_{20},$$

and $$h = Y_{21} - Y_{20}. \quad (12)$$

Further, when the document is assumed to be a rectangle, the lengths of the four sides are calculated as shown in the drawing, as follows:

$$e*\cos\theta + a + h*\sin\theta,$$

$$f*\cos\theta + b + e*\sin\theta,$$

$$g*\cos\theta + c + f*\sin\theta,$$

and $$h*\cos\theta + d + g*\sin\theta. \quad (13)$$

Then, the tilt angel θ is calculated for each side from the above coordinates.

For a document put on any position on the platen glass, edition parameters can be determined according to the procedures explained above. If at least one side in the four sides is detected, the tilt angle can be calculated. Further, the length and coordinate of each side can be calculated for a rectangle as an effective document area which includes the read document area.

Next, the principle of tilt angle rotation is explained. When a document put on the platen glass is detected to be tilted, the image is rotated automatically by the tilt angle. In the tilt angle rotation, the document is read first in a prescan, and the tilt angle is detected. Then, the magnifying power for reading the document is calculated in correspondence to the tilt angle. In a following main scan, the document is read while magnified at the magnifying power. Next, the tilt of the image is corrected on the read image signals according to the tilt angle. The obtained image is an image in the normal direction. Further, when a user sets a desired magnifying power for copy, the magnifying power for document read is calculated by taking both tilt angle and desired magnifying power into account. The obtained image after the tilt angle rotation is an image in the normal direction magnified by the desired magnifying power.

In the tilt angle rotation in this embodiment, the rotation combines shift of image data and 90° rotation in the two scan directions (refer to Eq. (16)). In this case, in order to keep the size of the original image constant, magnification (expansion and reduction) is needed after shifting in each scan direction. If electrical magnification is used in the magnification, deterioration of image quality occurs due to line insertion or the like in the electrical magnification process, and the magnification takes a longer time. In order to solve this problem, the read magnifying power is calculated according to the detected tilt angle, and when a document is read, the image is magnified optically in the subscan direction. Thus, the number of the electrical magnification decreases from two times to one time. Therefore, deterioration of image quality due to the electrical magnification can be decreased in the magnification, and increase in process time is also reduced.

Next, the calculation is explained for the rotation address for the tilt angle rotation. The following relationships show rotation in affine transformation. As shown in Eq. (14), coordinates (X, Y) are converted to coordinates (U, V) after the rotation. The calculation is usually decomposed as shown in Eq. (15) as a combination of first shift, magnification (enlargement), -90° rotation, magnification (reduction), second shift and 90° rotation. The edition processor 307 performs the calculation by combining these processes. In the first and second shifts, only X-axis parameter is processed while Y-axis parameter is fixed.

$$\begin{pmatrix} X \\ Y \end{pmatrix} = \begin{pmatrix} \cos\theta & \sin\theta \\ -\sin\theta & \cos\theta \end{pmatrix} \begin{pmatrix} U \\ V \end{pmatrix} \quad (14)$$

$$= \begin{pmatrix} 0 & 1 \\ -1 & 0 \end{pmatrix} \begin{pmatrix} 1 & -\tan\theta \\ 0 & 1 \end{pmatrix} \begin{pmatrix} 1 & 0 \\ 0 & \cos\theta \end{pmatrix} \begin{pmatrix} 0 & -1 \\ 1 & 0 \end{pmatrix} \begin{pmatrix} 1 & 0 \\ 0 & 1/\cos\theta \end{pmatrix} \begin{pmatrix} 1 & -\tan\theta \\ 0 & 1 \end{pmatrix} \begin{pmatrix} U \\ V \end{pmatrix}. \quad (15)$$

90°, 2nd shift, reduce, -90°, enlarge, 1st shift

Further, Eqs. (14) and (16) show processes in the magnification in the subscan direction when the document is read. The calculation of the rotated address is a combination of magnification (anlargement), first shift, -90° rotation, second shift, magnification (reduction) and 90° rotation. When Eq. (16) for magnification in the read in the subcan direction is compared with Eq. (15) for the usual affine transformation, the order of the first shift and the magnification (enlargement) is exchanged.

$$\begin{pmatrix} X \\ Y \end{pmatrix} = \begin{pmatrix} \cos\theta & \sin\theta \\ -\sin\theta & \cos\theta \end{pmatrix} \begin{pmatrix} U \\ V \end{pmatrix} \tag{14}$$

$$= \begin{pmatrix} 0 & 1 \\ -1 & 0 \end{pmatrix} \begin{pmatrix} 1 & -\tan\theta \\ 0 & 1 \end{pmatrix} \begin{pmatrix} 1 & 0 \\ 0 & \cos\theta \end{pmatrix} \begin{pmatrix} 0 & -1 \\ 1 & 0 \end{pmatrix} \begin{pmatrix} 1 & -\sin\theta \\ 0 & 1 \end{pmatrix} \begin{pmatrix} 1 & 0 \\ 0 & 1/\cos\theta \end{pmatrix} \begin{pmatrix} U \\ V \end{pmatrix}. \tag{16}$$

90°, 2nd shift, reduce, −90°, 1st shift, enlarge

FIGS. 44A–44G show the usual rotation address calculation using the above-mentioned tilt angle rotation (shift—shift process) when processed from the right side in Eq. (15). First, the image data in the read area is subjected to the first shift according to the rotation angle set in the first shift section. Next, the electrical magnification (enlargement) is performed so as to adjust the data after the rotation to the image data size. Then, −90° rotation is performed to process the next shift in the X axis. Next, the electrical magnification (reduction) is performed so as to adjust the data after the rotation to the input image data size, and the second shift is performed. Thus, the image data is brought to a state rotated by (90°+θ). Then, the image is rotated by 90° to reduce to a state rotated by θ.

FIGS. 45A–45G show processes in the rotation address calculation using the above-mentioned tilt angle rotation (shift—shift process) with magnification in the subscan direction when processed from the right side in Eq. (16). First, the image data in the read area is expanded in the Y direction by magnifying power of 1/cosθ so as to adjust the data after the rotation to the image data size. Next, the data is subjected to first shift according to the rotation angle set in the first shift section. Next, the electrical magnification (enlargement) is performed. Then, −90° rotation is performed to process the next shift in the X axis. Next, the electrical magnification (reduction) is performed so as to adjust the data after the rotation to the input image data size, and the second shift is performed. Thus, the image data is brought to a state rotated by (90°+θ). Then, the image is rotated by 90° to reduce to a state rotated by θ.

Figure 46:
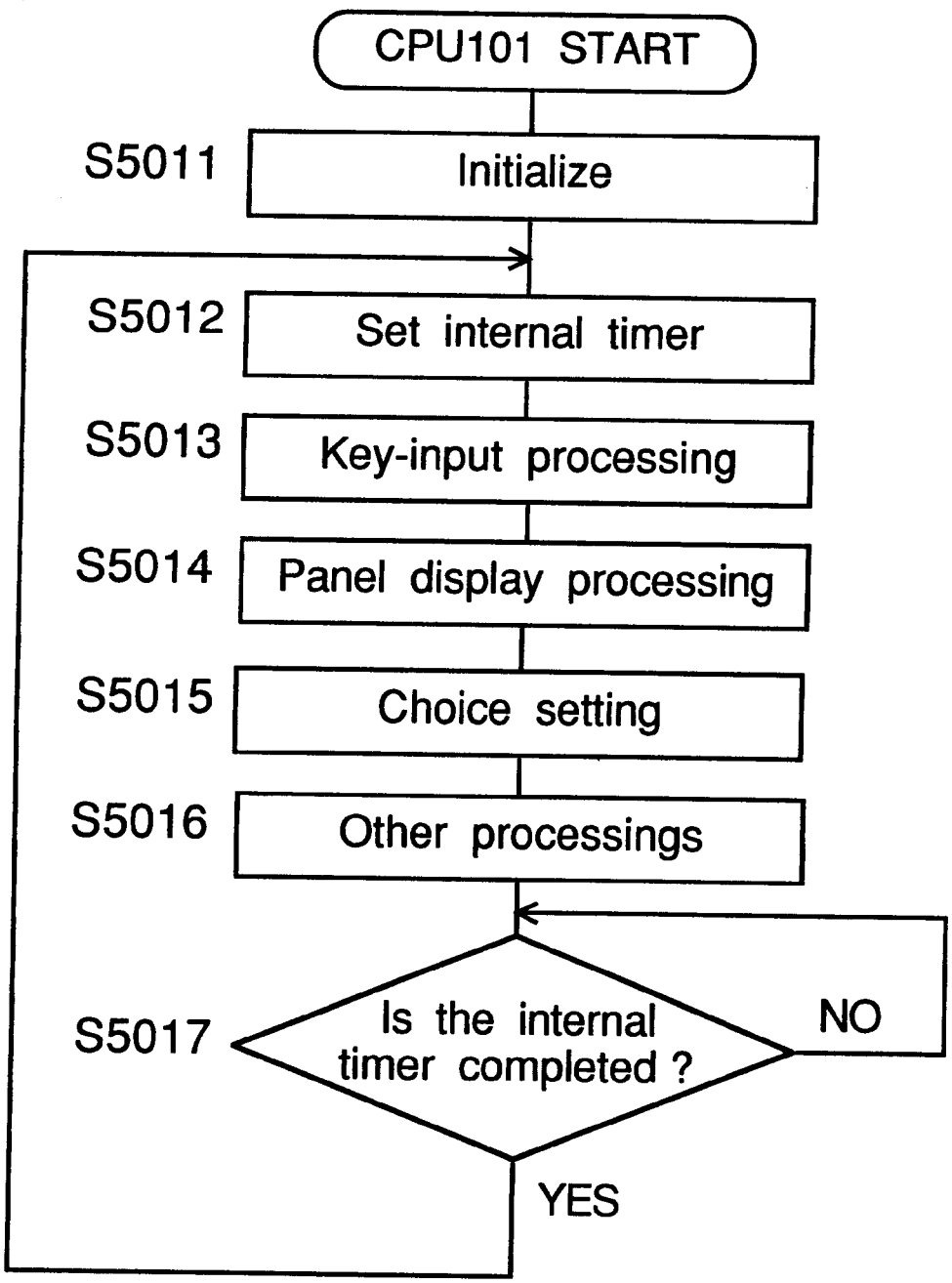
FIG. 46 is a main flowchart of the first CPU in a sixth embodiment.

Next, control flows of the copying machine will be explained. FIG. 46 is a main flow chart of the first CPU 101 which controls the operational panel. When the electrical power source is turned on, first initialization is performed for initializing the RAM, registers or the like (step S5011), and an internal timer which defines a time of one routine is set (step S5012). Then, key-inputs are processed to receive key operation (step S5013), and a display is performed in the panel according to the key operation (step S5014). Then, choice setting is performed for the tilt angle rotation (step S5015). After other processings are performed (step S5016), it is waited that the internal timer is completed (YES at step S5017). Then, the flow returns to step S5012 to repeat the above processes.

Figure 47A:
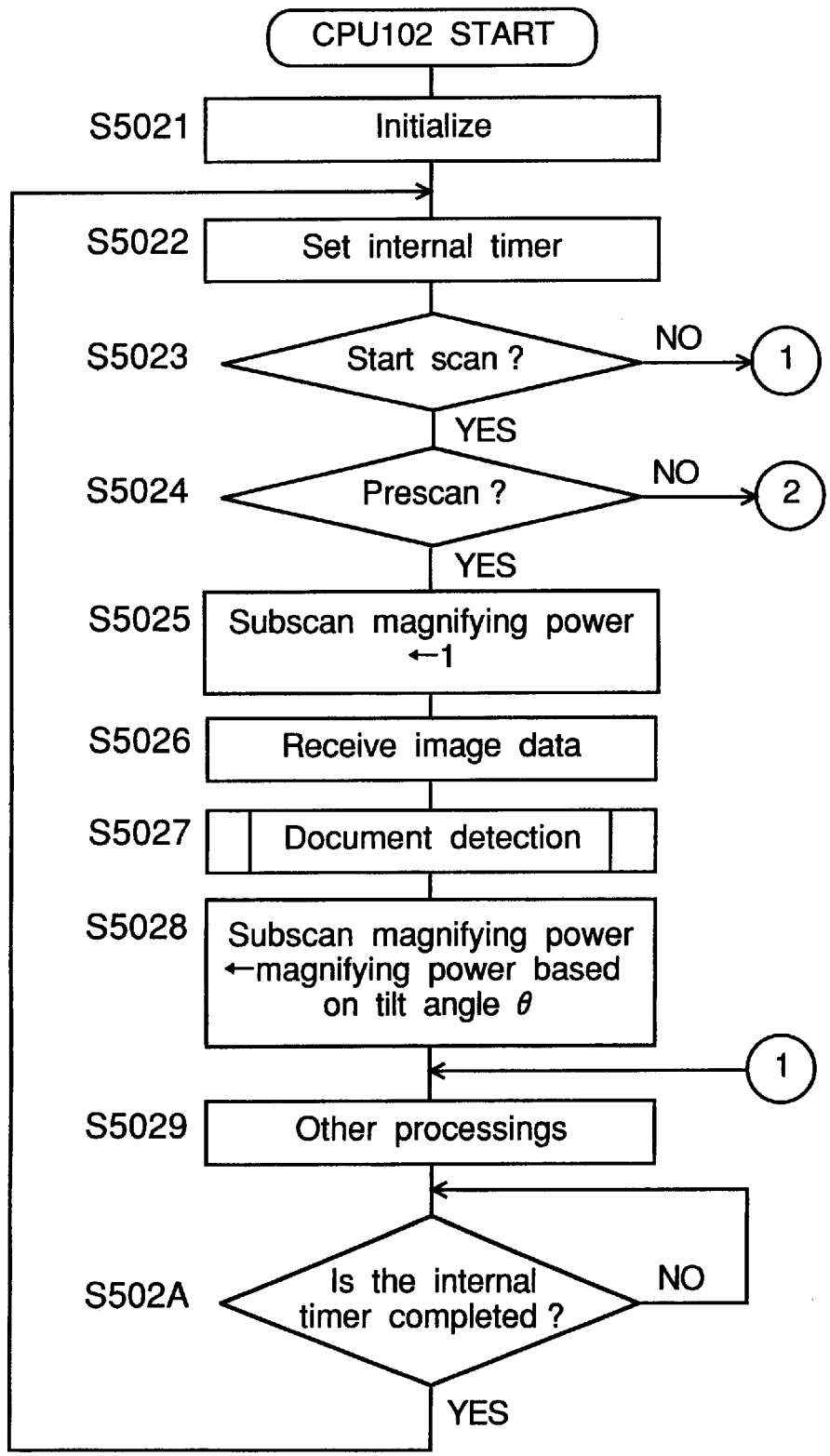
FIGS. 47A and 47B are main flowcharts of the second CPU.
Figure 47B:
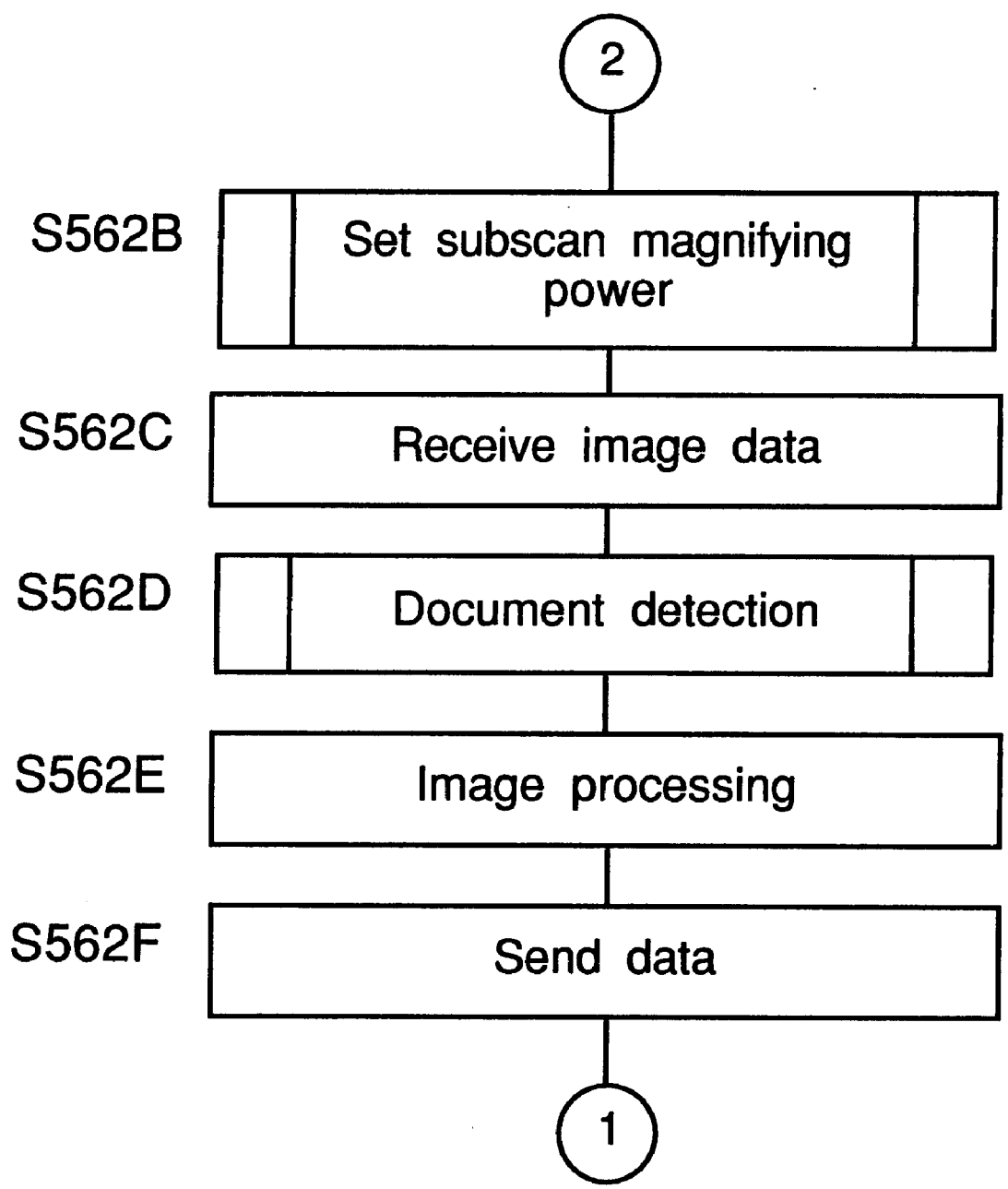

FIGS. 47A and 47B are a main flowchart of the second CPU 102 which controls the image signal processor 20. After initialization for the RAM, the registers and the like (step S5021), an internal timer which defines a time of one routine is set (step S5022). Then, image read is controlled. When a scan is started (YES at step S5023), it is decided whether the scan is prescan or not (step S5024). If the scan is decided to be prescan (YES at step S5024), the magnifying power in the subscan direction is set to 1 (step S5025), image data are received (step S5026), and the document is detected (step S5027, refer to FIG. 48). Then, a magnifying power based on the tilt angle is calculated as the magnifying power for subscan (step S5028). After other processings are performed (step S5029), it is waited that the internal timer is completed (YES at step S502A) Then, the flow returns to step S5022 to repeat the above processes.

Figure 58:
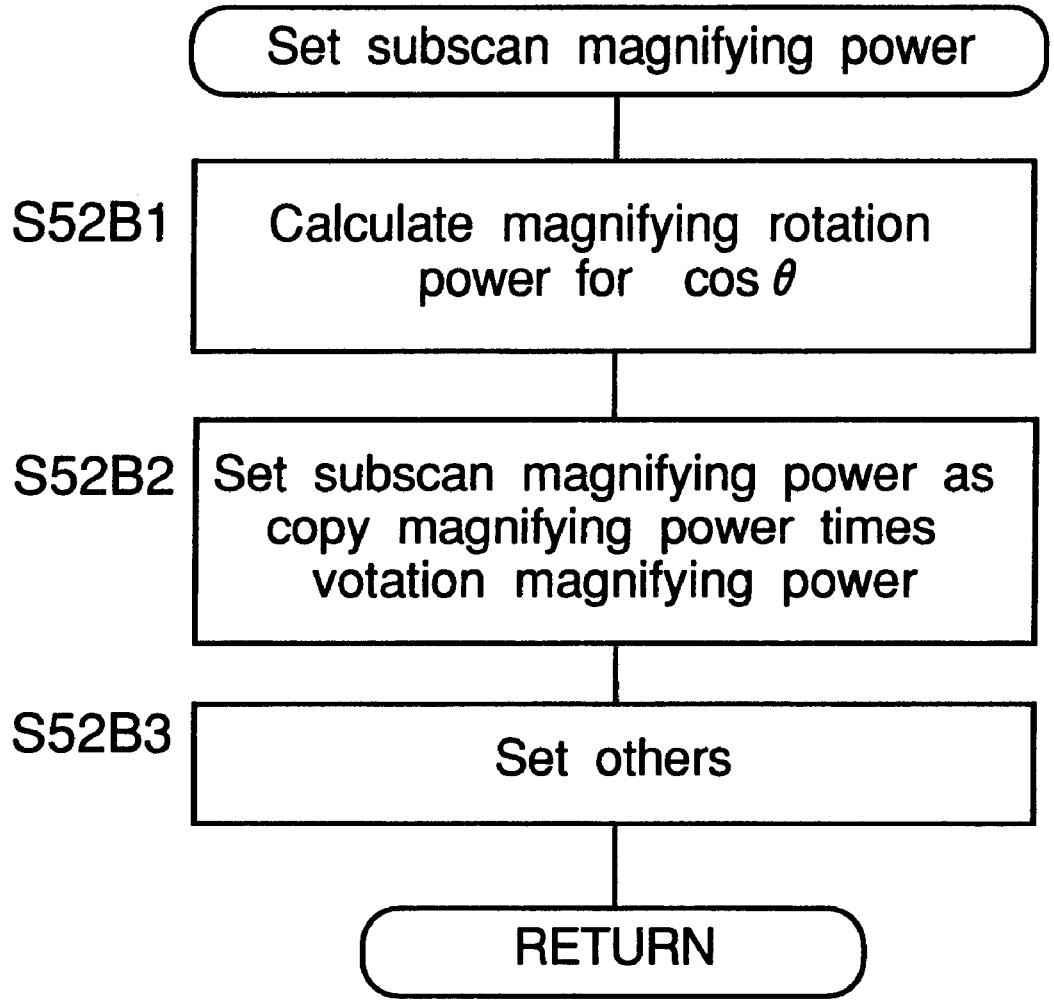
FIG. 58 is a flowchart for setting a magnifying power in the subscan direction.

On the other hand, if the scan is decided not to be prescan (NO at step S5024), that is, if the scan is a main scan, the magnifying power set at step S5028 is set (step S502B, refer to FIG. 58). Then, image data are received (step S502C), the document is detected (step S502D), image processing is performed (step S502E), and the image data are output (step S502F). After other processings are performed (step S5029), it is waited that the internal timer is completed (YES at step S502A). Then, the flow returns to step S5022 to repeat the above processes.

Figure 48:
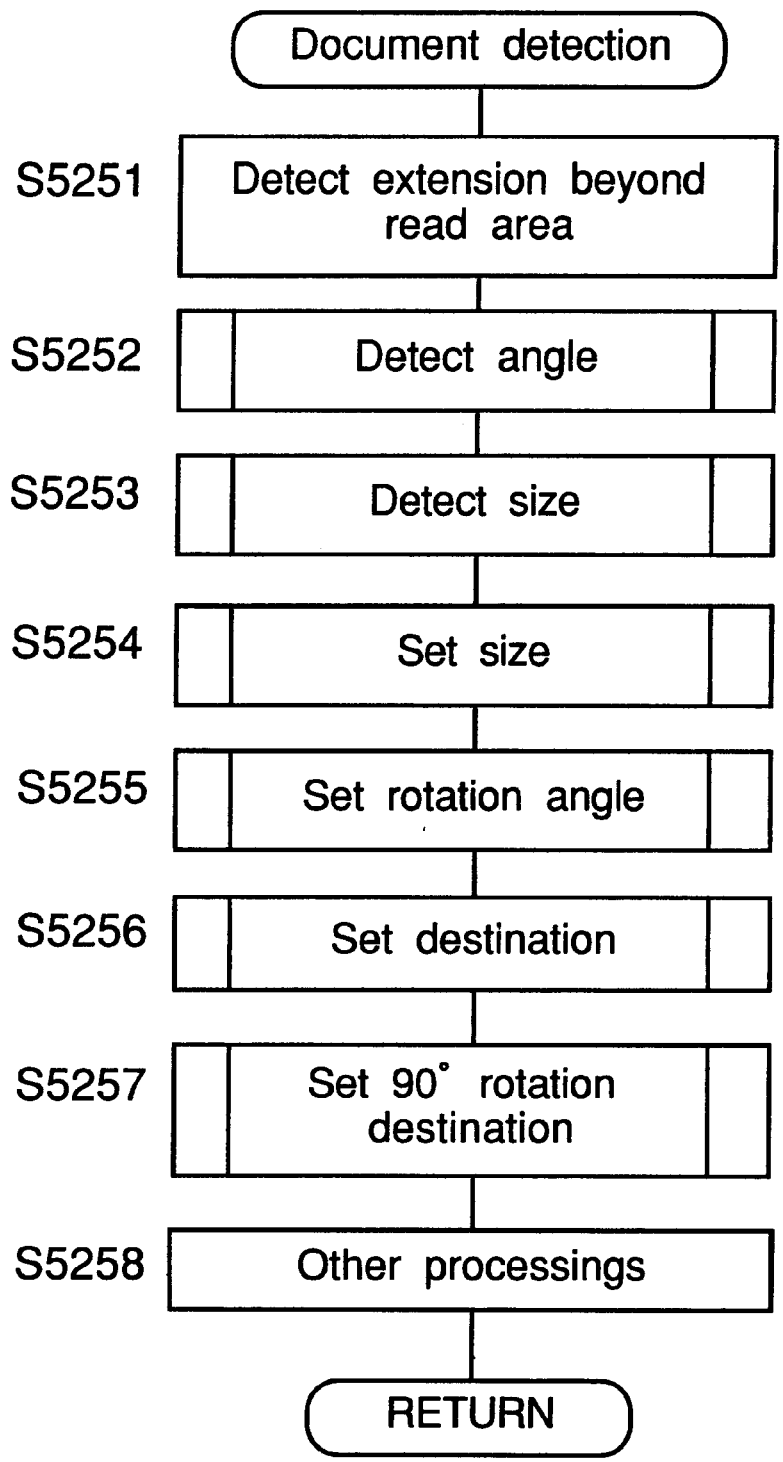
FIG. 48 is a flowchart of document detection.

FIG. 48 is a flowchart of the document detection (steps S5027, S502D in FIG. 47). First, sides and coordinates of the document are extracted from the image data thereof, and extension of the document beyond the read area is detected (step S5251). Further, following processings are performed successively: Angle detection (step S5252), size detection (step S5253), size setting (step S5254), rotation coordinate setting (step S5255), destination setting (step S5256), 90° rotation destination setting (step S5257), and others (step S5258). (For a prescan, the steps S5254–S5257 are omitted.)

In the above flow, even when a document is detected to be extended beyond the read area wherein the document exists, or document area, is detected from the image data, and each side thereof is extracted from the coordinates of the detected document area. Then, the four corners of the document are estimated by assuming a rectangle. Next, various parameters used for the tilt angle detection are set. The following parameter are included. The tilt angle θ (step S5252) represents the tilt of the effective document area. Effective document area sizes, "spx" and "spy", (step S5253) represent the size of the detected document or the sizes in the X and Y directions when the document is not tilted, while sizes, "cpx" and "cpy", are size parameters in the X and Y directions for setting the virtual paper area for drawing the image data. Paper size (step S5254) is usually a minimum standard paper size including the effective document area. Rotation coordinates, rot_x and rot_y, (step S5255) represent coordinates of rotation center in the X and Y directions relative to the origin of the read area. For example, in the example shown in FIG. 43, the top-leftmost corner is set to the origin of the read area. Then, the rotation coordinates, rot_x and rot_y, represent the corner of the effective document area (denoted with dashed line) nearest to the origin, or an erroneous translation of the document. Destination (or translation), pmdax and pmday, (step S5256) represents coordinates of the rotation coordinates relative to the origin of the virtual paper area. When the image data are drawn in the virtual paper area, the coordinates are shifted by the destination to draw the image data from the origin of the virtual paper area. Further, 90° rotation parameter (step S5257) is used to rotate the image by 90°. The above parameters are set in the edition control for the image memory (refer to FIG. 60).

Figure 49:
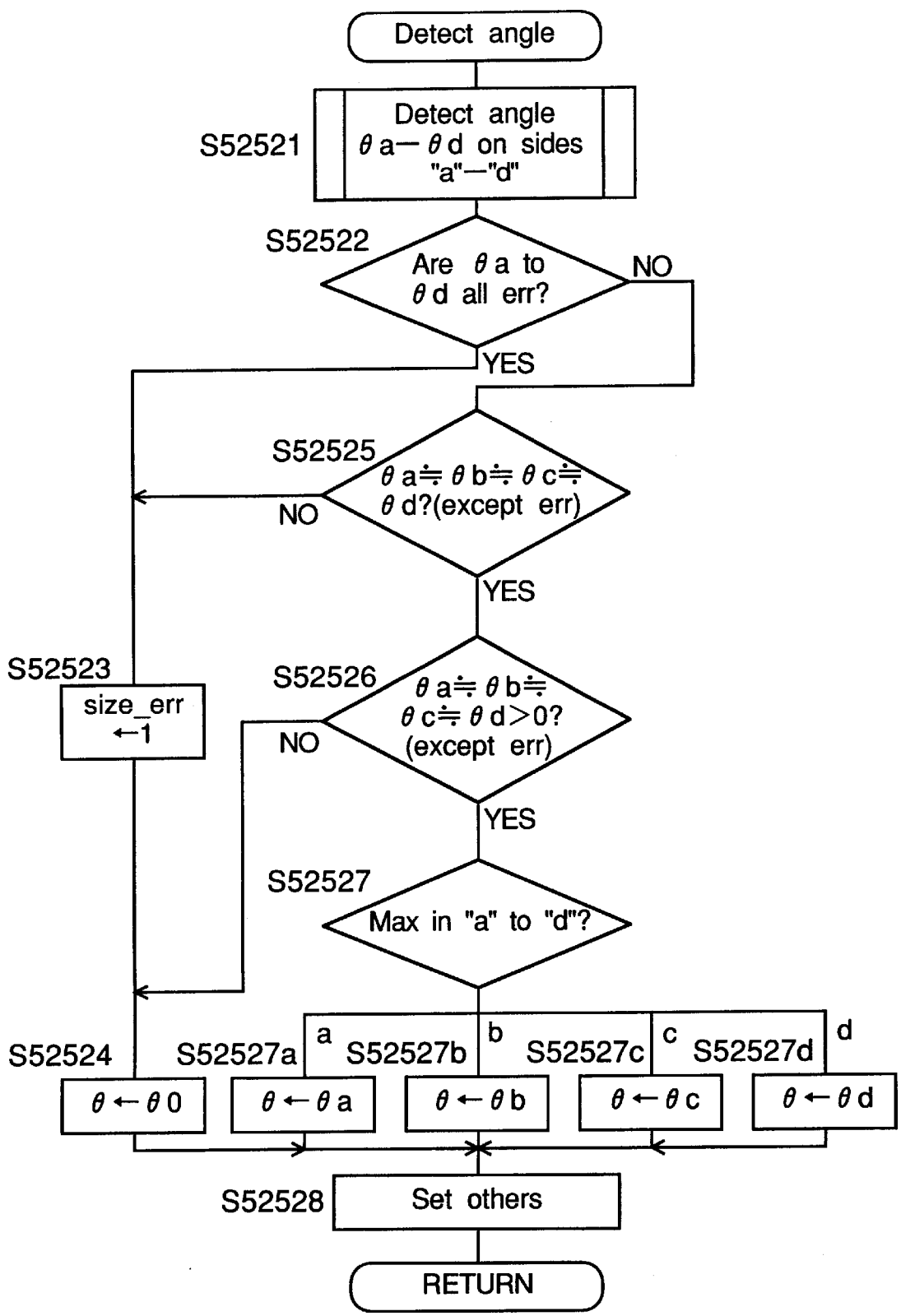
FIG. 49 shows a flowchart of angle detection.

FIG. 49 shows a flowchart of the angle detection (step S5252 in FIG. 48). First, angles, $\theta_a$, $\theta_b$, $\theta_c$ and $\theta_d$ are detected for the sides "a", "b", "c" and "d" of the document area relative to the sides of the read area (step S52521, refer to FIG. 50). After the angles are detected, the angle used for the actual rotation is selected. If all the angles are decided to be erroneous (YES at step S52522), or if it is decided not to be $\theta_a \cong \theta_b \cong \theta_c \cong \theta_d$ (except erroneous angles) (NO at step S52525), that is, if an angle detected from the sides is remarkably different from the others, or if the document is not rectangular, size__err is set to 1 in order to inhibit the tilt angle rotation (step S52523), and $\theta$ is set to $\theta_o$ (step S52524). On the other hand, if it is decided to be $\theta_a \cong \theta_b \cong \theta_c \cong \theta_d$ (except erroneous angles) (YES at step S52525), but if it is not decided that $\theta_a \cong \theta_b \cong \theta_c \theta_d \cong > 0$ (except erroneous angles) (NO at step S52526), 0 is set to $\theta_o$ (step S52524). If the above conditions are not satisfied (NO at step S52526), the lengths of the sides "a", "b", "c" and "d" are compared (step S52527), and the angle $\theta_a$, $\theta_b$, $\theta_c$ or $\theta_d$ calculated from the longest side among them is adopted as the angle $\theta$ (step S52527a, S52527b, S52527c or S52527d). Then, other processings are performed (step S52528).

Figure 50:
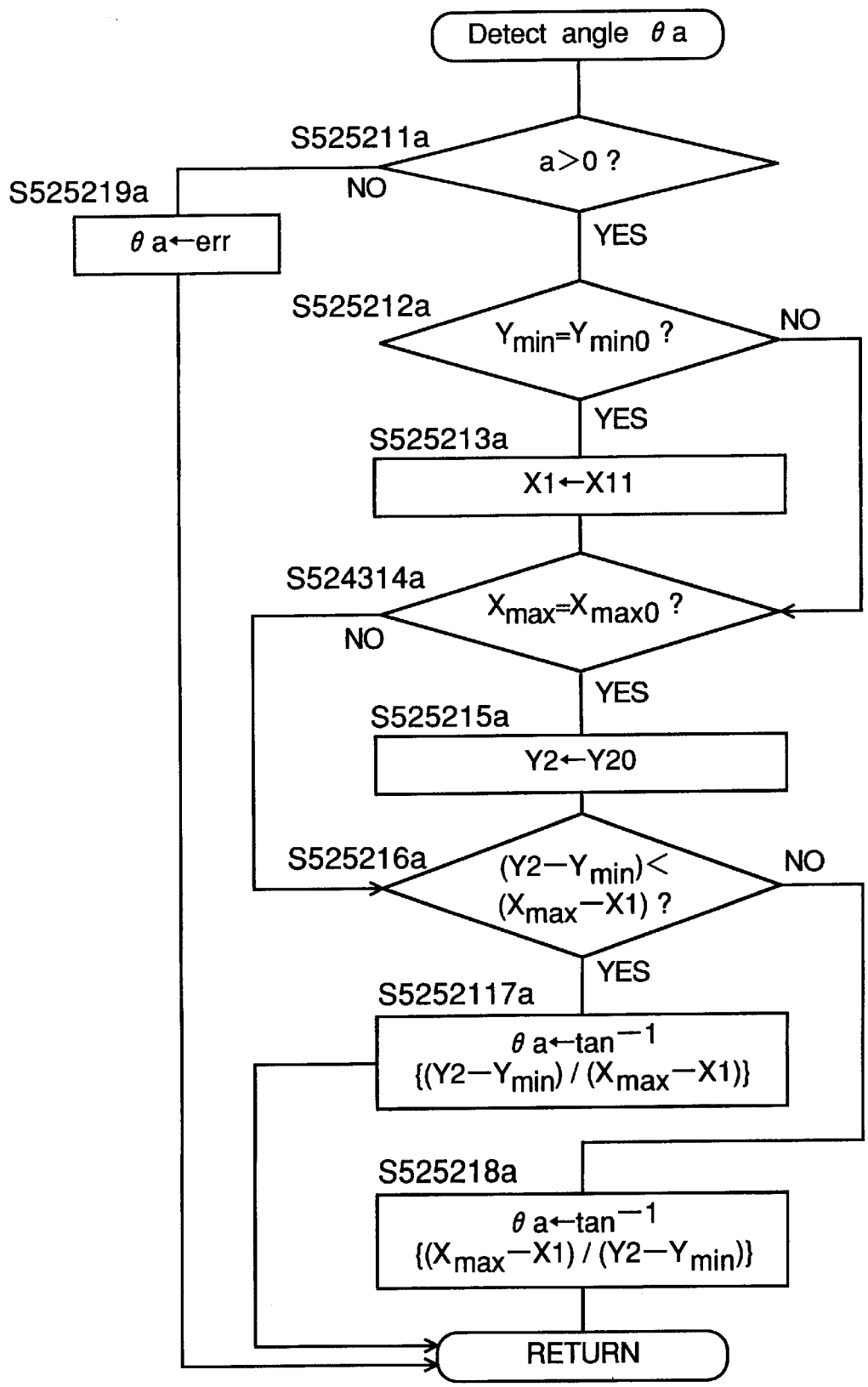
FIG. 50 shows a flowchart of $\theta_a$ detection based on side "a"

FIG. 50 shows a flowchart of the $\theta_a$ detection based on side "a" (step S52527a in FIG. 49). If it is decided not to be $\theta_a > 0$ (NO at step S525211a), the angle $\theta_a$ is set to err (step S525219a), and the flow returns. If it is decided to be $\theta_a > 0$ (YES at step S525211a), it is decided next whether the document extends beyond the read area. If $Y_{min} = Y_{min0}$, that is, if the side "e" exists (step S525212a), $X_{11}$ is set to $X_1$ (step S525213a). If $Y_{max} = Y_{max0}$, that is, if the side "g" exists (step S525214a), $Y_{20}$ is set to $Y_2$ (step S525215a). Then, $(Y_2 - Y_{min})$ is compared with $(X_{max} - X_1)$ (step S525216a), and the rotation direction is set to make the rotation angle $\theta$ smaller. That is, if it is decided that $(Y_2 - Y_{min}) < (X_{max} - X_1)$, $\tan^{-1}\{(X_{max} - X_1)/(Y_2 - Y_{min})\}$ is set to the angle $\theta$ (step S525217a), while if it is not decided that $(Y_2 - Y_{min}) < (X_{max} - X_1)$, $\tan^{-1}\{(Y_2 - Y_{min})/(X_{max} - X_1)\}$ is set to the angle $\theta$ (step S525218a). The angles, $\theta_b$, $\theta_c$ and $\theta_d$, are detected similarly to $\theta_a$, but the explanation is omitted here.

Figure 51:
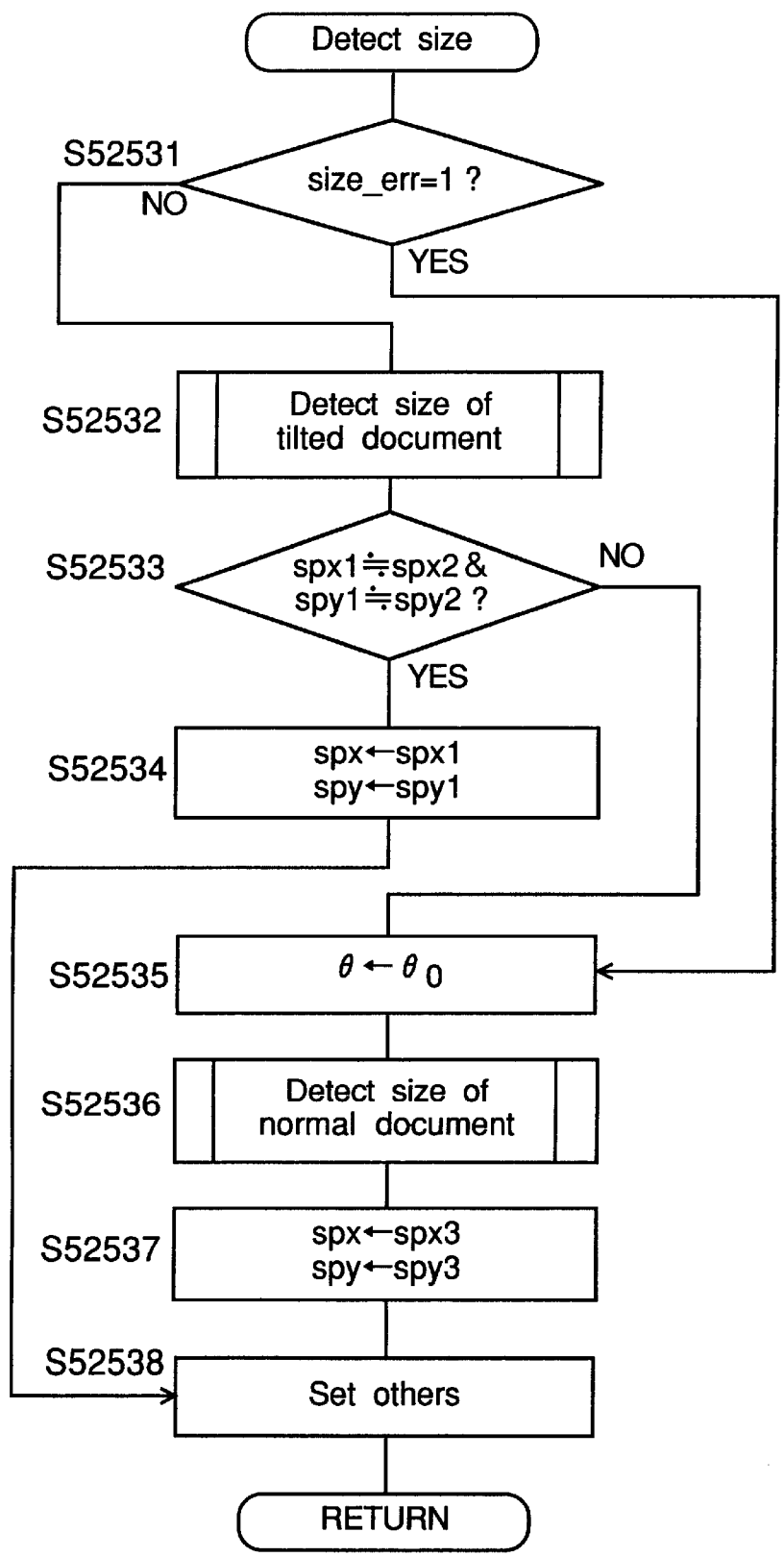
FIG. 51 shows a flowchart of size detection.

FIG. 51 shows a flowchart of the size detection (step S5253 in FIG. 48). The size of the document paper is detected based on the lengths of the sides existing outside the read area and as well as those existing within the read area. The parameters, spx and spy, represent sizes of the document paper to be set in the X and Y directions. If it is decided that size__err=1 (YES at step S51531), the side of the document cannot be detected normally. Then, the angle $\theta$ is set to $\theta_0$ (step S52535), and detection of normal document size is performed (step S52536, refer to FIG. 53). Then, spx is set to spx3 and spy is set to spy3 (step S52537), and other parameters are set (step S52538). If it is not decided that size__err=1 (NO at step S51531), detection of tilted document size is performed (step S52532, refer to FIG. 52). Then, the length of spx1 is compared with that of spx2, and the length of spy1 is compared with that of spy2 (step S52533). If they are different from each other (NO at step S52533), the flow proceeds to step S52535 for performing the detection of normal document. Otherwise spx1 is set to spx, and spy1 is set to spy (step S52534), and other parameters are set (step S52538).

Figure 52:
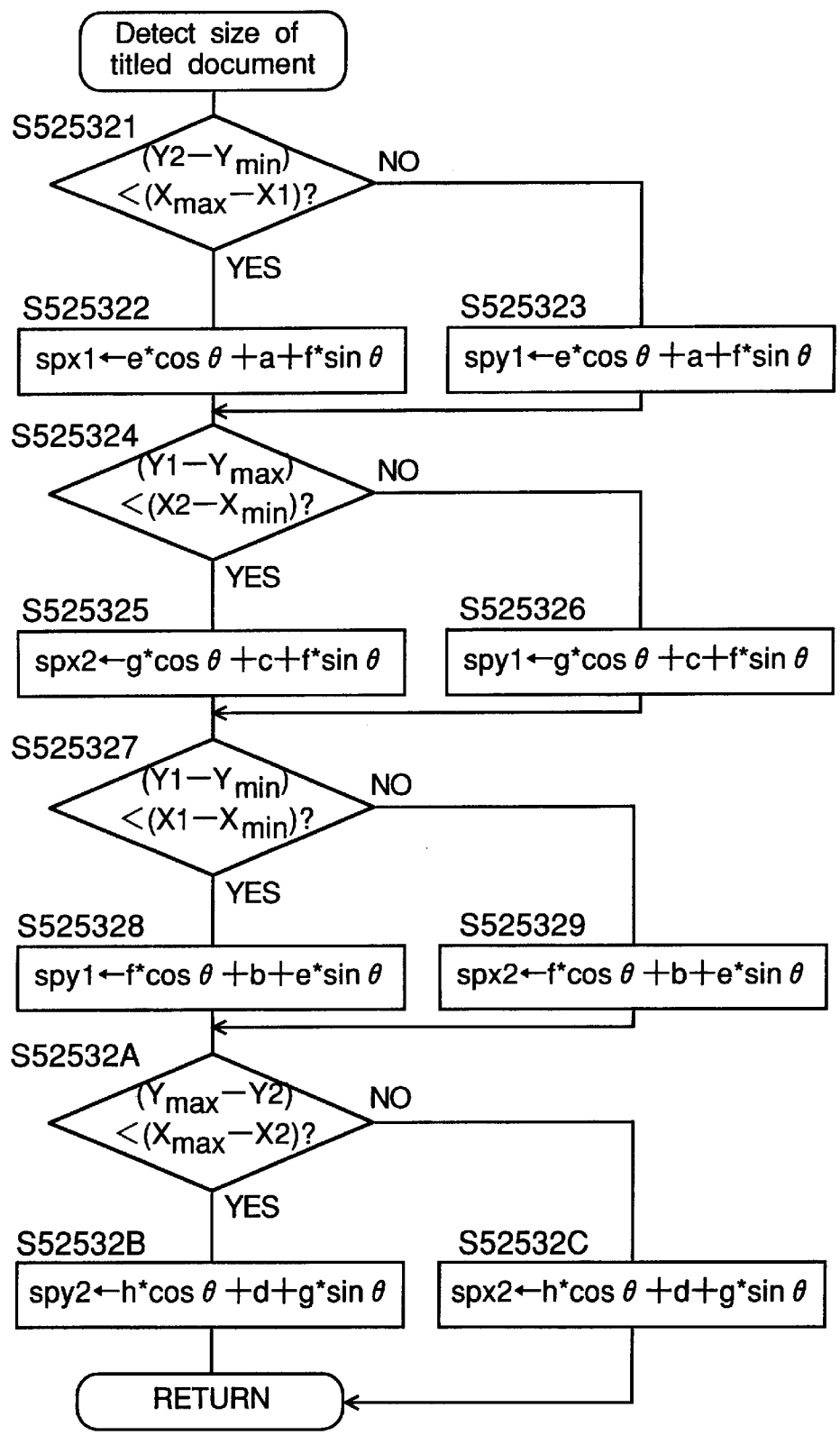
FIG. 52 is a flowchart of detection of tilted document size.

FIG. 52 is a flowchart of the detection of tilted document size (step S52532 in FIG. 51). In this flow, the lengths of sides extending beyond the read area are set based on the tilt angle $\theta$ and the lengths of the sides "a", "b", "c" and "d" of the documents existing within the read area. First, $(Y_2 - Y_{min})$ is compared with $(X_{max} - X_1)$ in order to decide the rotation direction (step S525321). If it is decided that $(Y_2 - Y_{min}) < (X_{max} - X_1)$ (YES at step S525321), $e*\cos\theta + a + f*\sin\theta$ is assigned to spx1 (step S525322), else it is assigned to spy1 (step S525323). Similarly, $(Y_1 - Y_{max})$ is compared with $(X_2 - X_{min})$ in order to decide the rotation direction (step S525324). If it is decided that $(Y_1 - Y_{max}) < (X_2 - X_{min})$ (YES at step S525324), $g*\cos\theta + c + f*\sin\theta$ is assigned to spx2 (step S525325), else it is assigned to spy2 (step S525326). Further, $(Y_1 - Y_{min})$ is compared with $(X_1 - X_{min})$ in order to decide the rotation direction (step S525327). If it is decided that $(Y_1 - Y_{min}) < (X_1 - X_{min})$ (YES at step S525327), $f*\cos\theta + b + e*\sin\theta$ is assigned to spy1 (step S525328), else it is assigned to spx2 (step S525329). Still further, $(Y_{max} - Y_2)$ is compared with $(X_{max} - X_2)$ in order to decide the rotation direction (step S52532A). If it is decided that $(Y_{max} - Y_2) < (X_{max} - X_2)$ (YES at step S52532A), $h*\cos\theta + d + g*\sin\theta$ is assigned to spy2 (step S52532B), else it is assigned to spx2 (step S52532C).

Figure 53:
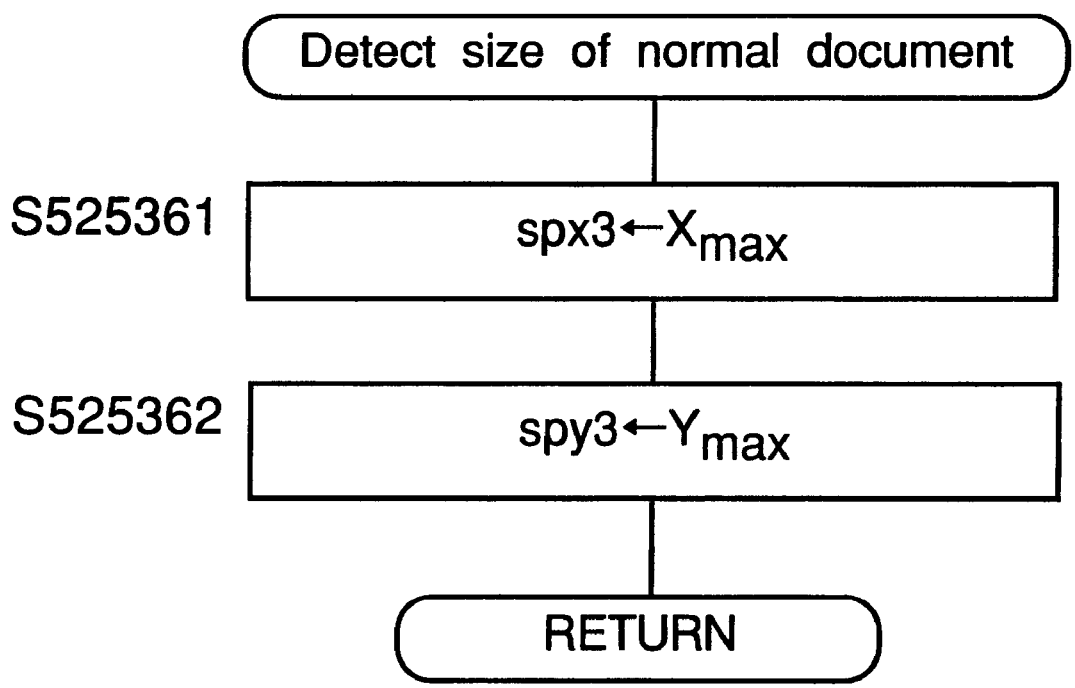
FIG. 53 is a flowchart of detection of normal document size.

FIG. 53 is a flowchart of the detection of normal document size (step S52536 in FIG. 51). First, $X_{max}$ is assigned to spx3 (step S525361), and $Y_{max}$ is assigned to spy3 (step S525362).

Figure 54:
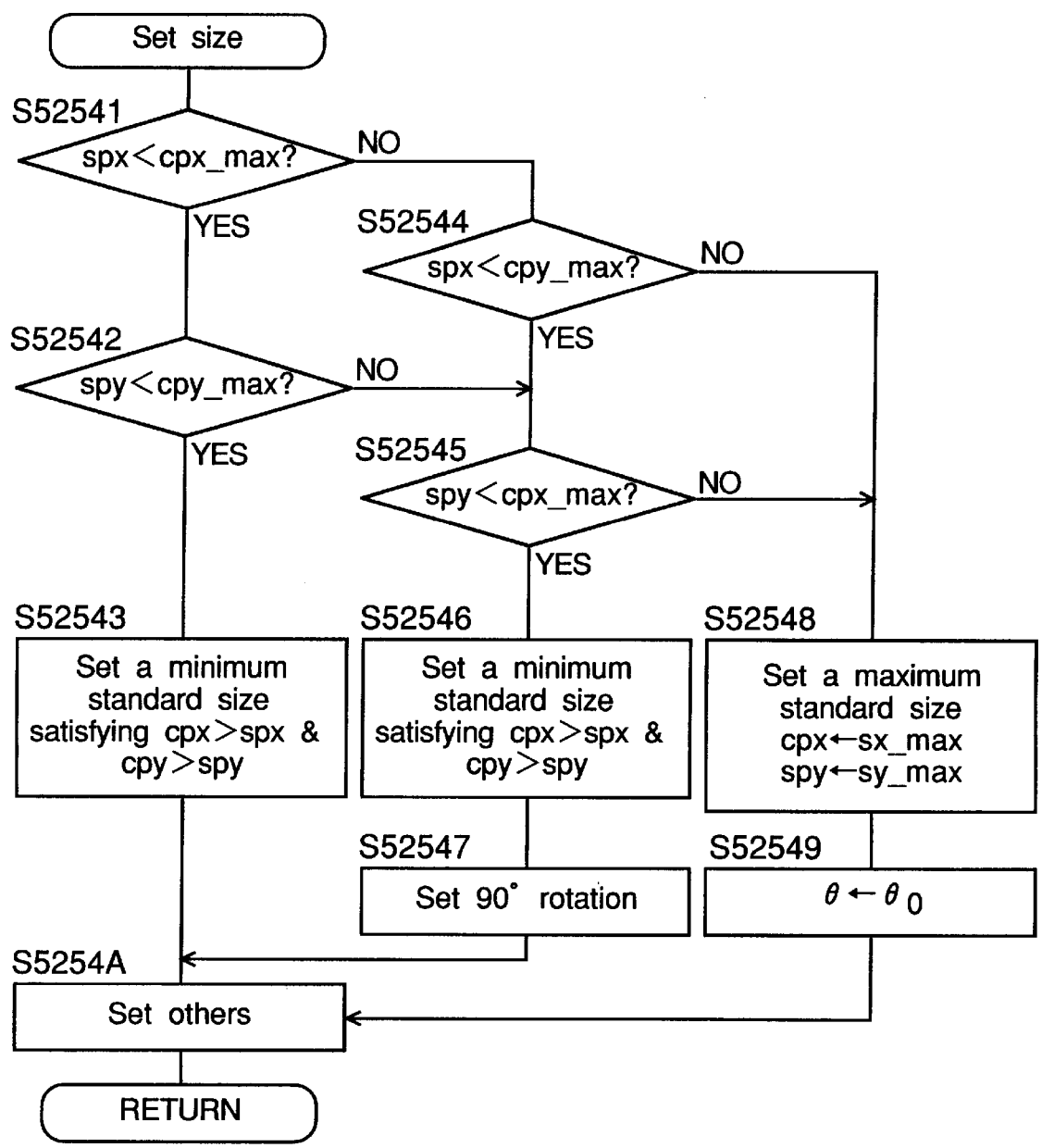
FIG. 54 shows a flowchart of size setting.

FIG. 54 shows a flowchart of the size setting (step S5254 in FIG. 48). The parameters spx and spy represent the sizes of the detected document, cpx and cpy represent the size set for the virtual paper size 3042, and cpx__max and cpy__max represent the maximum sizes to be set. First, if cpx<spx and cpy<spy (YES at steps S52541 and S52542), the minimum standard size satisfying cpx>spx and cpy>spy is set (step S52543). If the detected document size is larger than the maximum standard size but smaller than the maximum size to be set when the direction of the effective document area is changed between the vertical and horizontal directions, that is, if spx<cpx__max, spy≧cpy__max and spy<cpx__max (YES at step S52541, NO at step S52542, YES at step S52545), or if spx≧cpx__max, spx<cpy__max and spy<cpx__max (NO at step S52541, YES at step S52544, YES at step S52545), the minimum standard size satisfying cpx<spy and cpy<spx is set (step S52546), and 90° rotation is set (step S52547). In other cases, that is, if the effective document area size spx, spy is larger than the maximum size cpx__max, cpy__max allowed to be set (NO at step S52541, NO at step S52544), the maximum standard size is set. That is, sx__max is assigned to cpx and sy__max is assigned to cpy (step S52548). Finally, other parameters are set (step S5254A).

Figure 55:
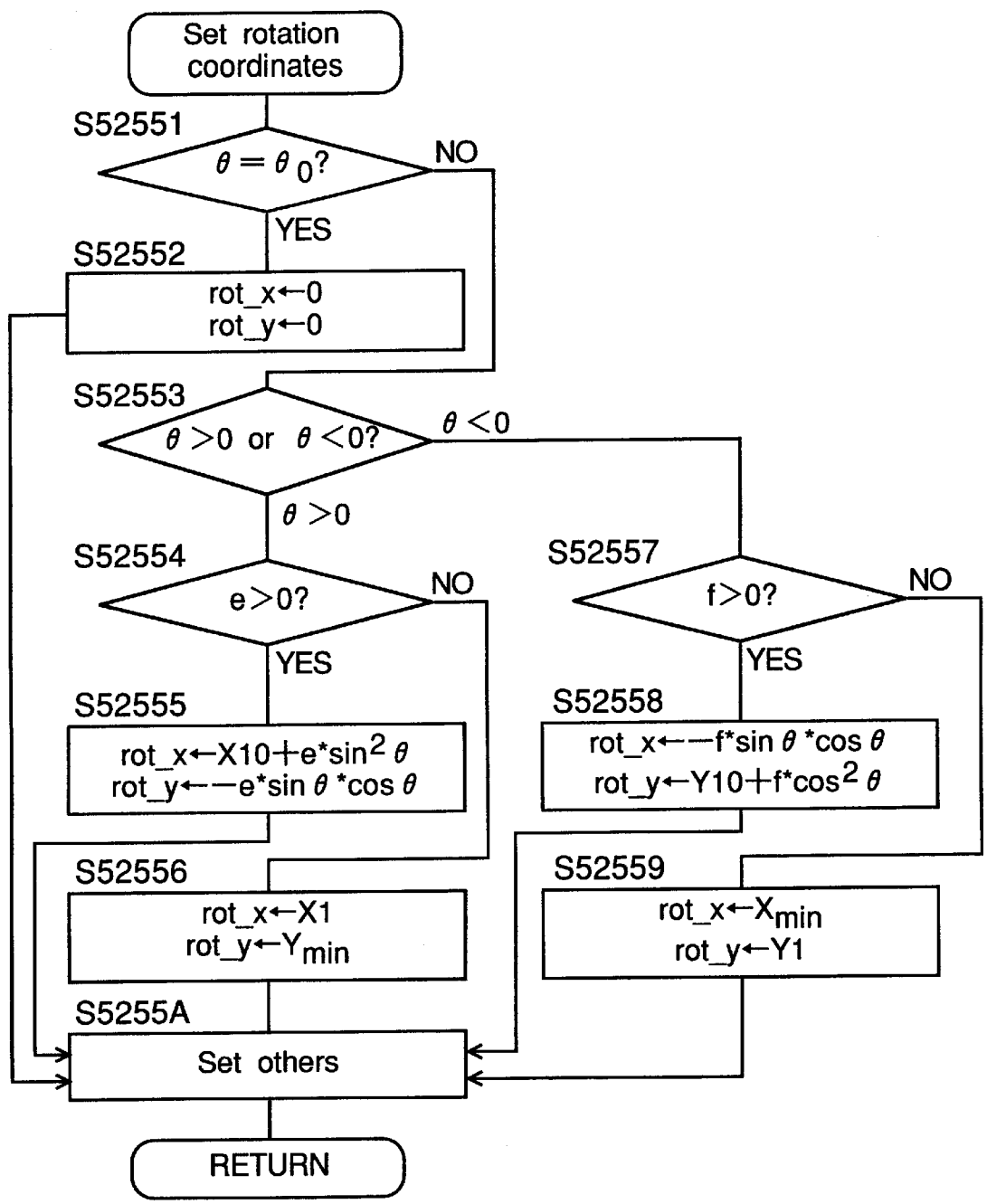
FIG. 55 shows a flowchart of rotation coordinate setting.

FIG. 55 shows a flowchart of the rotation coordinate setting (step S5255 in FIG. 48). Parameters, rot__x and rot__y, are coordinates of the rotation center relative to the origin of the read area. If the rotation is not performed ($\theta = \theta_0$) (YES at step S52551), both rot__x and rot__y are set to 0 (step S52552). If the rotation is performed (NO at step S52551), the flow branches according to the positive or negative sign of the rotation angle $\theta$ (step S52553). When the rotation angle $\theta$ is positive, if e>0 (YES at step S52554), $X_{10} + e*\sin^2\theta$ is assigned to rot__x and $e*\sin\theta*\cos\theta$ is assigned to rot__y (step S52555). If it is not decided that e>0, or if e=0, $X_1$ is assigned to rot__x and $Y_{min}$ is assigned to rot__y (step S52556). When the rotation angle $\theta$ is negative, if f>0 (YES at step S52557), $f*\sin\theta*\cos\theta$ is assigned to rot__y and $Y_{10} + f*\sin^2\theta$ is assigned to rot__y (step S52558). If it is not decided that f>0, or if f=0, $Y_{min}$ is assigned to rot__x and $Y_1$ is assigned to rot__y (step S52559). Finally, other parameters are set (step S5255A).

Figure 56:
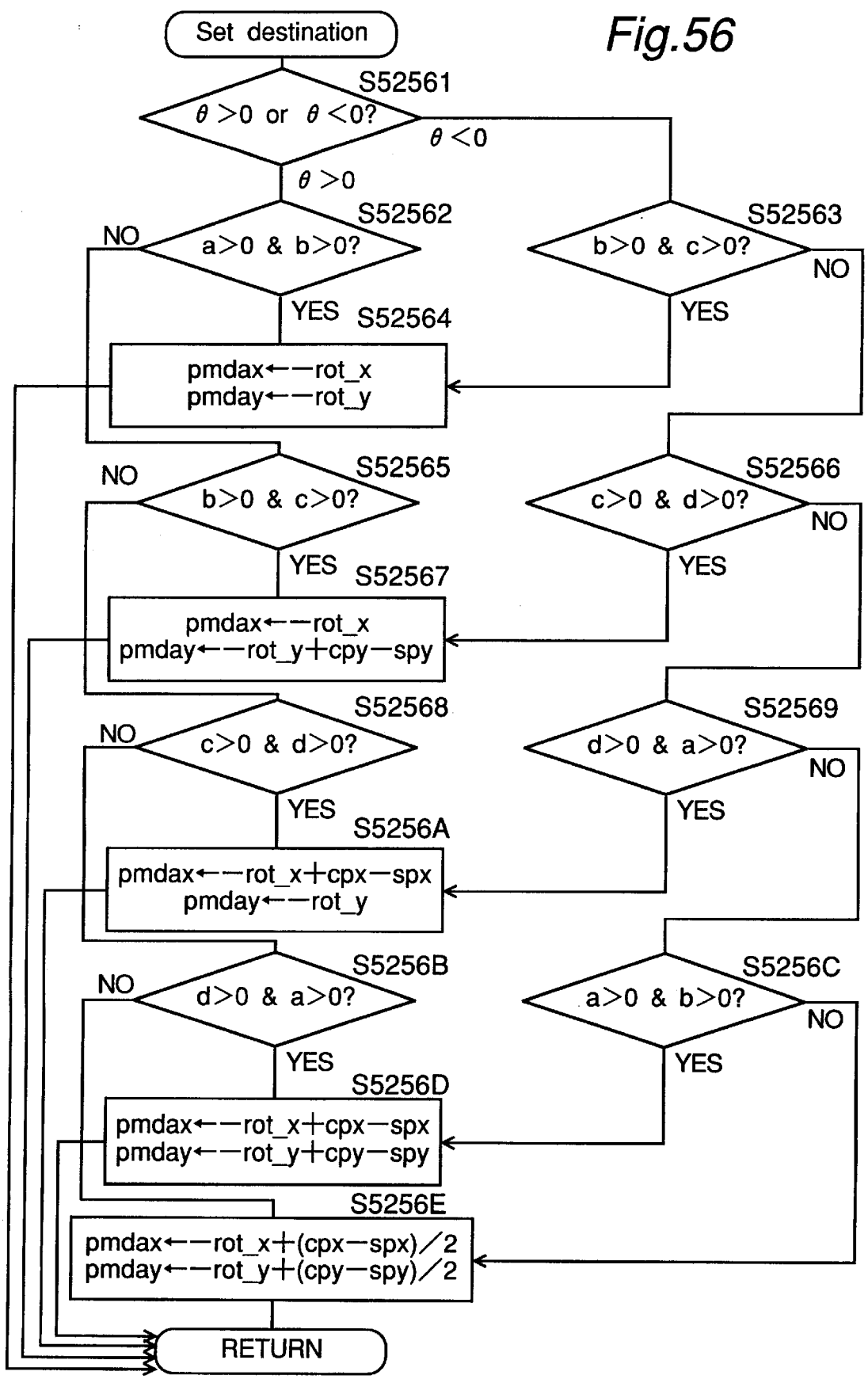
FIG. 56 shows a flowchart of destination setting.

FIG. 56 shows a flowchart of the destination setting (step S5256 in FIG. 48). The destination is set to the coordinates pmdax, pmday (relative to the origin of the virtual paper) corresponding to the origin of the read area for image data drawn in the virtual paper area. The virtual paper area is set to a standard size, while it does not necessarily agree with the input image size determined by extracting the sides; of the document in the document detection. Therefore, if two or more sides are extracted from the image data, preferably at the side of read datum (the side of rotation center), the destination (or parallel translation length) is set based oil two adjacent sides and the set paper size so that the corner of the two adjacent sides agrees with a corner of the virtual paper area. The parameters spx and spy represent sizes of the detected document paper, cpx and cpy represent set sizes of the virtual paper size (refer to FIG. 52), and rot__x and rot__y represent the coordinates of the rotation center relative to the origin of the read area (refer to FIG. 55). First, if the angle θ>0 (step S52561) and if the sides, a and b, are both positive (YES at step S52562), or if the angle θ<0 (step S52561) and if the sides, b and c, are both positive (YES at step S52563), two sides containing the rotation center are extracted. Then, −rot__x is assigned to pmdax and −rot__y is assigned to pmday (step S52564). Next, if the angle θ>0 (step S52561) and the sides, b and c, are both positive (YES at step S52565), or if the angle θ<0 (step S52561) and the sides, c and d, are both positive (YES at step S52566), −rot__x is assigned to pmdax and −rot__y+cpy-spy is assigned to pmday (step S52567). Next, if the angle θ>0 (step S52561) and the sides, c and d, are both positive (YES at step S52568), or if the angle θ<0 (step S52561) and the sides, d and a, are both positive (YES at step S52569), −rot__x+cpx-spx is assigned to pmdax and −rot__y is assigned to pmday (step S5256A). Further, if the angle θ>0 (step S52561) and if the sides, d and a, are both positive (YES at step S5256B), or if the angle θ<0 (step S52561) and if the sides, a and b, are both positive (YES at step S5256C), −rot__x+cpx-spx is assigned to pmdax and −rot__y+cpy-spy is assigned to pmday (step S5256D). If any of the above-mentioned conditions is not satisfied, −rot__x+(cpx-spx)/2 is assigned to pmdax and −rot__y+(cpy-spy)/2 is assigned to pmday (step S5256E).

Figure 57:
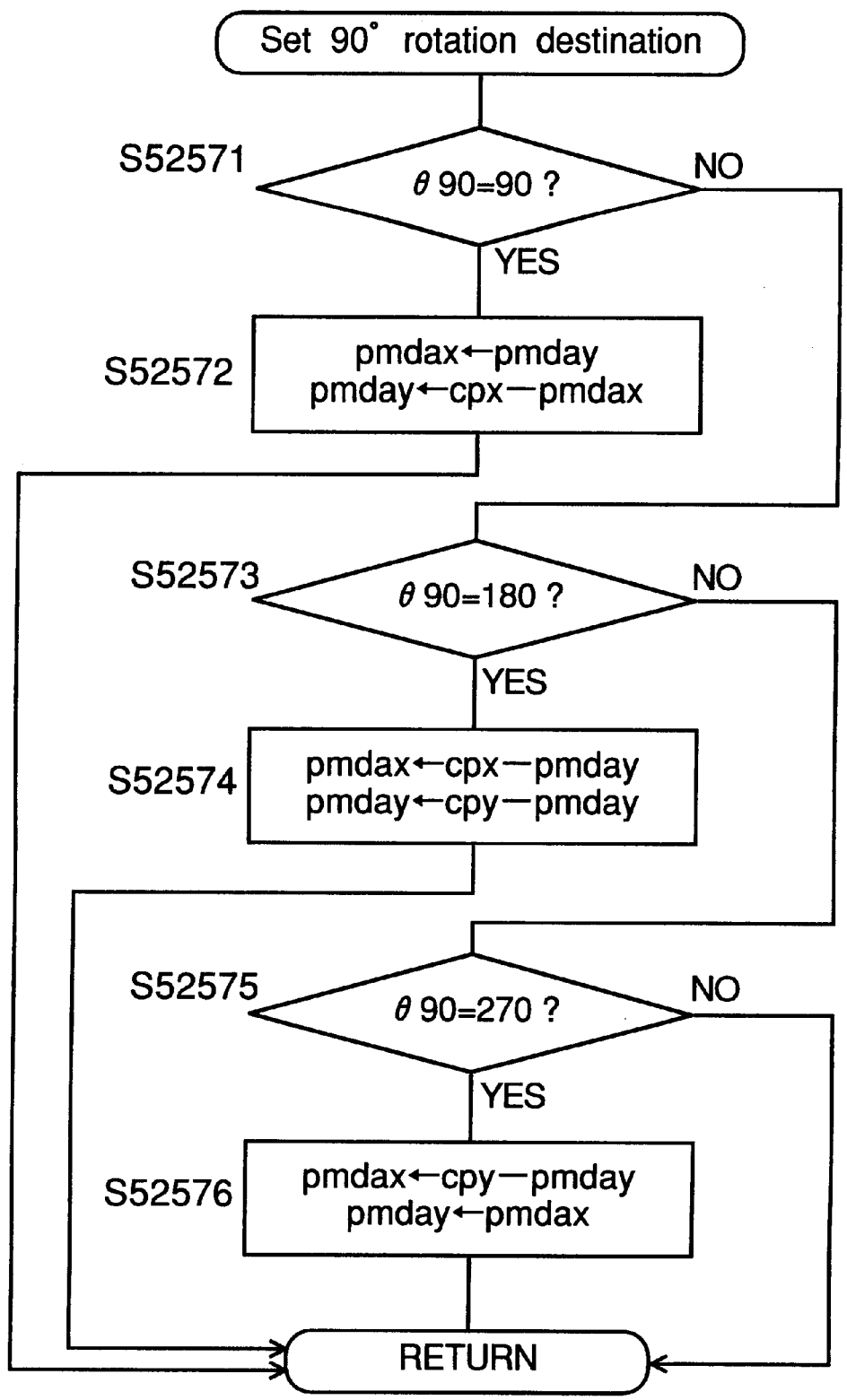
FIG. 57 shows a flowchart of 90° rotation destination setting.

FIG. 57 shows a flowchart of the 90° rotation destination setting (step S5257 in FIG. 48). When 90° rotation is combined in the rotation, the datum of destination has to be changed. If $θ_{90}$=90 (YES at step S52571), pmday is assigned to pmdax and cpx-pmdax is assigned to pmday (step S52572). If $θ_{90}$=180 (YES at step S52573), cpx-pmdax is assigned to pmdax and cpy-pmday is assigned to pmday (step S52574). If $θ_{90}$=270 (YES at step S52575), cpy-pmday is assigned to pmdax and pmdax is assigned to pmday (step S52576).

The above-mentioned destination setting is explained in the normal mode. However, it is possible to set an appropriate destination when the image is required to be shifted by a margin provided for binding, or when a plurality of documents are required to be copied in a single paper.

FIG. 58 is a flowchart for setting subcan magnifying power (step S502B in FIG. 47B). First, cosθ is calculated as the magnifying power x from the tilt angle determined in the angle detection in the document size detection (step S52B1). Further, if a user has set magnifying power for copy, read magnifying power is set as a product of the magnifying power for copy with the magnifying power for reading in the subscan direction (step S52B2). Then, other parameters are set (step S52B3).

Figure 59:
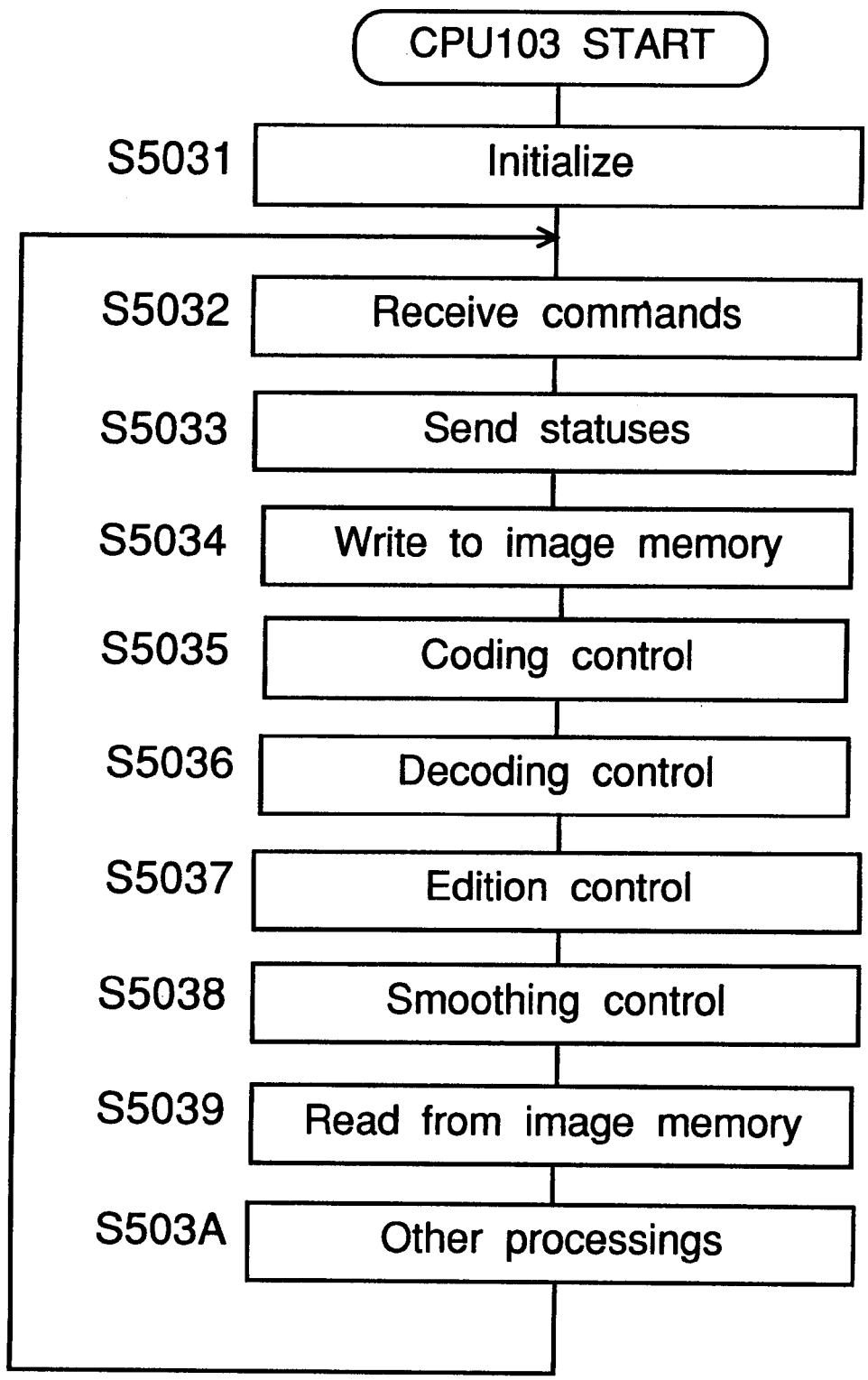
FIG. 59 is a main flowchart of the third CPU.

FIG. 59 is a main flowchart of the third CPU 103 which controls the memory unit 30. First the RAM, the registers and the like are initialized (step S5031). Then, commands from the CPU 105 are received (step S5032), statuses are sent to the CPU 105 (step S5033), write to the image memory is performed (step S5034), and compression (coding) is controlled (step S5035). Further, expansion (decoding) is controlled (step S5036), edition control is performed (step S5037, refer to FIG. 60), smoothing control is performed (step S5038), and read from the image memory is performed (step S5039). After other processings are performed (step S503A), the flow returns to step S5032 to repeat the above processes.

Figure 60:
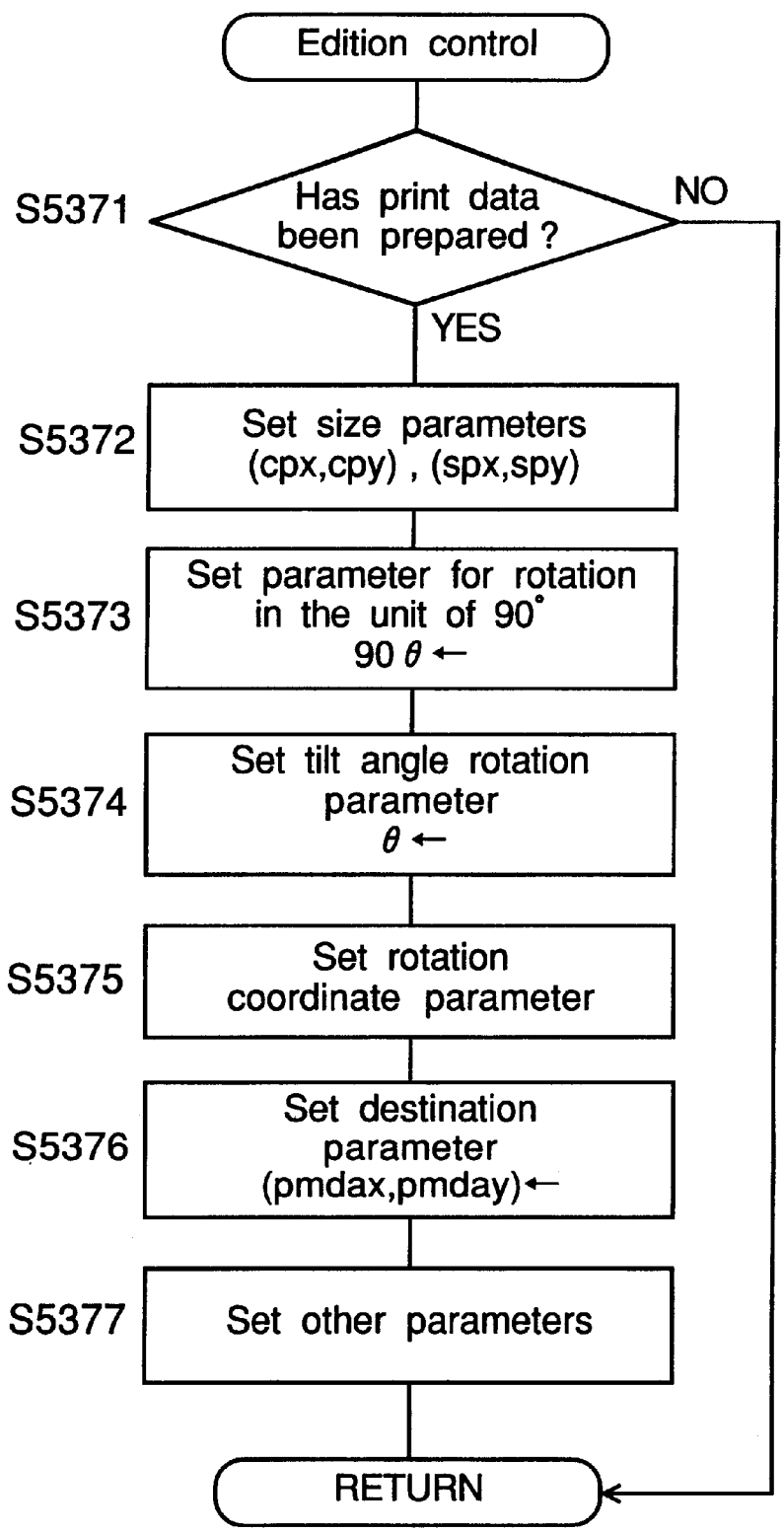
FIG. 60 is a flowchart of edition control.

FIG. 60 is a flowchart of the edition control (step S5037 in FIG. 59). When data for printing are stored in the code memory 306 (YES at step S5371), the size parameters, (cpx, cpy), (spx, spy) are set (step S5372), the rotation parameter in the unit of 90° is set (step S5373), tilt angle rotation parameter θ is set (step S5374), rotation coordinate parameters (rot__x, rot__y) are set (step S5375), the destination parameter (pmdax, pmday) is set (step S5376), and other parameters are set (step S5377).

The main flows of the fourth and fifth CPUs 104, 105 are similar to the counterparts in the first embodiment, and they are not explained here.

As explained above, in the tilt angle correction, the document is read optically at a magnifying power calculated according to the detected tilt angle of the document. Thus, the number of electrical magnification is decreased in the tilt angle correction. Therefore, process time for the electrical magnification is shortened, and deterioration of image quality due to line insertion or the like is prevented. Thus, a corrected image having good image quality can be produced at a fast speed.

In the above-mentioned embodiments, the tilt angle rotation is explained on the image data received from the image reader. However, image data (including the angle parameters) communicated from an external apparatus in the network can also be processed. For example, the image data received from the external apparatus can be subjected to the tilt angle rotation and printed thereafter. Further, image data received from the external apparatus can be output again after the tilt angle rotation thereon.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus comprising:
   a rotation angle setter for setting a desired rotation angle based on image data;
   a modifying section which modifies the image data; and
   a controller which controls the modifying section according to a relationship between the set desired rotation angle and a predetermined value, wherein
   tilt of an image is corrected by rotation of the image data.

2. The image processing apparatus according to claim 1, wherein said controller sets parameters used by said modifying section for the modification according to the relationship between the rotation angle and the predetermined value.

3. The image processing apparatus according to claim 1, further comprising a decision section which decides whether the image data includes only bi-level image or includes half-tone image, wherein said controller makes said modifying section modify the image data when said decision section decides that the image data includes half-tone image.

4. The image processing apparatus according to claim 3, wherein said controller makes said modifying section modify the image data when said decision section decides that the image data includes half-tone image of an amount larger than a predetermined value.

5. The image processing apparatus according to claim 3, wherein said controller prevents said modifying section to modify the image data when said decision section decides that the image data includes only bi-level image.

6. The image processing apparatus according to claim 1, further comprising a mode setter which selects one of image quality modes, the image quality mode including photograph mode;
wherein said controller makes said modifying section modify the image data when the photograph mode is set by said mode setter.

7. The image processing apparatus according to claim 1, further comprising a rotator which rotates the image data according to the rotation angle set by said rotation angle setter, wherein said modification section modifies the image data which have been rotated by said rotator.

8. The image processing apparatus according to claim 1, further comprising an image reading unit which reads a document image to generate image data, wherein said rotation angle setter sets the rotation angle based on the image data received from by said image reading unit.

9. The image processing apparatus according to claim 1, wherein said modifying section performs smoothing on the image data.

10. A method for processing image data comprising the steps of:
receiving image data;
setting a desired rotation angle based on the image data;
modifying the image data according to a relationship between the set desired rotation angle and a predetermined value, wherein
tilt of an image is corrected by rotation of the image data.

11. An image processing apparatus comprising:
a rotator which rotates image data by a set desired rotation angle; and
a controller which controls the rotation by said rotator according to a characteristic of the image data, wherein
tilt of an image is corrected by rotation of the image data.

12. The image processing apparatus according to claim 11, further comprising a rotation angle setter which sets a rotation angle based on the image data;
wherein said rotator rotates the image data according to the rotation angle set by said rotation angle setter.

13. The image processing apparatus according to claim 12, further comprising an image reading unit which reads a document image and generates image data, wherein said rotation angle setter sets the rotation angle based on the image data generated by said image reading unit.

14. The image processing apparatus according to claim 11, wherein said controller prevents said rotator to rotate the image data when the image data is decided based on characteristics of the image data to include half-tone image.

15. The image processing apparatus according to claim 13, wherein said controller prevents said rotator to rotate the image data when the image data is decided according to characteristics of the image data to include half-tone image by an amount larger than a predetermined value.

16. The image processing apparatus according to claim 13, wherein said controller makes said rotator rotate the image data when the image data is decided according to characteristics of the image data to include only bi-level image.

17. The image processing apparatus according to claim 11, further comprising a mode setter which selects one of image quality modes, wherein said controller controls activation of said rotator according to the mode selected by said mode setter.

18. A method for processing image data comprising the steps of:
rotating image data by a set desired rotation angle; and
controlling the rotation according to a characteristic of the image data, wherein
tilt of an image is corrected by the rotation of the image data.

19. An image processing apparatus comprising:
an image reading unit which reads a document put on a set position to generate image data, said image reading unit including a detector which detects a tilt angle of the document put on the set position;
a calculator which calculates a first magnifying power for reading the document by said image reading unit according to the tilt angle detected by said detector; and
a rotator which rotates image data of the document by the tilt angle detected by said detector to correct tilt of the image data, the image data to be rotated by said rotator being image data which has been read at the first magnifying power by said image reading unit.

20. The image processing apparatus according to claim 19, further comprising a setter which sets a second magnifying power, wherein said calculator calculates the first magnifying power based on the tilt angle detected by said detector and the second magnifying power set by said setter.

21. A method of processing image data comprising the steps of:
detecting a tilt angle of each document put on a set position;
calculating a magnifying power for reading the document to the detected tilt angle;
reading the document at the magnifying power to generate image data; and
rotating the image data of said each document at the magnifying power by a desired rotation angle set in accordance with the detected tilt angle to correct tilt of an image.

22. An image processing apparatus comprising:
a rotator which rotates image data by a set desired rotation angle;
a modifying section which modifies the image data which have been rotated by said rotator; and
a controller which controls the modification by said modifying section according to a characteristic of said image data, wherein
tilt of an image is corrected by the rotation of the image data the.

23. The image processing apparatus according to claim 22, wherein said controller makes said modifying section modify the image data when the image data is decided to include half-tone image based on characteristics of the image data.

24. The image processing apparatus according to claim 23, wherein said controller activates said modifying section only for half-tone image regions when the image data is decided according to characteristics of the image data to include both half-tone image areas and bi-level image areas.

25. The image processing apparatus according to claim 22, wherein said controller prevents said rotator to rotate the image data when the image data is decided according to characteristics of the image data to include only bi-level image.

26. The image processing apparatus according to claim 22, further comprising a mode setter which selects one of image quality modes, wherein said controller activates or inactivates modification by said modifying section according to the mode selected by said mode setter.

27. The image processing apparatus according to claim 22, wherein said modifying section performs smoothing on the image data.

28. A method for processing image data comprising the steps of:

receiving image data;

rotating the image data by a set desired rotation angle based on the image data;

determining a characteristic of the image data; and modifying the rotated image data according to the characteristic thereof, wherein tilt of an image is corrected by rotation of the image data.

* * * * *